US008793697B2

(12) United States Patent
Gargash et al.

(10) Patent No.: US 8,793,697 B2
(45) Date of Patent: Jul. 29, 2014

(54) METHOD AND SYSTEM FOR SCHEDULING REQUESTS IN A PORTABLE COMPUTING DEVICE

(75) Inventors: Norman S. Gargash, Boulder, CO (US); Grady L. Caraway, Boulder, CO (US); Vinod Vijayarajan, Boulder, CO (US); Tracy A. Ulmer, Boulder, CO (US); Joshua H. Stubbs, Longmont, CO (US); Andrew J. Frantz, Superior, CO (US); Gabriel Watkins, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 276 days.

(21) Appl. No.: 13/418,597

(22) Filed: Mar. 13, 2012

(65) Prior Publication Data
US 2013/0227583 A1    Aug. 29, 2013

Related U.S. Application Data

(60) Provisional application No. 61/602,287, filed on Feb. 23, 2012.

(51) Int. Cl.
*G06F 9/46*   (2006.01)

(52) U.S. Cl.
USPC .......................................... 718/102; 718/100

(58) Field of Classification Search
None
See application file for complete search history.

(56) References Cited

U.S. PATENT DOCUMENTS

| 6,791,992 | B1 * | 9/2004 | Yun et al. ..................... 370/415 |
| 6,937,561 | B2 * | 8/2005 | Chiussi et al. ................ 370/229 |
| 7,669,081 | B2 | 2/2010 | Lett et al. |
| 8,190,807 | B2 * | 5/2012 | Reid et al. .......................... 711/3 |
| 2004/0117577 | A1 * | 6/2004 | Bloks ............................. 711/167 |
| 2007/0106994 | A1 * | 5/2007 | Jackson ......................... 718/104 |
| 2008/0046888 | A1 | 2/2008 | Appaji |
| 2008/0155549 | A1 * | 6/2008 | Blinick et al. ................. 718/103 |
| 2009/0077233 | A1 * | 3/2009 | Kurebayashi et al. ........ 709/224 |
| 2009/0182802 | A1 | 7/2009 | Tran et al. |
| 2009/0323665 | A1 * | 12/2009 | Li et al. .......................... 370/345 |
| 2010/0011182 | A1 * | 1/2010 | Le Moal et al. ................ 711/167 |
| 2011/0161963 | A1 * | 6/2011 | Guevorkian et al. .......... 718/102 |
| 2011/0252429 | A1 | 10/2011 | Ballard et al. |
| 2011/0283292 | A1 * | 11/2011 | Saffre ............................ 718/104 |
| 2012/0180064 | A1 * | 7/2012 | Helander ....................... 718/104 |

FOREIGN PATENT DOCUMENTS

GB    2463370 A    3/2010

* cited by examiner

*Primary Examiner* — Emerson Puente
*Assistant Examiner* — Dong Kim
(74) *Attorney, Agent, or Firm* — Nicholas A. Cole

(57) ABSTRACT

A method and system for managing requests among resources within a portable computing device include a scheduler receiving data from a client for scheduling a plurality of requests. Each request identifies at least one resource and a requested deadline. Next, data from the client is stored by the scheduler in a database. The scheduler then determines times and a sequence for processing the requests based on requested deadlines in the requests and based on current states of resources within the portable computing device. The scheduler then communicates the requests to the resources at the determined times and according to the determined sequence. The scheduler, at its discretion, may schedule a request after its requested deadline in response to receiving a new request command from a client. The scheduler may allow a sleep set corresponding to a sleep processor state to power off a processor.

32 Claims, 29 Drawing Sheets

| ACTIVE/SLEEP TRIGGER SETS | | | |
|---|---|---|---|
| | SLEEP | ACTIVE | TIMER |
| INTERRUPT | SHUT DOWN | BRINGUP | <TIME> |
| FROM SET | FROM ANY # | SLEEP | SLEEP |
| GOTO SET | SLEEP | TO ANY # | TO ANY # |

| |
|---|
| Thread Configuration Data - 2205 |
| Scheduler Latency - 2210 |
| Minimum Scheduler Delta - 2215 |
| Request Latency - 2220 |
| Fork Lookahead Delta - 2225 |
| Fork Latency - 2230 |
| Join Latency - 2235 |
| Sleep Wake Transition Latency - 2240 |
| Time Queue Latency - 2245 |
| LPR Enter Latency - 2250 |
| LPR Exit Latency - 2255 |
| LPR Now Delta -2260 |
| Schedule Resource Definitions: - 2265 |
| Scheduled Linked List -2270 |
| Request State - 2275 |
| Request Time - 2280 |
| Start Time -2285 |
| Late Probability - 2287 |
| Callback Notification - 2290 |
| Latest Notify State - 2293 |
| Request Lateness - 2295 |

FIG. 22

METHOD AND SYSTEM FOR SCHEDULING REQUESTS IN A PORTABLE COMPUTING DEVICE

PRIORITY AND RELATED APPLICATIONS STATEMENT

This application claims priority under 35 U.S.C. §119(e) to U.S. Provisional Patent Application Ser. No. 61/602,287, filed on Feb. 23, 2012, entitled, "METHOD AND SYSTEM FOR SCHEDULING REQUESTS IN A PORTABLE COMPUTING DEVICE." The entire contents of which are hereby incorporated by reference.

DESCRIPTION OF THE RELATED ART

Portable computing devices ("PCDs") are becoming increasingly popular. These devices may include cellular telephones, portable/personal digital assistants ("PDAs"), portable game consoles, portable navigation units, palmtop computers, and other portable electronic devices. Each of these devices may have a primary function. For example, a cellular telephone generally has the primary function of receiving and transmitting telephone calls.

In addition to the primary function of these devices, many include peripheral functions. For example, a cellular telephone may include the primary function of making cellular telephone calls as described above, and the peripheral functions of a still camera, a video camera, global positioning system (GPS) navigation, web browsing, sending and receiving e-mails, sending and receiving text messages, and push-to-talk capabilities, etc. As the functionality of PCDs increases, the computing or processing power required to support such functionality also increases. Processing power may be increased by increasing the number of processors in the PCD. As the computing power and number of processors increases, there exists a greater need to effectively manage the processors.

Functions such as those described above may be embodied in various corresponding hardware and software elements that may be referred to as resources. A processor may request various resources at various times under control of software, such as an application program. In a multi-processor PCD, a first processor may control resources that are different from the resources controlled by a second processor. In the conventional art, managing resources efficiently across processors may be very complex and difficult for conserving power consumed by these resources.

SUMMARY

A method and system for managing requests among resources within a portable computing device are disclosed. The method and system include a scheduler receiving data from a client for scheduling a plurality of requests. Each request identifies at least one resource and a requested deadline. Next, data from the client is stored by the scheduler in a database. The scheduler then determines times and a sequence for processing the requests based on requested deadlines in the requests and based on current states of resources within the portable computing device. The scheduler then communicates the requests to the resources at the determined times and according to the determined sequence.

The scheduler, at its discretion, may schedule a request after its requested deadline in response to receiving a new request command from a client. The scheduler may allow a sleep set corresponding to a sleep processor state to power off a processor such that the processor may continue working on one or more scheduled requests when the processor exits the sleep processor state. If the scheduler receives an unexpected request during a scheduled sleep state, then it may determine if one or more scheduled requests are needed to respond to the unexpected request. If one or more scheduled requests are not needed to respond to the unexpected request during the scheduled sleep state, then the scheduler may cancel one or more scheduled requests and then reschedule one or more of the cancelled scheduled requests to occur in a next scheduled active state.

BRIEF DESCRIPTION OF THE DRAWINGS

In the figures, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

FIG. 16 illustrates an exemplary active-sleep trigger set for a processor;

FIG. 22 is a diagram illustrating exemplary contents of the scheduler database;

DETAILED DESCRIPTION

Figure 1:
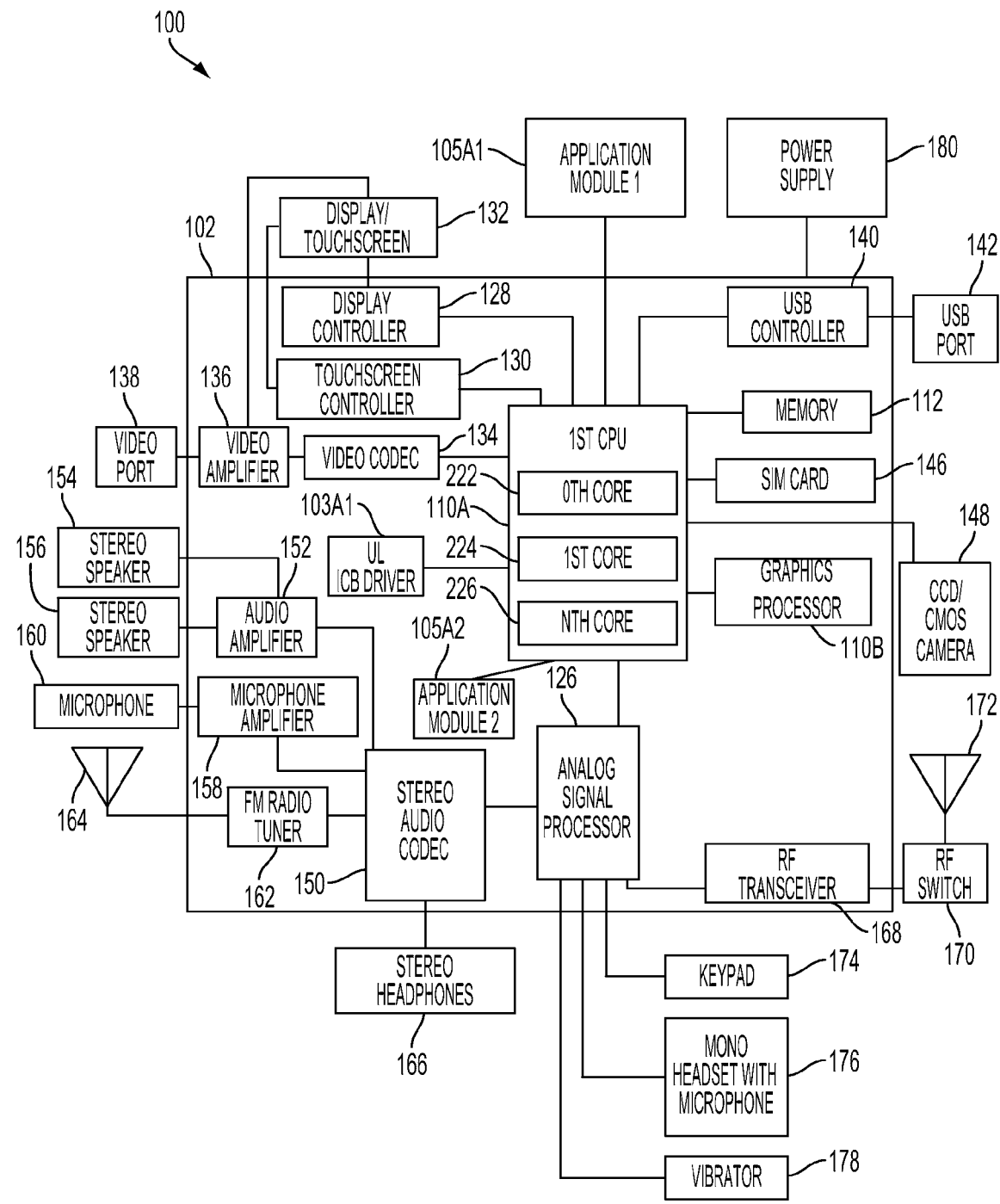
FIG. 1 is a functional block diagram illustrating exemplary elements of a system for distributed resource management in a portable computing device ("PCD")

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone," "wireless communication device," and "wireless handset" are used interchangeably. With the advent of third generation ("3G") and fourth generation ("4G") wireless technology, greater bandwidth availability has enabled more portable computing devices with a greater variety of wireless capabilities.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") and fourth generation ("4G") wireless technology, have enabled numerous PCDs with multiple capabilities. Therefore, a PCD may be a cellular telephone, a satellite telephone, a pager, a personal digital assistant ("PDA"), a smartphone, a navigation device, a smartbook or reader, a media player, a combination of the aforementioned devices, and a laptop computer with a wireless connection, among others.

FIG. 1 is a functional block diagram of an exemplary, non-limiting aspect of a PCD 100 in the form of a wireless telephone for implementing methods and systems for distributed resource management in a portable computing device. As shown, the PCD 100 includes an on-chip system 102 that has a multi-core, central processing unit ("CPU") 110A, a graphics processor 110B, and an analog signal processor 126. These processors 110A, 110B, 126 may be coupled together on one or more system busses or another interconnect architecture, as known to one of ordinary skill in the art.

The CPU 110A may comprise a zeroth core 222, a first core 224, etc., through an Nth core 226, as understood by one of ordinary skill in the art. In alternative embodiments, instead of CPU 110A and a graphics processor 110B, one or more digital signal processors ("DSPs") may also be employed as understood by one of ordinary skill in the art. Further, in alternative embodiments, two or more multi-core processors may be included.

Figure 2:
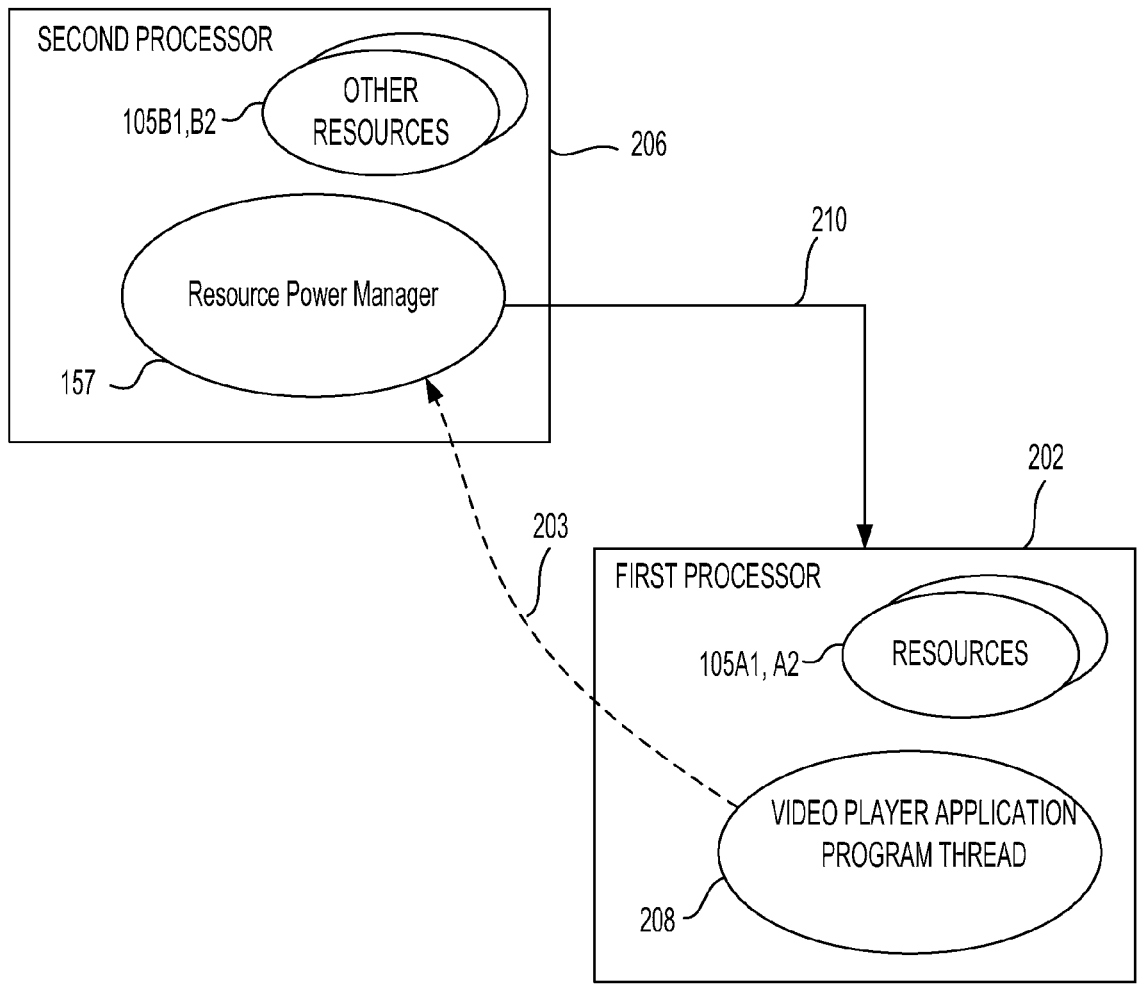
FIG. 2 is a functional block diagram illustrating an example of an instance in which a first processor needs to request a resource controlled by a second processor.

As illustrated in FIG. 1, a display controller 128 and a touchscreen controller 130 are coupled to the multi-core CPU 110A. A touchscreen display 132 external to the on-chip system 102 is coupled to the display controller 128 and the touchscreen controller 130. Also included in PCD 100 is a video coder/decoder ("codec") 134, e.g., a phase-alternating line ("PAL") encoder, a sequential couleur avec memoire ("SECAM") encoder, a national television system(s) committee ("NTSC") encoder or any other type of video encoder 134 coupled to the multi-core central processing unit ("CPU") 110A. A video amplifier 136 is coupled to the video encoder 134 and the touchscreen display 132. A video port 138 is coupled to the video amplifier 136. As depicted in FIG. 2, a universal serial bus ("USB") controller 140 is coupled to the CPU 110A. Also, a USB port 142 is coupled to the USB controller 140. A subscriber identity module (SIM) card 146 may also be coupled to the CPU 110A. Further, as shown in FIG. 1, a digital camera 148 may be coupled to the CPU 110A. In an exemplary aspect, the digital camera 148 is a charge-coupled device ("CCD") camera or a complementary metal-oxide semiconductor ("CMOS") camera.

As further illustrated in FIG. 1, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 1 shows that a microphone amplifier 158 may be also coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 1 further indicates that a radio frequency ("RF") transceiver 168 may be coupled to the analog signal processor 126. An RF switch 170 may be coupled to the RF transceiver 168 and an RF antenna 172. As shown in FIG. 1, a keypad 174 may be coupled to the analog signal processor 126. Also, a mono headset with a microphone 176 may be coupled to the analog signal processor 126. Further, a vibrator device 178 may be coupled to the analog signal processor 126. FIG. 1 also shows that a power supply 180, for example a battery, is coupled to the on-chip system 102. In a particular aspect, the power supply 180 includes a rechargeable battery or a direct current ("DC") power supply that is derived from an alternating current ("AC")-to-DC transformer that is connected to an AC power source.

Some of the above-described elements of the PCD 100 may comprise hardware, while others may comprise software, and still others may comprise a combination of hardware and software. The term "resource" is used herein to refer to any such element, whether hardware, software or a combination thereof, that is controllable by a processor. A resource may be defined in one aspect as an encapsulation of the functionality of such an element. Except where it may otherwise be indicated, the term "processor" or "master processor" is used herein to refer to a processor such as the CPU 110, graphics processor 110B, the analog signal processor 126, or to any other processor, controller or similar element that operates under the control of software, firmware, or similar control logic.

As described in further detail below, an example of a resource is a software element that executes on a processor. A thread of execution on a processor, such as, for example, a thread relating to an executing application program, may access a resource by causing a "request" to be issued on the resource. As described below, resource requests are processed through a software-based system referred to in this disclosure as a "framework."

The term "client" is used broadly in this disclosure to refer to an element that effects the function of requesting a resource. Thus, as the terms are used herein, a thread may create or make use of a client for the purpose of issuing resource requests. It should be noted that, in some instances, a resource may create or use a client, such that a resource may cause a resource request to be issued against another resource. As described in further detail below, such other resource may be referred to herein as a "dependent" resource due to a dependency relationship between the requesting resource and requested resource. Resources and clients may be represented by data structures in memory.

Since resources are controlled by specific processors in a multi-processor PCD 100, not every processor in PCD 100 has access to every resource in PCD 100. FIG. 2 illustrates an example of an instance in which it may be desirable for a first processor 202 in PCD 100 to issue a resource request 203 against a resource power manager 157 controlled by a second processor 206 in PCD 100. Note that the first processor 202 may also control a plurality of resources 105A1, 105A2. Likewise, the second processor 206 may control a plurality of additional resources 105B1, 105B2.

In an instance in which the first processor 202 is executing a thread 208 relating to, for example, a video player application program, the thread 208 may call for adjustment of one or more operating parameters of the first processor 202 that enhance the performance of the first processor 202. (Although thread 208 and the resource power manager 157 are conceptually illustrated as residing in their respective processors 202 and 206 for purposes of clarity, one of ordinary skill in the art understands that such elements are executed or otherwise operated upon by the processor in the processor's memory space in accordance with well understood computing principles.) Such operating parameters may include, for example, clock speed and bus speed.

For example, various processors may use the same bus clock, but only one of the processors may have direct (hardware-level) control of the bus clock. Increasing clock speed may result in better performance by, for example, a video player application program, since the playback of video is generally a more processing power-intensive task than some other tasks. As processing power is commonly expressed in millions of instructions per second ("MIPS"), the thread 208 may issue a call for a certain number of MIPS. The resource power manager 157 may include an algorithm that, in response to a request for a specified number of MIPS, causes changes in signals 210 that may represent clock speed, bus speed or other parameters that promote the first processor 202 operating at the requested MIPS level.

It may be possible for a thread to access the resource power manager 157 through an application program interface (API) specific to a bus or protocol through which the first processor 202 may communicate with the second processor 206. However, the framework described below may provide a more uniform way to handle resource requests than a resource-specific and bus-specific API. As described below, via the framework, resource requests are issued and serviced in a uniform manner without regard to whether the request is against a resource controlled by the same processor from which the resource request is issued or against a resource controlled by a different processor. A resource controlled by the same processor from which the resource request is issued may be referred to as a "native" resource. A resource controlled by a processor other than that from which the resource request is issued may be referred to herein as a "remote resource" or "distributed resource."

In addition, issuing a request against a remote resource incurs processing overhead in the form of a time delay or latency. That is, a certain amount of time is required for the message or messages relating to the resource request to be sent between processors. In some instances, a single resource request may result in multiple inter-processor messages.

Figure 3:
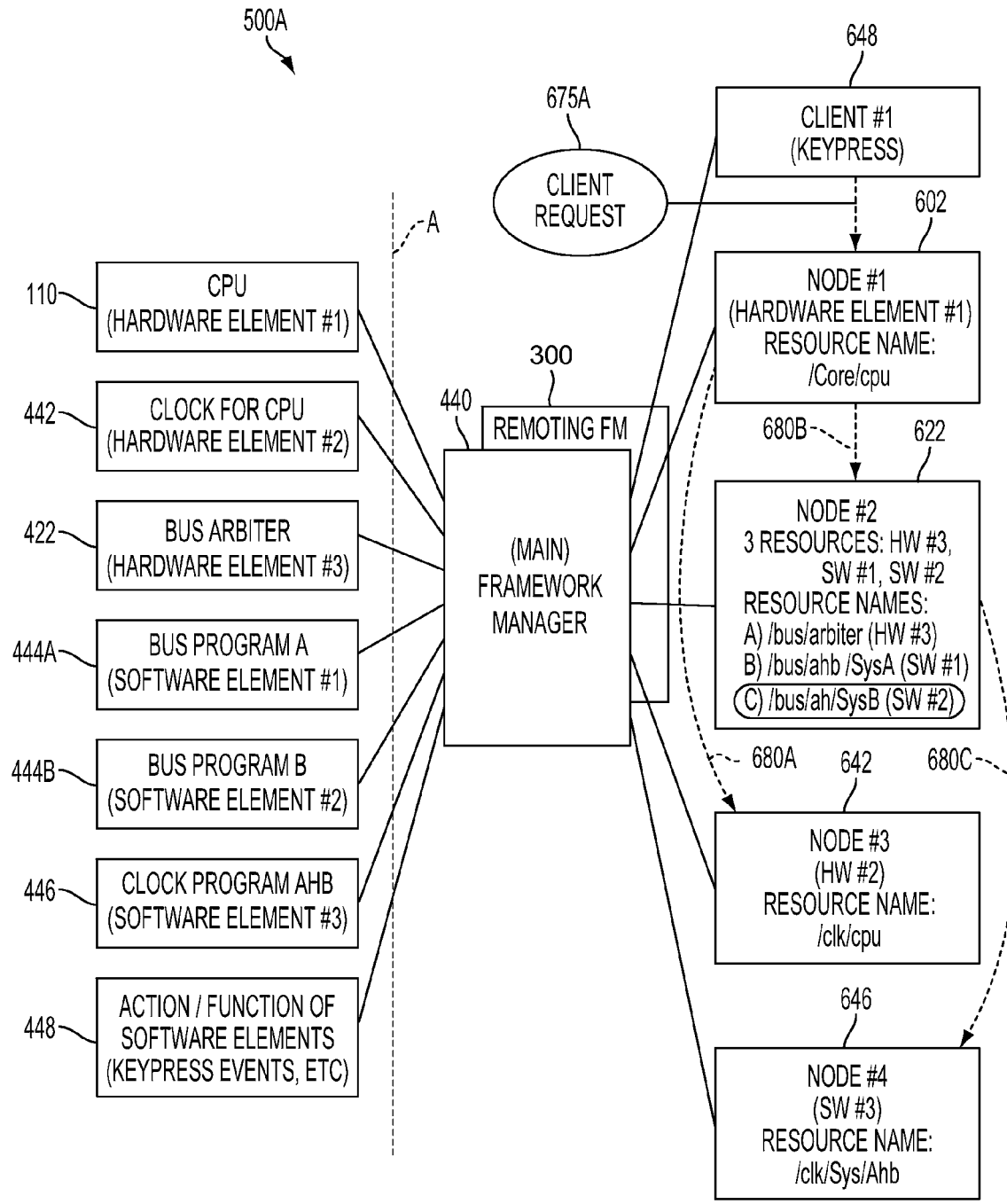
FIG. 3 is a diagram of a first aspect of a node architecture that manages resources of a PCD.

FIG. 3 is a diagram comprising functional blocks which represent software or hardware (or both) of the PCD 100. The blocks to the left of the line "A" represent resources of the PCD 100 that are controlled by the CPU 110A. Such resources may include: the CPU 110A itself, also referred to generally as the first hardware element (hardware element #1); a clock 442 for the CPU 110A, also referred to generally as the second hardware element (hardware element #2); a bus arbiter or scheduler 422, also referred to generally as the third hardware element (hardware element #3); a bus program A—444A, also referred to generally as the first software element (software element #1); a bus program B—444B, also referred to generally as the second software element (software element #2); a clock program AHB, referred to generally as the third software element (software element #3); and an action or function monitored by a software element generally indicated as a keypress 448.

The CPU 110A controls or has access to the above-referenced resources because the resources are within the memory space of the CPU 110A and no other restrictions, such as security restrictions, exist that would inhibit CPU 110A from accessing those resources. For example, CPU 110A may be capable of controlling or accessing hardware registers of those resources. It should be noted that PCD 100 may include other CPUs 110 (see, e.g., FIG. 2) that control or have access to resources other than the above-referenced resources.

A framework manager 440, which may comprise a library of computer instructions, manages nodes that encapsulate functionality of the resources. That is, the nodes may be accessed to indirectly access the resources. For convenience, a node encapsulating the functionality of a resource may be referred to herein as including, comprising, having, etc., the resource. Each node may include one or more resources. The nodes may be defined in software code, firmware, or a similar medium, and instantiated as data structures in, for example, memory 112 (FIG. 1) during operation of the PCD 100.

The nodes 601 may be instantiated during a start-up, power-up, initialization, boot-up, etc., sequence, or at any other suitable time during operation of the PCD 100. It should be noted that a reference herein to instantiating, issuing a request on, or otherwise interacting with a resource should be understood as meaning interacting with a node that includes that resource. For the remainder of this disclosure, a generic or non-specific node will be designated with reference numeral 601 as described below with reference to FIG. 5.

Nodes 601 may include, for example, a first node 602 having a single resource that generally corresponds with the first hardware element or central processing unit 110. With the software architecture described in this disclosure, each resource of a node 601 may be provided with a unique name comprising one or more alphanumeric characters. In the exemplary embodiment illustrated in FIG. 3, the resource of the first node 602 has been assigned the resource name of "/core/cpu." This exemplary resource name generally corresponds to conventional file naming structures known to one of ordinary skill in the art. However, as recognized by one of ordinary skill the art, other types of resource names containing any other combination of alpha-numeric characters and/or symbols are well within the scope of this disclosure.

Nodes 601 may further include, for example, a second node 622 having a plurality of resources. In this exemplary embodiment, the second node 622 has a first resource comprising a single hardware element corresponding to the bus arbiter or scheduler 422. The second resource of the second node 622 comprises a software element generally corresponding to the first software element of the bus program A 444A. The third resource of the second node 622 comprises another software element generally corresponding to the second software element of the bus program B 444B. One of ordinary skill in the art recognizes that any combination and any number of resources and resource types for a given node 601 are well within the scope of this disclosure.

FIG. 3 also illustrates a first client 648 that generally corresponds to an action or function of the two software elements 448, 450. In the exemplary embodiment illustrated in FIG. 3, the first client 648 generally corresponds to a keypress action that may occur within a particular application program module 105 supported by the portable computing device 100. However, one of ordinary skill in the art recognizes that other actions and/or functions of software elements besides keypresses are well within the scope of this disclosure. Further details about client requests 648 and their respective creation will be described below in connection with FIG. 11.

FIG. 3 also illustrates relationships between particular architectural elements. For example, FIG. 3 illustrates a relationship between the client 648 and the first node 602. Specifically, the first client 648 may generate a client request 675A, illustrated with dashed lines, which is managed or handled by the first node 602 that comprises the resource "/core/cpu." Typically, there are a predetermined or set number of types of client requests 675. Client requests 675 will be described in further detail below in connection with FIG. 11.

Other relationships displayed in FIG. 3 include dependencies illustrated with dashed lines 680. Dependencies are relationships between respective resources of another node 601. A dependency relationship usually indicates that a first resource (A) is reliant upon a second resource (B) that may provide the first resource (A) with information. This information may be a result of an operation performed by a second resource (B) or it may simply comprise status information that is needed by the first resource (A) or any combination thereof. The first resource (A) and second resource (B) may be part of the same node 601 or they may be part of different nodes 601. It should be noted that client requests 675 may originate not only from threads of execution, such as in the example of the above-described keypress action, but also from other nodes 601. To obtain information from a dependent node 601, a node 601 may issue a client request 675 to its dependent node 601. Thus, the dashed lines 680 that indicate dependencies may also indicate the direction of potential client requests 675.

In FIG. 3, the first node 602 is dependent upon the second node 622 as indicated by the dependency arrow 680B which originates with the first node 602 and extends to the second at 622. FIG. 3 also illustrates that the first node 602 is also dependent upon the third node 642 as illustrated by the dependency arrow 680A. FIG. 3 also illustrates that the second node 622 is dependent upon the fourth node 646 as illustrated by the dependency arrow 680C. One of ordinary skill in the art recognizes that the dependencies 680 illustrated with the dashed arrows of FIG. 3 are only exemplary in nature and that other combinations of dependencies between respective nodes 601 are within the scope of this disclosure.

The framework manager 440 is responsible for maintaining the relationships described above, that include, but are not limited to, the client requests 675 and the dependencies 680 illustrated in FIG. 3. Some such relationships, such as dependencies, exist at a PCD start-up time (i.e., power-up, initialization, boot-up, etc.) by virtue of the way the resources and their nodes 601 have been defined in the software code in PCD 100 that the framework manager 440 accesses at such a start-up time to begin the node instantiation process. Other such relationships, such as client requests 675, arise after nodes 601 have been instantiated, such as during execution of an application program thread in which an application program invokes a resource. Whether client requests 675 originate from executing application program threads or similar elements other than nodes 601 (e.g., client request 675A) or originate from a node 601, client requests 675 are directed through the framework manager 440. The framework manager 440 directs the transfer of information among the nodes 601. Conceptually, the framework manager 440 serves as a matrix through which multiple threads may essentially concurrently communicate with the nodes 601. Though different threads may involve different data, the same framework manager software code may service multiple threads.

As described below in further detail, the framework manager 440 may instantiate a node 601 as soon as the node's dependent nodes are instantiated, i.e., when the dependencies 680 for any given node 601 have been resolved. The framework manager 440 attempts to instantiate all nodes 601 that have been defined in the software architecture of PCD 100. A dependency 680 is completed or resolved when a resource that supports a dependency is in existence or is in a ready state for handling information that relates to the dependency 680.

For example, the first node 602 comprising the single resource "/core/cpu" may not be instantiated by the framework manager 440 if the third node 642 comprising the single resource "/clk/cpu" has not been instantiated because of the dependency relationship 680A that exists between the first node 602 and the third node 642. Once the third node 642 has been instantiated by the framework manager 440, then the framework manager 440 may instantiate the second node 602 because of the dependency relationship 680A.

If the framework manager 440 is unable to instantiate a particular node 601 because one or more of its dependencies 680 are incomplete or unresolved, the framework manager 440 will continue running or executing steps corresponding to those nodes 601 that were instantiated successfully. The framework manger 440 will usually skip over a call for a particular node 601 that may not exist due to incomplete dependencies in which dependent resources have not been created, and return messages to that call which reflect that incomplete status.

In a multi-core environment, such as illustrated in FIG. 1, the framework manager 440 may create or instantiate nodes 601 on separate cores, such as the 0th, first and Nth cores 222, 224, and 226 of FIG. 1. Nodes 601 may generally be created in a multi-core environment on separate cores and in parallel as long as the nodes 601 are not dependent on one another and if all of a particular node's corresponding dependencies, as described below, are complete. In a multi-processor environment, the nodes 601 may be created or instantiated on various processors, such as the CPU 110A, graphics processor 110B, etc., of FIG. 1. That is, some nodes 601 may exist in the memory space of one processor, while other nodes 601 may exist in the memory space of another processor. It should be noted, however, that nodes 601 on one processor may not be accessible to nodes 601 on the other processor via only framework manager 440.

A remoting framework manager 300 that is similar to the above-described (main) framework manager 440 may exist in parallel with the framework manager 440. The remoting framework manager 300 cooperates with or works with the framework manager 440 to coordinate inter-processor information transfers between nodes 601 on different processors. That is, the remoting framework manager 300 helps framework manager 440 maintain the relationships described above, such as dependencies and client requests, in instances in which the nodes 601 that are involved exist on different processors.

Thus, nodes 601 on one processor may not rendered accessible to nodes 601 on another other processor via the combined effect of framework managers 440 and 300. Moreover, the combination of framework managers 440 and 300 may perform all of the functions ascribed in this disclosure to framework manager 440, whether the nodes 601 that are involved exist on the same processor different processors. In such a multi-processor embodiment, individual copies of the software that framework managers 300 and 440 comprise may reside in the domain of each of the processors. Thus, each processor has access to the same framework manager software.

Figure 4:
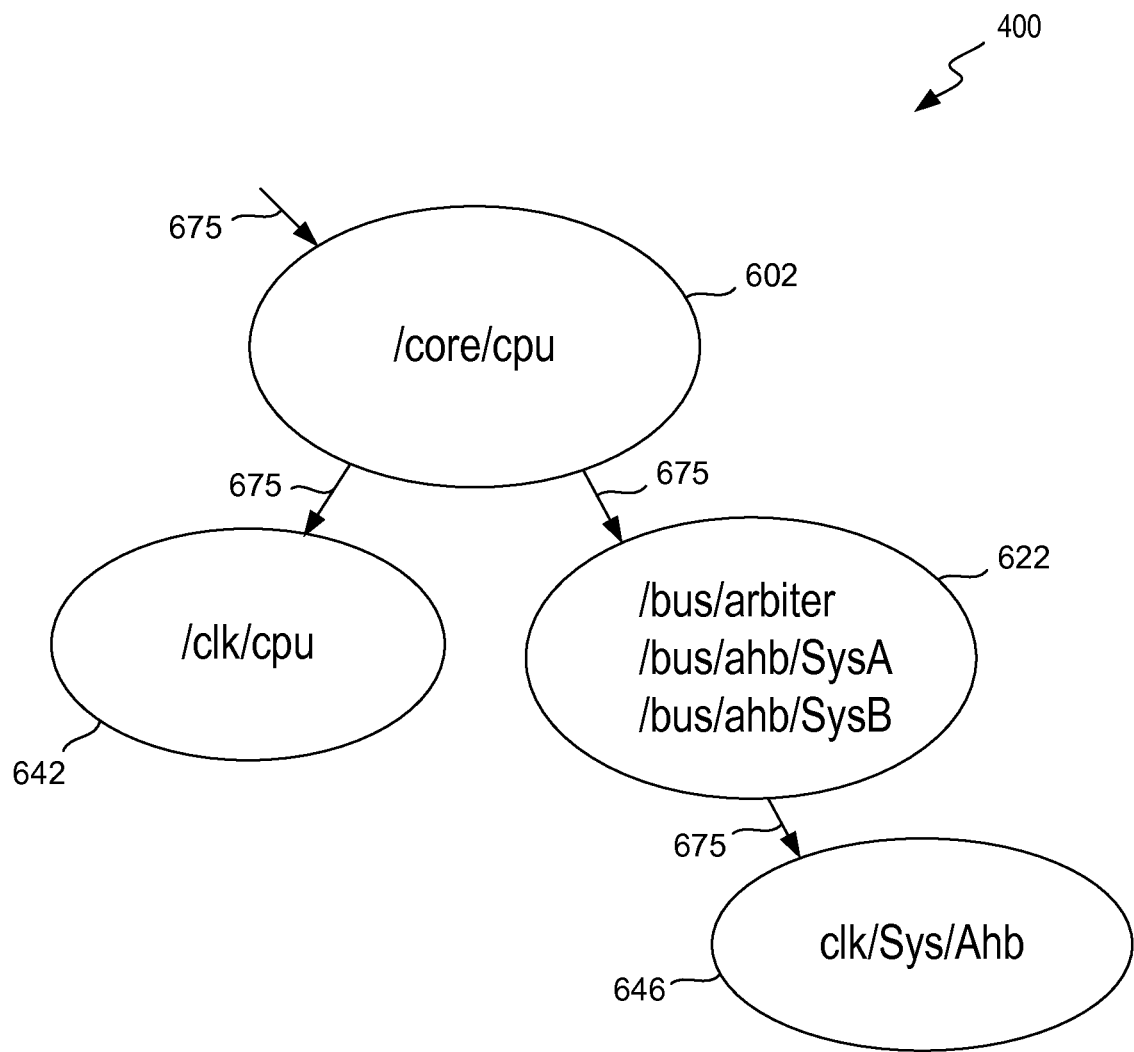
FIG. 4 is a directed acyclic resource graph for a group of exemplary resources of a PCD.

FIG. 4 conveniently reorganizes the above-described nodes 602, 622, 642 and 646 in the form of a directed acyclic graph ("DAG") 400. The graph 400 is another way of defining the software architecture described above. In the lexicon of graph theory, the vertices of the graph 400 correspond to the nodes 601, the edges of the graph 400 correspond to client requests 675, and adjacent nodes or vertices represent resource dependencies. One of ordinary skill in the art will recognize that the graph 400 is a directed graph as a result of the dependencies and is acyclic because the framework manager 440 prevents a cycle from being defined in which resource A depends on resource B and resource B depends on resource A. That is, the framework manager 440 will not instantiate two nodes 601 that are (erroneously) defined to depend on each other.

The acyclic property of the graph is important to prevent deadlocks, since, as described below, each node 601 is locked (in a transaction processing sense) when it is accessed. If two nodes 601 were to depend on each other in an instance in which a first thread were to access and lock one of these two nodes 601 at the same time that a second thread were to access and lock the other of these two nodes 601, both threads would be hung.

However, in the relatively rare instances in which a software developer or other such person involved in defining the software architecture deems it desirable to define in the software architecture two resources that depend on each other, the two (or more) resources may be included in the same node 601 as each other. Two resources in the same node will share the same lock state. It is at least in part for this reason that a software developer or other such person may choose to define a plural-resource node such as node 622 in the architecture.

Although this disclosure may, for purposes of clarity and convenience, reference a "node" 601 rather than a "resource" of the node 601, it should be understood that client requests may be directed to specified resources rather than nodes. In other words, a node 601, which, as described above, may be a data structure encapsulating of the functionality of one or more resources, may be transparent from the perspective of a client or other issuer of a client request such as another node 601. From the perspective of a client, a request is issued against a resource rather than a node. Likewise, from the perspective of a client, a state query, event, or other element of the architecture is associated with a resource rather than a node.

A resource graph such as the exemplary graph 400 is useful for understanding the instantiation of nodes 601 in accordance with dependencies, described below with regard to FIGS. 6-10. Leaf nodes, such as the nodes 642 and 646, are instantiated before non-leaf nodes, because leaf nodes have no dependencies. In general a node 601 must be instantiated before a node that depends on it may be instantiated. Furthermore, it can be seen that servicing a resource request corresponds to traversing a directed acyclic graph in which the vertices correspond to the nodes 601, the edges correspond to client requests 675, and adjacent nodes or vertices represent resource dependencies.

In a multi-processor PCD 100, a first processor may have access to or be capable of controlling a first set of nodes 601 in a first resource graph, while a second processor may have access to or be capable of controlling a second set of nodes 601 in a second resource graph, where the first and second resource graphs do not share any resources, i.e., they are mutually exclusive of resources. That is, in such an environment, each processor has its own resource graph that defines relationships among resources and other elements that are not accessible to other processors. The distributed resource management of the present disclosure relates to maintaining the relationships described above, such as dependencies and client requests, in instances in which two or more processors each have access to resources in their own resource graphs and do not have access to resources in other processors' resource graphs.

The above-referenced limitation upon access to resources may, in some embodiments, be limited by hardware configuration. That is, a processor may have no means by which it can affect a hardware device, such as a register, because the hardware device is controlled by or in the memory space of another processor. Alternatively, or in addition, the limitation upon access to resources may be imposed in software, for reasons such as minimizing exposure of a processor to security risks (e.g., a virus that may be infecting another processor).

Figure 5:
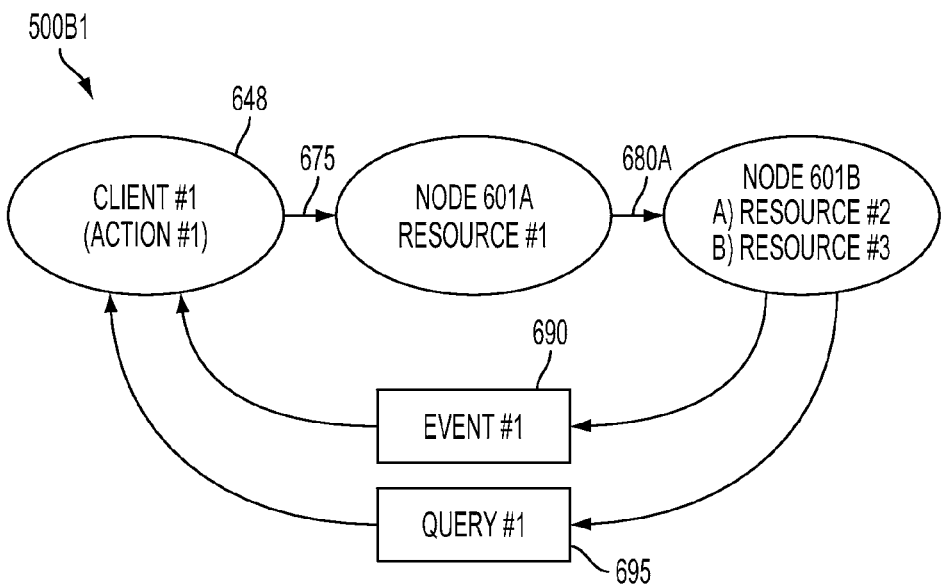
FIG. 5 is a general diagram of a second aspect of the node architecture that manages resources of a PCD.

FIG. 5 is a general diagram of another aspect of a software architecture 500B1 for a system that manages resources of a PCD 100 of FIG. 1. This aspect is described for purposes of clarity in the context of a PCD 100 and architecture in which all resources and other elements that are involved are controlled by the same processor, i.e., they are included in the same resource graph. In this general diagram, the one or more resources of each node 601 have not been provided with unique names. The node or resource graph 500B1 of FIG. 5 comprises only the nodes 601, clients 648, events 690, and query functions 695 supported by the architecture or framework manager 440. Each node 601 has been illustrated with an oval shape and arrows 680 with specific directions which represent respective dependencies between resources within a node 601.

FIG. 5 also illustrates how a client 648 of the first node 601A may issue a client request 675 to the first node 601A. After these client requests 675 are issued, the second node 601B may trigger an event 690 or provide a response to a query 695, in which messages corresponding to the event 690 and the query 695 flow back to the client 648.

Figure 6:
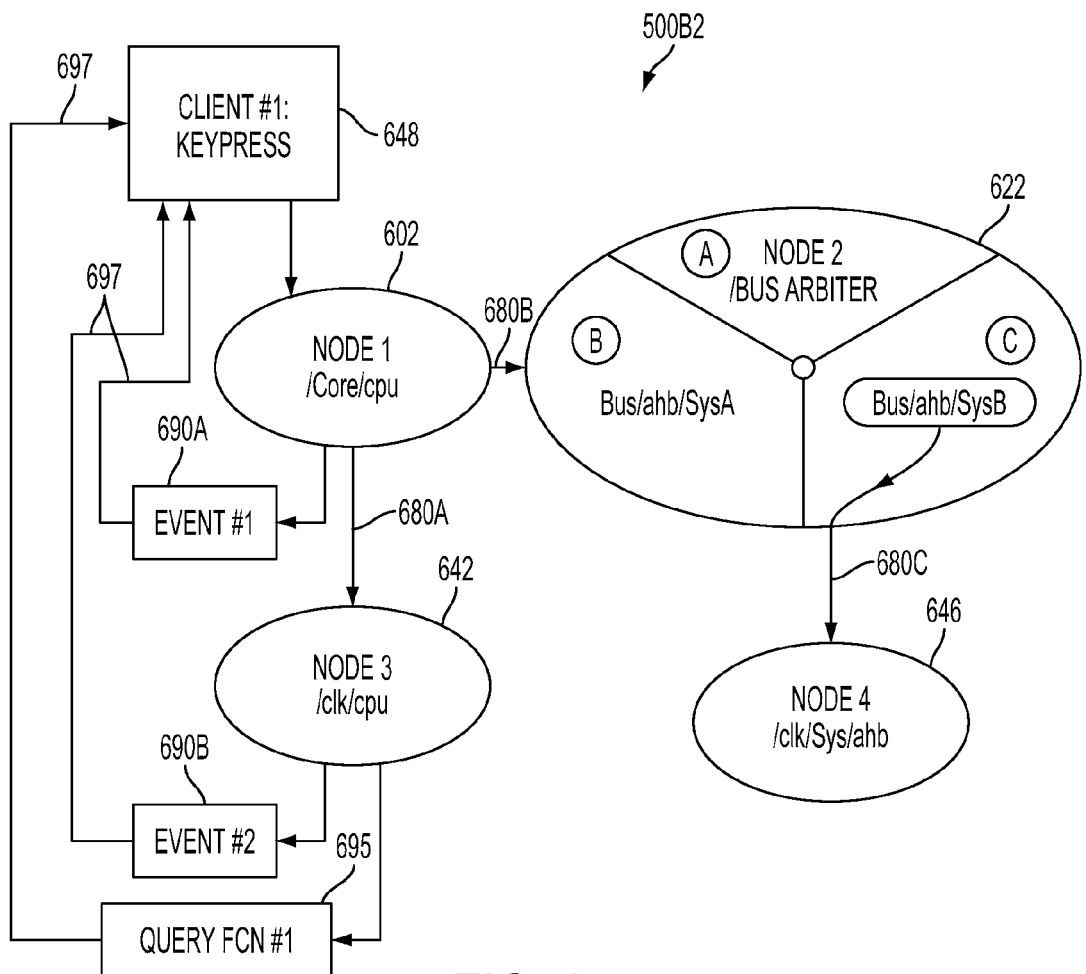
FIG. 6 is specific diagram of a second aspect of the node architecture that manages resources of a PCD.

FIG. 6 is a more specific diagram of the above-described aspect of the software architecture 500B1 for a system that manages resources of a PCD 100 of FIG. 1. FIG. 6 illustrates a node or resource graph 500B2 that comprises only the nodes 601 with specific, yet exemplary resource names, as well as clients 648, events 690, and query functions 695 corresponding to those of FIG. 3. Each node 601 has been illustrated with an oval shape and arrows 680 with specific directions which represent respective dependencies between resources within a node 601.

For example, the first node 602 has a dependency arrow 680B to indicate that the first node 602 is dependent upon the three resources of the second node 622. Similarly, the third resource "/bus/ahb/sysB/" comprising the second software element 444B and generally designated with the reference letter "C" in FIG. 11C has a dependency arrow 680C that indicates this third resource (C) is dependent upon the single "/clk/sys/ahb" resource of the fourth node 646.

FIG. 6 also illustrates the output data from nodes 601 which may comprise one or more events 690 or query functions 695. A query function 695 is similar to an event 690. The query function 695 may have a query handle that may or may not be unique. The query function is generally not externally identified and generally it does not have a state. The query function 695 may be used to determine the state of a particular resource of a node 601. The query function 695 and the events 690 may have relationships with an established client 648 and these relationships are represented by directional arrows 697 to indicate that information from respective event 690 and query function 695 are passed to a particular client 648.

The node or resource graphs 500B of FIG. 5-6 represent relationships which exist in memory under the control of a processor and which are managed by the framework manager 440. The node or resource graph 500B may be automatically generated by the framework manager 440 as a useful tool for identifying relationships between respective elements managed by the framework manager 440 and for troubleshooting by a software team.

Figure 7:
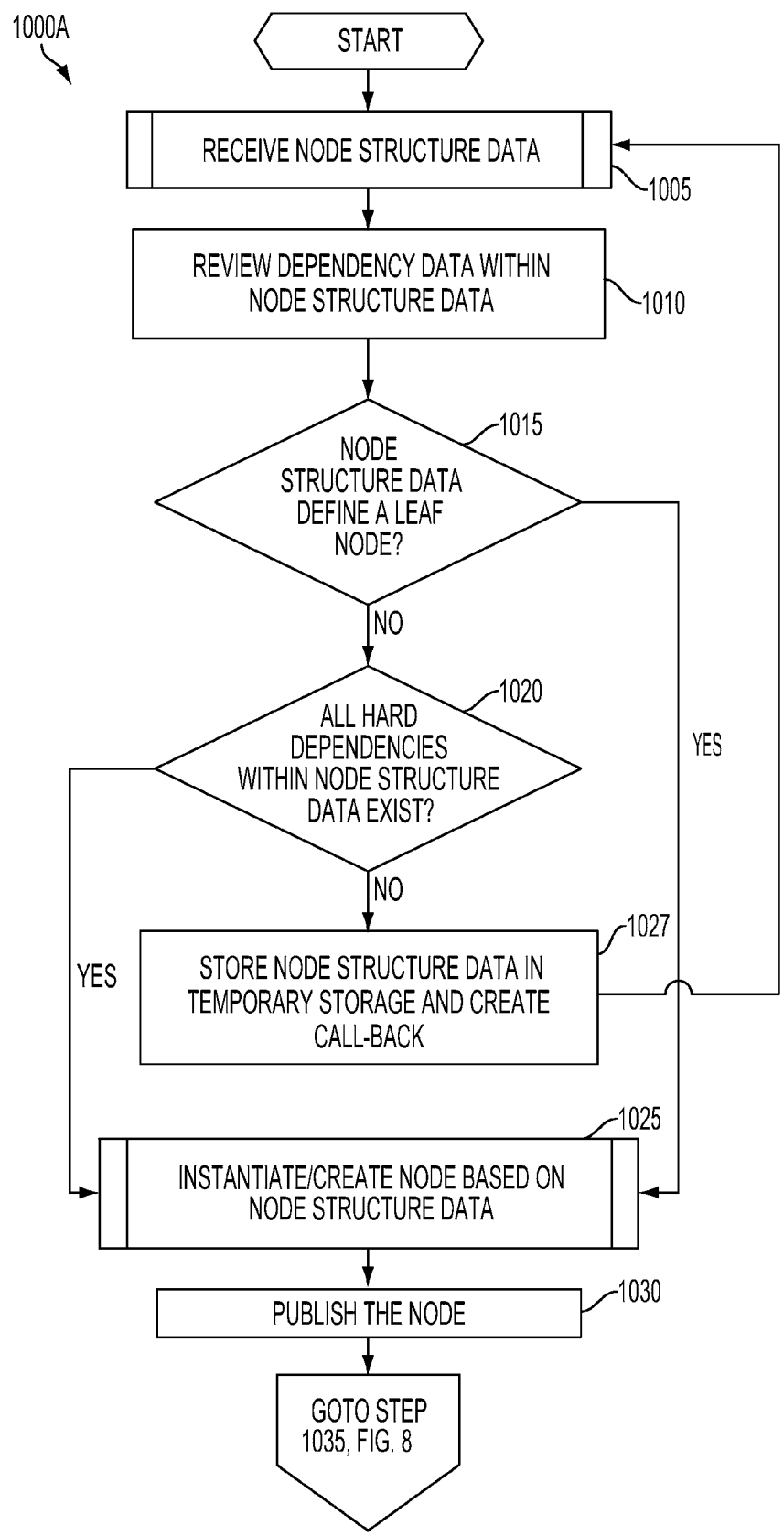
FIG. 7 is a flowchart illustrating a method for creating a node architecture for managing resources of a PCD.

FIG. 7 is a flowchart illustrating a method 1000A for creating or instantiating software structures for managing resource(s) of a PCD 100. This method is described for purposes of clarity in the context of an architecture in which all resources and other elements that are involved are controlled by the same processor, i.e., they are included in the same resource graph.

Block 1005 is the first routine of the method or process 1000 for managing resources of a PCD 100. In block 1005, a routine may be executed or run by the framework manager 440 for receiving node structure data. The node structure data may comprise a dependency array that outlines the dependencies a particular node 601 may have with other nodes 601. Further details about node structure data and this routine or submethod 1005 will be described in more detail below in connection with FIG. 9.

Next, in block 1010, the framework manager 440 may review the dependency data that is part of the node structure data received in block 1005. In decision block 1015, the framework manager 440 may determine if the node structure data defines a leaf node 601. A leaf node 601 generally means that the node to be created based on the node structure data does not have any dependencies, such as the nodes 642 and 646 in FIGS. 3-4. If the inquiry to decision block 1015 is positive, meaning that the node structure data for creating the current node does not have any dependencies, then the framework manager 440 continues to routine block 1025.

If the inquiry to decision block 1015 is negative, then the "No" branch is followed to decision block 1020 in which the framework manager determines if all of the hard dependencies within the node structure data exist. A hard dependency may comprise one in which a resource cannot exist without it. Meanwhile, a soft dependency may comprise one in which a resource may use the dependent resource as an optional step. A soft dependency means that a node 601 or resource of the node 601 which has a soft dependency may be created or instantiated within the node architecture even when the soft dependency does not exist.

An example of a soft dependency may comprise an optimization feature that is not critical to the operation for a resource oriented node 601 containing multiple resources. The framework manager 440 may create or instantiate a node or a resource for all hard dependencies that are present even when a soft is dependency is not present for those nodes or resources which have soft dependencies that are not created. A call back feature may be used to reference the soft dependency so that when the soft dependency becomes available to the framework manager 440, the framework manager 440 will inform each callback referencing the soft dependency that the soft dependencies are now available.

If the inquiry to decision block 1020 is negative, then the "No" branch is followed to block 1027 in which the node structure data is stored by the framework manager 440 in temporary storage such as memory and the framework manager 440 creates a call back feature associated with this un-instantiated node.

If the inquiry to decision block 1015 is positive, then the "Yes" branch is followed to routine 1025 in which a node 601 is created or instantiated based on the node structure data received in routine block 1005. Further details of routine block 1025 will be described below in connection with FIG. 9. Next, in block 1030, the framework manager 440 publishes the newly created node 601 using its unique resource name(s) so that other nodes 601 may send information to or receive information from the newly created node 601.

Figure 8:
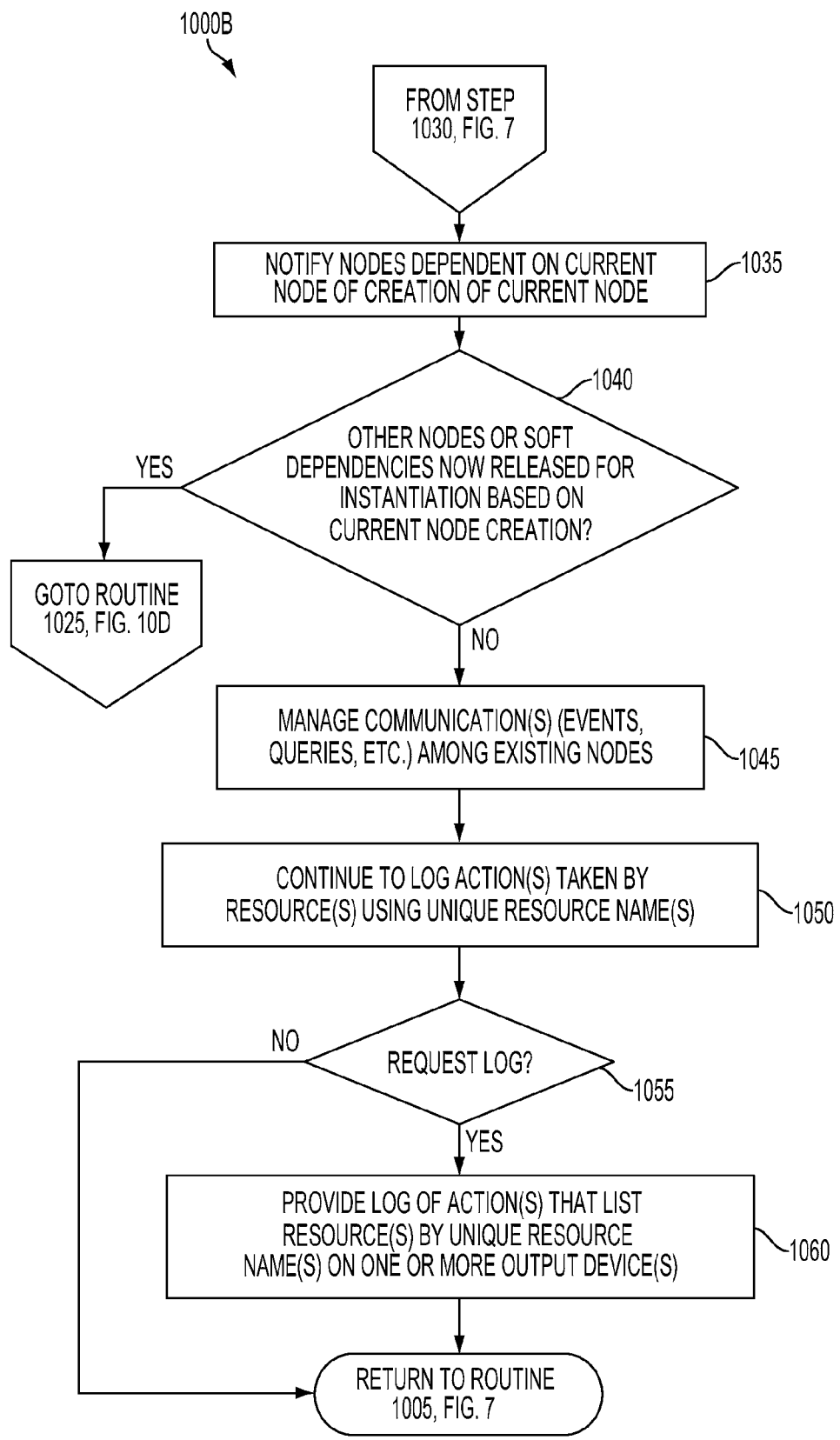
FIG. 8 is a continuation flowchart of FIG. 7 illustrating a method for creating a node architecture for managing resources of a PCD.

Referring now to FIG. 8, which is a continuation flow chart of FIG. 7, in block 1035, the framework manager 440 notifies other nodes 601 which are dependent on the newly created node 601 that the newly created node 601 has been instantiated and is ready to receive or transmit information. According to one exemplary aspect, notifications are triggered immediately when a dependent node, like node 601B of FIG. 5, is created, i.e., the notifications are performed recursively. So if node 601B of FIG. 5 is constructed, node 601A is immediately notified. This notification may allow node 601A to be constructed (since node 601B was node 601A's final dependency). Construction of node 601B may causes other nodes 601 to be notified, and so on. Node 601B does not get completed until the final resource dependent on node 601B is completed.

A second, slightly more complex, implementation is to put all of the notifications onto a separate notification queue, and then run through the queue beginning at a single point in time, i.e., the notifications are performed iteratively. So when node 601B of FIG. 5 is constructed, the notification to node 601A is pushed onto a list. Then that list is executed and node 601A is notified. This causes the notification to other additional nodes 601 (besides node 601A, not illustrated in FIG. 5) to be put on the same list, and that notification is then sent after the notification to node 601A is sent. The notifications to other nodes 601 (besides the notification to node 601A) does not occur until after all the work associated with node 601B and node 601A has been completed.

Logically, these two implementations are equivalent, but they have different memory consumption properties when implemented. The recursive realization is simple but can consume an arbitrary amount of stack space, with the stack consumption being a function of the depth of the dependency graph. The iterative implementation is slightly more complex and requires a bit more static memory (the notification list), but stack usage is constant irrespective of the depth of a dependency graph, such as illustrated in FIG. 5.

Also, notification of node creation in block 1035 is not limited to other nodes. It may also used internally for alias construction. Any arbitrary element in the system 500A may use the same mechanism to request for notification when a node becomes available, not just other nodes. Both nodes and non-nodes may use the same notification mechanism.

In decision block 1040, the framework manager 440 determines if other nodes 601 or soft dependencies are now released for creation or instantiation based on the creation of the current node 601. Decision block 1040 generally determines whether resources may be created because certain dependency relationships 680 have been fulfilled by the current node which has recently undergone creation or instantiation.

If the inquiry to decision block 1040 is positive, then the "Yes" branch is followed back to routine block 1025 in which the released node 601 may now be created or instantiated because of the fulfillment of a dependency by the node 601 that was just created.

If the inquiry to decision block 1040 is negative, then the "No" branch is followed to block 1045 in which the frame work manager 440 may manage communications between elements of the software architecture as illustrated in FIG. 2. Next, in block 1050, the framework manager 440 may continue to log or record actions taken by resources by using the resource names associated with a particular resource. Block 1045 may be executed by the framework manager 440 after any action taken by the framework manager 440 or any of the elements managed by the framework manager 440, such as the resources, nodes 601, clients 648, events 695, and query functions 697. Block 1045 shows another aspect of the node architecture in which the framework manager 440 may maintain a running log of activity that lists actions performed by each element according to their unique identifier or name provided by the authors who created a particular element, such as a resource of a node 601.

Compared to the prior art, this logging of activity in block 1050 that lists unique names assigned to each resource of a system is unique and may provide significant advantages such as used in debugging and error troubleshooting. Another unique aspect of the node architecture 500A is that separate teams may work on different hardware and/or software elements independently of one another in which each team will be able to use resource names that are unique and easy to track without the need for creating tables to translate less meaningful and usually confusing resource names assigned by other teams and/or the original equipment manufacturer (OEM).

Next, in decision block 1055, the framework manager 440 determines if a log of activity recorded by the framework manager 440 has been requested. If the inquiry to decision block 1055 is negative, then the "No" branch is followed to the end of the process in which the process returns back to routine 1005. If the inquiry to decision block 1055 is positive, then the "Yes" branch is followed to block 1060 in which the framework manager 440 sends the activity log comprising meaningful resource names and respective actions performed by the resource names to an output device, such as a printer or a display screen and/or both. The process then returns to routine block 1005 described above.

Figure 9:
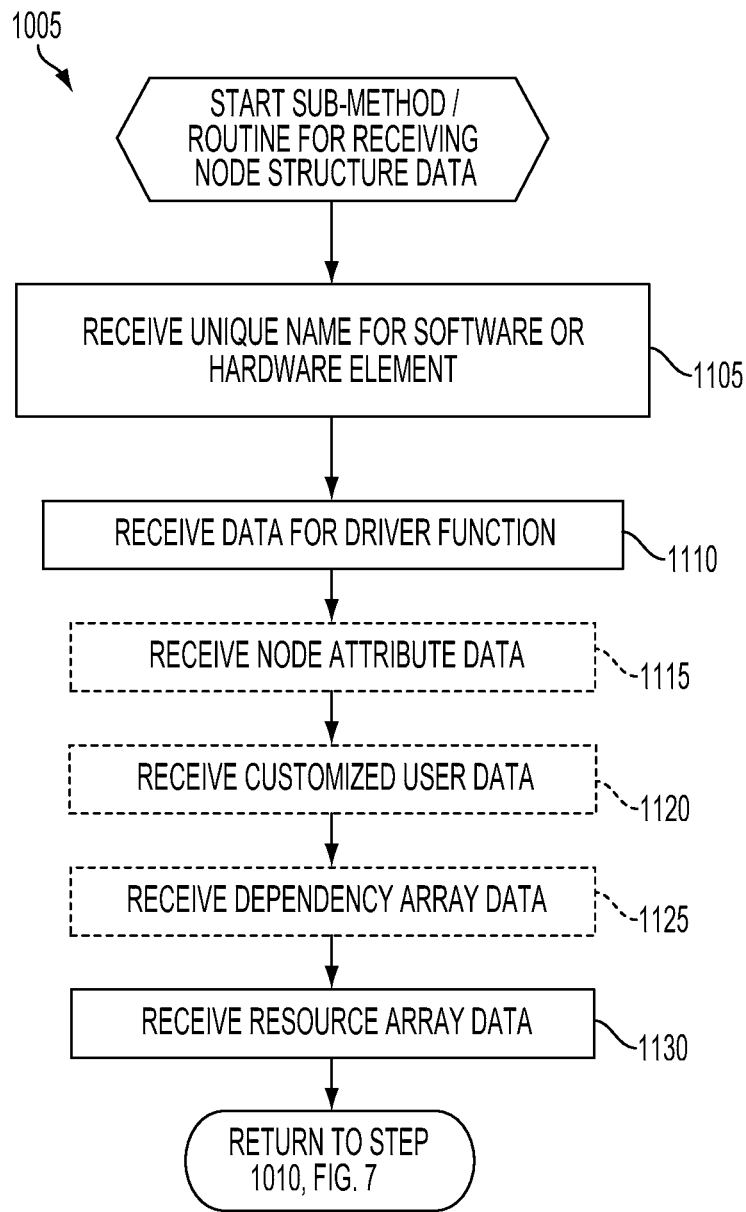
FIG. 9 is a flowchart illustrating a sub-method or a routine of FIGS. 7-8 for receiving node structure data in a software architecture for a PCD.

FIG. 9 is a flowchart illustrating a sub-method or a routine 1005 of FIG. 7 for receiving node structure data that defines a software architecture of a PCD 100. The receiving method may occur at any suitable time, such as, for example, when the PCD 100 is started up or initialized. In such an instance, the node structure data is received when a processor reads the corresponding software code from memory in preparation for instantiating the nodes 601 in accordance with the architecture.

Block 1105 is the first step in the sub method or routine 1005 of FIG. 7. In block 1105, the framework manager 440 may receive a unique name for a software or hardware element, such as the CPU 110 and the clock 442 of FIG. 7. As discussed previously, a node 601 must reference at least one resource. Each resource has a unique name in the system 500A. Each element within the system 500A may be identified with a unique name. Each element has a unique name from a character perspective. In other words, generally, there are no two elements within the system 500A which have the same name. According to exemplary aspects of the system, resources of nodes 601 may generally have unique names across the system, but it is not required that client or event names be unique, though they may be unique as desired.

For convenience, a conventional tree file naming structure or file naming "metaphor" that employs forward slash "/" characters for creating unique names may be employed, such as, but not limited to, "/core/cpu" for CPU 110 and "/clk/cpu" for clock 442. However, as recognized by one of ordinary skill the art, other types of resource names containing any other combination of alphanumeric characters and/or symbols are well within the scope of this disclosure.

Next, in block 1110, the framework manager 440 may receive data for one or more driver functions associated with one or more resources of the node 601 being created. A driver function generally comprises the action to be completed by one or more resources for a particular node 601. For example, in FIG. 6, the driver function for the resource /core/cpu of node 602 may request the amount of bus bandwidth and the CPU clock frequency it requires in order to provide the requested amount of processing that has been requested. These requests would be made via clients of the resources in nodes 642 and node 622. The driver function for /clk/cpu in node 642 would usually be responsible for actually setting the physical clock frequency in accordance with the request it received from the /core/cpu resource of node 602.

In block 1115, the framework manager 440 may receive node attribute data. The node attribute data generally comprises data that defines the node policies such as security (can the node be accessed via user space applications), remotability (can the node be accessed from other processors in the system) and accessibility (can the resource support multiple concurrent clients). The framework manager 440 may also define attributes that allow a resource to override default framework behavior, such as request evaluation or logging policy.

Subsequently, in block 1120, the framework manager 440 may receive customized user data for the particular node 601 being created. The user data may comprise a void "star" field as understood by one of ordinary skill in the art with respect to the "C" programming language. User data is also known to one of ordinary skill in the art as a "trust me" field. Exemplary customized user data may include, but is not limited to, tables such as frequency tables, register maps, etc. The user data received in block 1120 is not referenced by the system 500B, but allows for customization of a resource if the customization is not recognized or fully supported by the framework manager 440. This user data structure is a base class in the "C" programming language intended to be extended for particular or specific uses.

One of ordinary skill the art recognizes that other kinds of data structures for extending specific uses of a particular class are within the scope of this disclosure. For example, in the programming language of "C++" (C-plus-plus), an equivalent structure may comprise the key word "public" which would become an extension mechanism for a resource within a node 601.

Next, in block 1125, the framework manager 440 may receive dependency array data. The dependency array data may comprise the unique and specific names of one or more resources 601 on which the node 601 being created is dependent. For example, if the first node 602 of FIG. 6 was being created, then in this block 1125, the dependency array data may comprise the resource names of the three resources of the second node 622 and the single resource name of the third node 642 on which the first node 602 is dependent.

Subsequently, in block 1130, the framework manager 440 may receive resource array data. The resource array data may comprise parameters for the current node being created, such as parameters relevant to the first node 602 of FIGS. 7B-7C if this first node 602 was being created. The resource array data may comprise one or more of the following data: the names of other resources; unit; maximum value; resource attributes; plug-in data; and any customized resource data similar to the customize user data of block 1120. The plug-in data generally identifies functions retrieved from a software library and usually lists the client types that may be supported by the particular node or plurality of nodes being created. The plug-in data also allows for customization of client creation and destruction. After block 1130, the process returns to block 1010 of FIG. 7.

In FIG. 9, the attribute data block 1115, customized user data block 1120, and the dependency array data block 1125 have been illustrated with dashed lines to indicate that these particular steps are optional and not required for any given node 601. Meanwhile, the unique name block 1105, a driver function block 1110, and resource array data block 1130 have been illustrated with solid lines to indicate that these steps of routine 1005 are generally important for creating a node 601.

Figure 10:
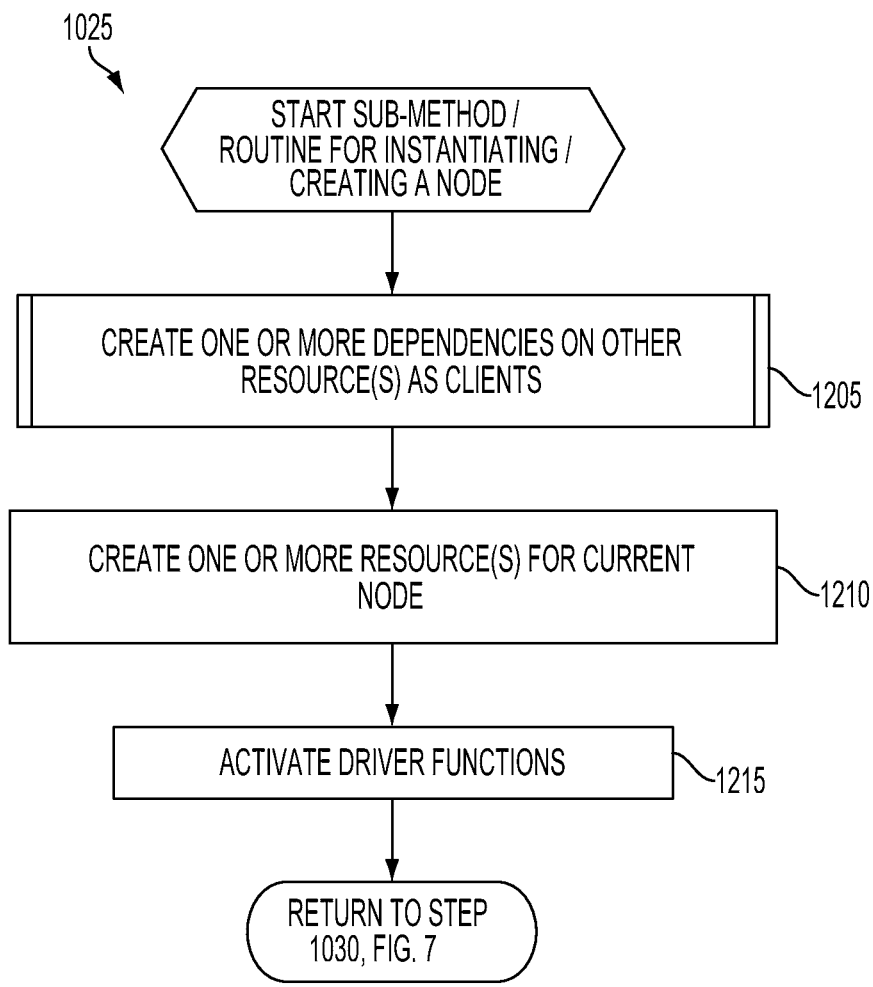
FIG. 10 is a flowchart illustrating a sub-method or a routine of FIGS. 7-8 for creating a node in a software architecture for a PCD.

FIG. 10 is a flowchart illustrating a sub-method or a routine 1025 of FIG. 7 for creating a node in a software architecture for a PCD 100. Routine block 1205 is the first routine in the sub-method or routine 1025 for instantiating or creating a node 601 according to one exemplary embodiment. In routine block 1205, one or more clients 648 that are associated with the node 601 being instantiated are created in this step. Further details about routine block 1205 will be described in further detail below in connection with FIG. 11.

In block 1210, the framework manager may create or instantiate the one or more resources corresponding to the node structure data of block 705. Next, in block 1215, the framework manager 440 may activate the driver functions received in routine block 1110 of routine block 1005. According to one exemplary aspect, the driver functions may be activated using the maximum values received in the resource array data block 1130 of routine block 1005. According to another, preferred, exemplary aspect, each driver function may be activated with an optional, initial value that is passed along with the node structure data from routine 1005. If initial data is not provided, the driver function is initialized at 0—the minimum value. The driver function is also usually activated in manner such that it is known that it is being initialized. This enables the resource to perform any operations that are specific to initialization, but do not need to be performed during normal or routine operation. The process then returns to step 1030 of FIG. 7.

Figure 11:
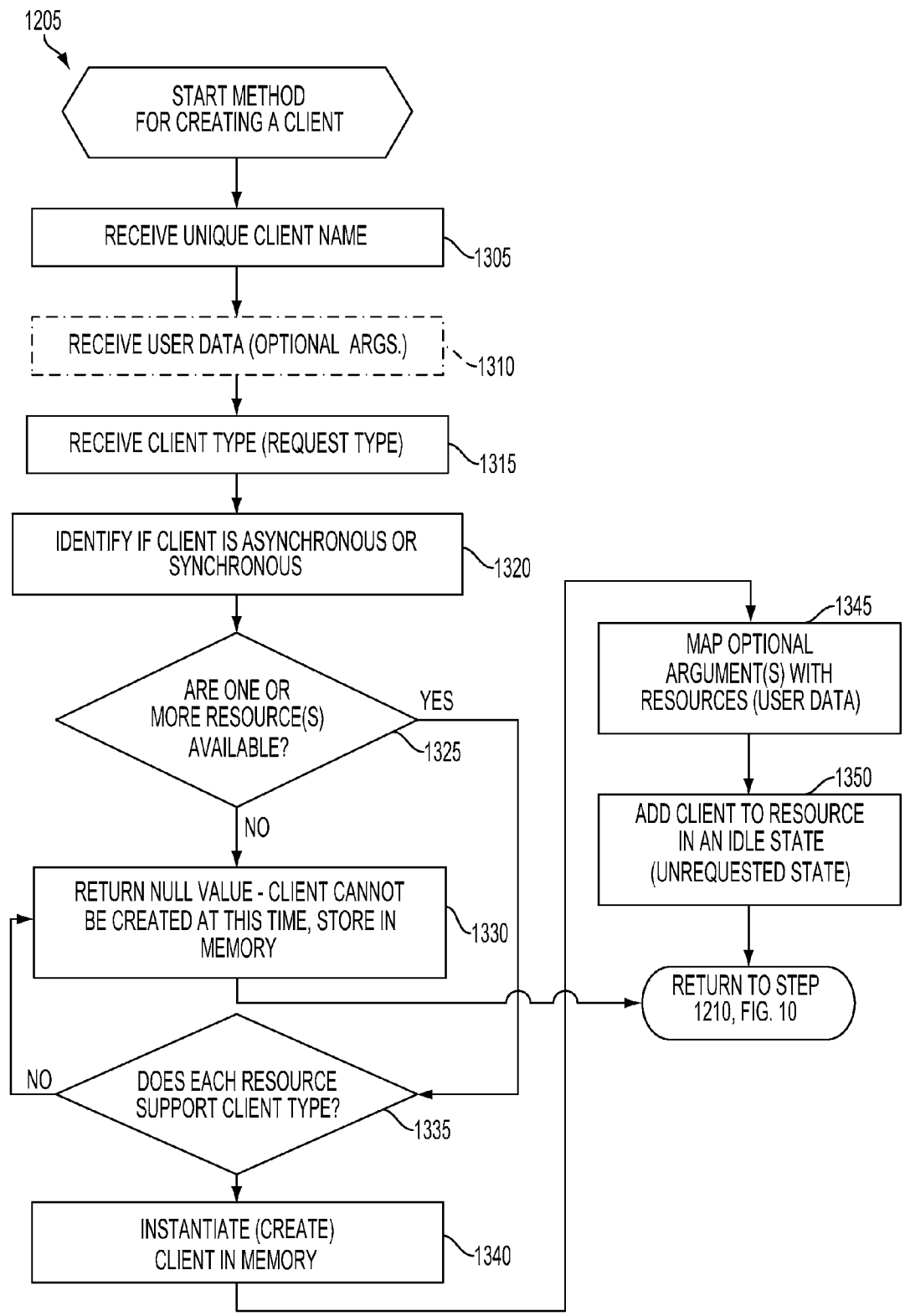
FIG. 11 is a flowchart illustrating a sub-method or a routine of FIG. 10 for creating a client in a software architecture of a PCD.

FIG. 11 is a flowchart illustrating a sub-method or a routine 1205 of FIG. 10 for creating or instantiating a client 648 in a software architecture of a PCD 100. Block 1305 is the first step of routine block 1205 in which a client 648 of one or more resources 601 is created. In block 1205, the framework manager 440 receives a name assigned to the client 648 being created. Similar to resource names, the name for a client 648 may comprise any type of alphanumeric and/or symbols.

Next, in block 1310, customized user data may be received by the framework manager 440 if there are any particular customizations for this client 648 being created. Block 1310 has been illustrated with dashed lines to indicate that the step is optional. The customized user data of block 1310 is similar to the customized user data discussed above in connection with the creation of resources for nodes 601.

In block 1315, the framework manager 440 receives the client type category assigned to the particular client being created. The client type category as of this writing may comprise one of four types: (a) required, (b) impulse, (c) vector, and (d) isochronous. The client type category list may be expanded depending upon the resources being managed by the system 101 and upon the application programs relying upon the resources of the nodes 601.

The required category generally corresponds with the processing of a scalar value that is passed from the required client 648 to a particular resource 601. For example, a required request may comprise a certain number of millions of instructions per second (MIPs). Meanwhile, the impulse category generally corresponds with the processing of a request to complete some activity within a certain period of time without any designation of a start time or stop time.

An isochronous category generally corresponds with a request for an action that is typically reoccurring and has a well-defined start time and a well-defined end time. A vector category generally corresponds with an array of data that usually is part of multiple actions that are required in series or in parallel.

Subsequently, in block 1320, the framework manager 440 receives data that indicates whether the client 648 has been designated as synchronous or asynchronous. A synchronous client 648 is one that typically requires the framework manager 440 to lock a resource of a node 601 until the resource 601 returns data and an indication that the resource 601 has finished completing the requested task from the synchronous client 648.

On the other hand, an asynchronous client 648 may be handled by one or more threads in parallel which are accessed by the framework manager 440. The framework 440 may create a callback to a thread and may return a value when the callback has been executed by a respective thread. One of ordinary skill the art recognizes that the asynchronous client 648 does not lock up a resource like a synchronous client 648 does when the task of the synchronous client 648 is being executed.

After block 1320, in decision block 1325, the framework manager 440 determines if the resource identified by the client 645 are available. If the inquiry to decision block 1325 is negative, then the "No" branch is followed to block 1330 in which a null value or message is returned to a user indicating that the client 648 cannot be created at this time.

If the inquiry to decision block 1325 is positive, then the "Yes" branch is followed to decision block 1335 in which the framework manager 440 determines if each resource identified by the client 648 supports the client type provided in block 1310. If the inquiry to decision block 1335 is negative, then the "No" branch is followed back to block 1330 in which a null value or message is returned indicating that the client 648 cannot be created at this time.

If the inquiry to decision block 1335 is positive, then the "Yes" branch is followed to block 1340 in which the framework manager 440 creates or instantiates the client 648 in memory. Next, in block 1345, if any customized user data is received in block 1310, such as optional arguments, then these optional arguments may be mapped with their respective resources to a particular node 601. Next, in block 1350, the newly created client 645 is coupled to its corresponding one or more resources in an idle state or on requested state as described above. The process then returns to block 1210 of FIG. 10.

Figure 12:
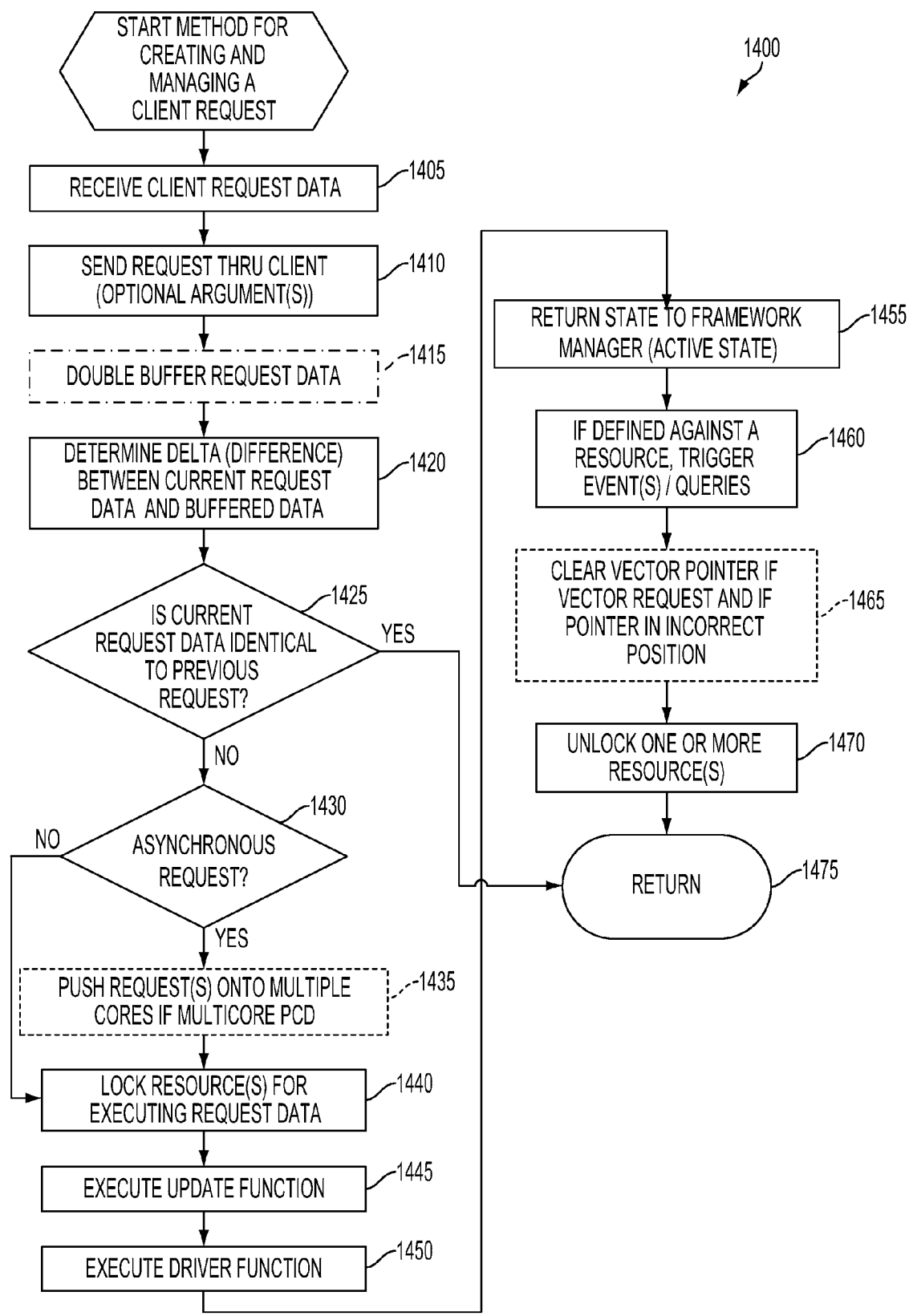
FIG. 12 is a flowchart illustrating a method for creating a client request against a resource in a software architecture for a PCD.

FIG. 12 is a flow chart illustrating a method 1400 for creating a client request 675 against a resource 601 in a software architecture for a PCD 100. The method 1400 is generally executed after client and node creation (instantiation) as described above in connection with FIGS. 7-11.

Block 1405 is the first step in the method 1400 for creating a client request 675 against the resource 601. This method 1400 will describe how the following three types of client requests 675 are handled by the framework manager 440: (a) required, (b) impulse, and (c) vector. As the names of the requests 675 mentioned above suggest, client requests 675 generally correspond with client types that were created and described above.

In block 1405, the framework manager 440 may receive the data associated with a particular client request 675 such as one of the three mentioned above: (a) required, (b) impulse, and (c) vector. The data associated with a required request generally comprises a scalar value that is passed from the required client 648 to a particular resource 601. For example, a required request may comprise a certain number of millions of instructions per second (MIPs). An impulse request comprises a request to complete some activity within a certain period of time without any designation of a start time or stop time.

Data for a vector request generally comprises an array of multiple actions that are required to be completed in series or in parallel. A vector request may comprise an arbitrary length of values. A vector request usually has a size value and an array of values. Each resource of a node 601 may be extended to have a pointer field in order to support a vector request. In the "C" programming language, the pointer field is supported by the union function as understood by one of ordinary skill in the art.

Next, in block 1410, the framework manager 440 issues the request through the client 648 that was created by the method described above in connection with FIG. 11. Subsequently, in block 1415, the framework manager 440 double buffers the request data being passed through the client if the request is a required type or a vector type. If the request is an impulse type, then block 1415 is skipped by the framework manager 440.

For required requests, in this block 1415, values from a prior request are maintained in memory so that the framework manager 440 may determine if there is any difference between the previous requested values in the current set of requested values. For vector requests, prior requests are usually not maintained in memory, although a resource of a node 601 may maintain it as desired for a particular implementation. Therefore, block 1415 is optional for vector types of requests.

In block 1420, the framework manager 440 calculates the delta or difference between the previous set of requested values in the current set of requested values. In decision block 1425, the framework manager determines if the current set of requested values is identical to the previous set of requested values. In other words, the framework manager 440 determines if a difference exists between the current set of requested values and the previous set of requested values. If there is no difference between the current set and previous set of requested values, then the "Yes" branch is followed (which skips blocks 1430 through block 1470) to block 1475 in which the process ends.

If the inquiry to decision block 1425 is negative, meaning that the set of requested values are different relative to the set of pre-previous requested values, then the "No" branch is followed to decision block 1430.

In decision block 1430, the framework manager 440 determines if the current request is an asynchronous request. If the inquiry to decision block 1430 is negative, then the "No" branch is followed to block 1440 in which the resource 601 corresponding to the client request 675 is locked by the framework manager 440. If the inquiry to decision block 1430 is positive, meaning that the current request is asynchronous request type, then the "Yes" branch is followed to block 1435 in which the request may be pushed onto another thread and may be executed by another core if a multi-core system, like that of FIG. 1, is currently managed by the framework manager 440. Block 1435 has been illustrated with dashed lines to indicate that this step may be optional if the PCD 100 is a single core central processing system.

Subsequently, in block 1440, the resources 601 corresponding to the request 675 is locked by the framework manager 440. Next, in block 1445, the resource 601 executes the update function which generally corresponds to the plug-in data of the resource array data received in block 1130 of FIG. 9. The update function generally comprises a function responsible for the new resource state in light of a new client request.

The update function compares its previous state with the requested state in the client request. If the requested state is greater than the previous state, then the update function will perform the client request. However, if the requested state is equal to or less than the current state and which the resource is operating at, then the client request will not be performed in order to increase the efficiency since the old state achieves or satisfies the requested state. An update function takes a new request from the client and aggregates it with all the other active requests to determine the new state for the resource.

As an example, multiple clients may be requesting a bus clock frequency. The update function for the bus clock would usually take the maximum of all the client requests and use that as the new desired state for the bus clock. It is not the case that all resources will use the same update function, although there are some update functions that will be used by multiple resources. Some common update functions are to take the maximum of client requests, to take the minimum of client requests and to sum the client request. Or resources may define their own custom update function if their resource needs to aggregate requests in some unique way.

Next, in block 1450, the framework manager 440 passes the data to the resource corresponding to the client 648 so that the resource may execute the driver function which is specific to the resource of a node 601. A driver function applies the resource state as computed by the update function. This may entail updating hardware settings, issuing requests to dependent resources, calling legacy functions or some combination of the above.

In the previous example, the update function computed the requested bus clock frequency. The driver function may receive that requested frequency and it may update the clock frequency control HW to run at that frequency. Note that sometimes it is not possible for the driver function to meet the exact requested state that update function has computed. In this case, the driver function may choose the frequency that best meets the request. For example, the bus clock HW may only be able to run at 128 MHz and 160 MHz, but the requested state might be 150 MHz. In this case, the driver function should run at 160 MHz, as that exceeds the requested state.

Next, in block 1455, the framework 440 receives state control from the resource which has executed the driver function in block 1450. Subsequently, in block 1460, if defined against the resource, events 690 may be triggered so that data is passed back to the client 648 which corresponds to the event 690. Events may be processed in another thread. This may minimize the amount of time spent with the resources locked and allows for parallel operation in a multi-core system as illustrated in FIG. 1.

One or more events 690 may be defined against a resource in a manner similar to how a request may be defined against a resource as described in this method 1400. In other words, the event creation process may largely parallel the client creation process. One thing that is different with the events is that it is possible to define events that only get triggered when certain thresholds are crossed.

This defining of events that only get triggered based on thresholds allows for notification of when a resource is getting oversubscribed (it has more concurrent users than it can support) which is indicative of a system overloading condition, or when a resource goes low/off, which may allow other things to be shut off, restore functionality that was disabled when the system became oversubscribed, etc. Because the event registration may be done with thresholds, it reduces the amount of work the system has to do on event notification to only happen when there is something really necessary. It is also possible to register for an event on every state change.

Next, in optional block 1465, if the request being processed is a vector request, then this optional block 1465 is usually performed. Optional block 1465 generally comprises a check or determination to assess whether the vector pointer is still positioned on the same data that the user passed into the vector. If the inquiry to this optional block 1465 is positive, meaning that the pointer is still pointing to the same data which was passed by the user into the vector, then the pointer is cleared out so that references to old data is not maintained. This optional block 1465 is generally performed to account for the double buffering block 1415 described above when a vector request is being processed, compared to an impulse request and a required request.

Subsequently, in block 1470, the framework 440 unlocks the requested resource so that other client requests 648 may be handled by the current but now released requested resource of a particular node 601. The process then returns to the first block 1405 for receiving the next client request.

The above-described methods and data structures are essentially as applicable to a multi-processor PCD 100 as they are to a single-processor PCD 100. However, the remoting framework 300 (FIG. 3) may provide additional features that may enhance operation in a multi-processor embodiment.

For example, the remoting framework 300 may advantageously render the details of inter-processor communication transparent to an application programmer or similar person. Thus, an application program, for example, may define a client that issues a request on a target resource without having to include in the client definition any identification of the processor domain that controls that resource. Rather, the remoting framework 300 ensures that the request will reach the target resource regardless of which processor controls the client and which processor controls the target resource.

In addition, the remoting framework 300 manages the inter-processor communication so that, for example, an application program need not include any instructions relating to the protocol or other aspects of the communication paths (e.g., buses) between processors. Furthermore, as different inter-processor communication paths may use different protocols, the remoting framework 300 allows the resource definition to specify a protocol along with other aspects of the resource. These and other features relating to distributed resource management are described below with regard to FIG. 13.

Figure 13:
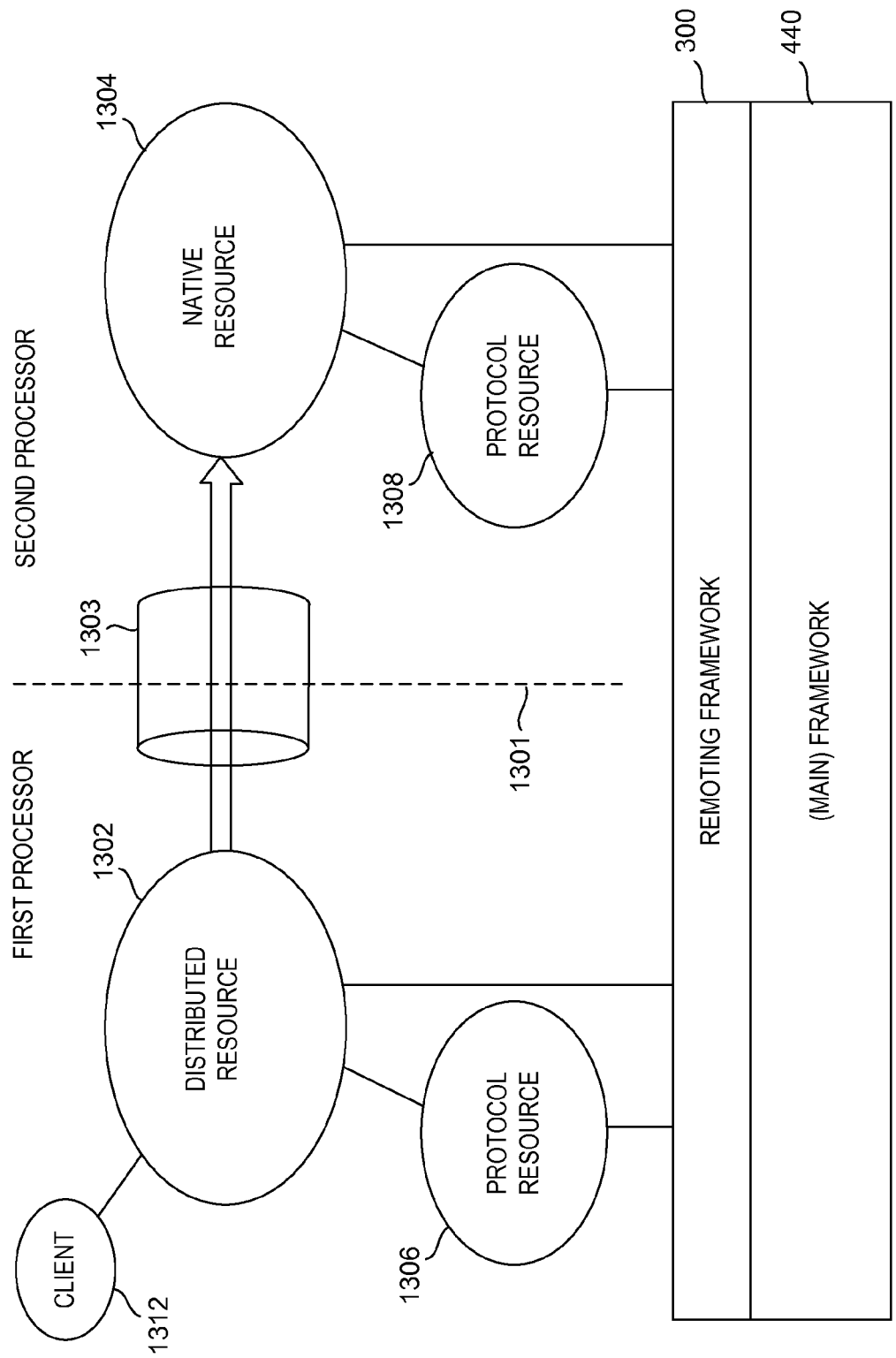
FIG. 13 illustrates a communication path between two processors, each controlling resources of its own resource graph.

FIG. 13 illustrates an example or instance in which a first resource 1302, which is controlled by a first processor (not shown) serves as a distributed or remote resource corresponding to a second resource 1304, which is controlled by a second processor (not shown). The term "distributed resource" or "remote resource" is used in this disclosure to refer to a resource on one processor that corresponds to a "native" resource on another processor. The second resource 1304 in this example serves as a native resource to the second processor.

A distributed resource is used as a means to access the corresponding native resource. In this example the term "resource" may be used interchangeably with the term "node," as it should be understood that a resource may be included in a node.

A broken line 1301 illustrates a division between resources controlled by the first processor (to the left of the line 1301) and resources controlled by the second processor (to the right of the line 1301). The first resource 1302 is one of two or more resources that are controlled by the first processor. One such resource may be a protocol resource 1306 on which the first resource 1302 depends. Likewise, the second resource 1304 is one of two or more resources that are controlled by the second processor. One such resource may be a protocol resource 1308 on which the second resource 1304 depends.

The first and second resources 1302 and 1306 may also depend on additional resources in the same manner as described above with regard to resources or nodes in general, but such additional resources are not shown in FIG. 13 for purposes of clarity. Note that the resources controlled by the first processor are defined by a first resource graph (i.e., a directed acyclic graph), and the resources controlled by the second processor are defined by a second such resource graph that does not share any resources with the first resource graph.

The first and second resources 1302 and 1304, under control of their respective processors, are capable of communicating information via a communication path 1303. The communication path 1303 represents the combination of the physical medium between the first and second processors and the one or more layers of transport protocols used to communicate via that medium. Accordingly, any communications between the first resource 1302 and the second resource 1304 must conform to the protocols. Protocol resources 1306 and 1308 define a protocol or may point to a protocol definition in a library (not shown). The remoting framework 300 and (main) framework 440 operate in conjunction with one another to manage the resources and communications between them. As described below, a client 1312, under control of the first processor, may issue one or more resource requests on the first resource 1302. The first resource 1302 uses the functionality of the corresponding second resource 1304 to service the resource request.

In different application states, it may be necessary or desirable for a processor to request different configurations or states of resources. For example, a bus resource may control the speed of a bus clock. In one application state a processor may request a bus clock that allows the processor to operate at a rate of, for example, 100 million instructions per second (MIPS), while in another application state the processor may request a bus clock that allows it to operate at a rate of, for example, 150 MIPS. In the case of a processor preparing to enter an application state that is a sleep state, the processor may request a bus clock of zero MIPS.

Similarly, in one application state defined by a processor executing a first application program the processor may request 100 MIPS, while in another application state defined by the processor executing a second application program the processor may request 150 MIPS. Likewise, in one application state defined by a processor concurrently executing a certain number of application programs the processor may request 100 MIPS, while in a second application state defined by the processor concurrently executing a different number of application programs the processor may request 150 MIPS. It should be understood that the above-referenced bus clock is intended only as an example of a resource that can be configured by a processor issuing a resource request, and also that the numbers "100" and "150" are intended as arbitrary examples of processing speeds.

Resource configurations or states may be grouped into resource state sets. A resource state set defines the configurations or states of one or more resources that are used together by a processor in a certain processor application state. For example, a certain resource state set may include configuration or state information for a bus clock resource to provide a processor with a certain number of MIPS of processing speed, and configuration or state information for a decoder (i.e., another example of a resource) to provide a decoding function to the processor.

Figure 14:
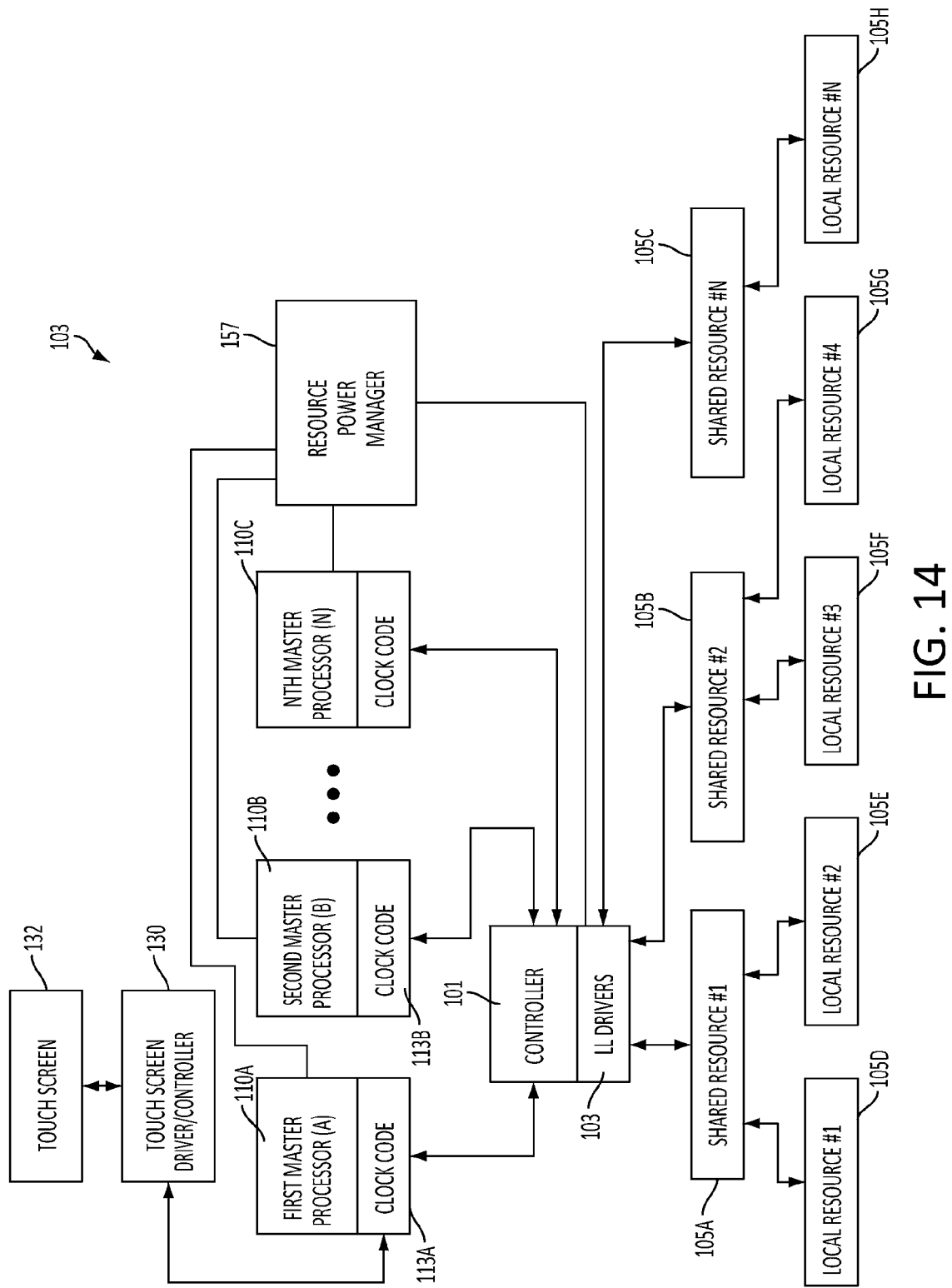
FIG. 14 is a functional block diagram illustrating relationships among a controller, a resource power manager, master processors, low-level drivers, shared resources, and local resources.

FIG. 14 is a functional block diagram illustrating relationships among a controller 101, resource power manager 157, master processors 110, 126, low-level drivers 103, shared resources 105A-C, and local resources 105D-H that form a system 103. FIG. 14 also illustrates how the touchscreen 132 may be coupled to the touchscreen driver/controller 130. The touchscreen driver/controller 130 may be coupled to clock code 113A of a first master processor 110A.

The system 103 may switch among resource state sets desired by a processor 110 in a manner that minimizes resource latency. The term "resource latency" refers to the delay or latency that occurs between a time at which a master processor 110, 126 begins preparing controller 101 and resource power manager 157 to transition to another resource state set and the time that the resources of that set become configured to the specified states and ready for use by the processor. As described below, resource state sets can be broadly categorized into: active resource state sets, in which a processor is provided with resources configured to aid the processor in executing application programs and otherwise providing processing power; and a sleep resource state, in which a processor is provided only with resources that aid the processor in maintaining a sleep state, i.e., a state in which the processor is not executing application programs or otherwise providing processing power. Although a processor in a sleep state may maintain low-level functions, the processor does not execute software that would be understood by one of ordinary skill in the art to be an application program. It should be understood that the "next-active state" feature described below may be applied to transitions between any resource state sets, regardless of whether they may be active sets or sleep sets.

In the exemplary embodiment shown in FIG. 14, the first master processor 110A may be coupled to the resource power manager 157 and the controller 101. The controller 101 may be coupled to the clock code 113A of the first master processor 110A. The controller 101 may comprise one or more low-level drivers 103. The one or more low-level drivers 103 may be responsible for communicating with one or more shared resources 105A-C. Shared resources 105A-C may comprise any type of device that supports tasks or functions of a master processor 110. Shared resources 105A-C may include devices such as clocks of other processors as well as single function elements like graphical processors, decoders, and the like.

The shared resources 105A-C may be coupled to one or more local resources 105D-H. The one or more local resources 105D-H may be similar to the shared resources 105A-C in that they may comprise any type of device that supports or aids tasks or functions of a master processor 110. Local resources 105D-H may include devices such as clocks of other processors as well as single function elements like graphical processors, decoders, and the like. The local resources 105D-H may comprise leaf nodes. Leaf nodes are understood by one of ordinary skill in the art as local resources 105D-H that usually do not refer or include other dependent resources 105.

The controller 101 may be responsible for managing requests that are issued from the one or more master processors 110, 126. For example, the controller 101 may manage a request that originates from the first master processor 110A. The first master processor 110A may issue this request in response to an operator manipulating the touchscreen 132. The touchscreen 132 may issue signals to the touchscreen driver/controller 130. The touchscreen driver/controller 130 may in turn issue signals to the clock code 113A of the first master processor 110A.

The controller 101 may also be responsible for managing the sleep states for a particular processor 110. Prior to entering a sleep state, a processor 110 will provide information for managing sleep states. Information for managing sleep states includes the entry into and exiting from a sleep state. This information for managing sleep states will be referred to below as triggers and resource states. A resource state set may include resource information for configuring one or more resources in a manner that supports a sleep state of a processor.

Triggers may define events that cause a processor 110 to either enter into a sleep state or to leave a sleep state. Triggers will generally reference resource states that are contained within or that are accessible by the controller 101. Resource states define a desired state of resources 105 needed by particular processor 110. In an exemplary embodiment, each processor 110 may provide at least two resource state sets to a controller 101: an active set of resource states and a sleep set of resource states.

However, in other embodiments a processor 110 may provide resource state sets in addition to a single active set and a single sleep set or resource state sets that are different from a single active set and a single sleep set. Such other resource state sets may correspond to one or more of the processor application states described above. That is, for any application state, the processor may provide a corresponding resource state set.

In the exemplary embodiment, the active set of resource states may define states of resources 105 for when the processor 110 is actively performing processing functions and requiring action/functions from its resources 105. The sleep set of resource states may define states of resources 105 when the processor 110 is in a sleep or idle state. Further details about triggers and resource states will be described below in connection with FIG. 15.

Figure 15:
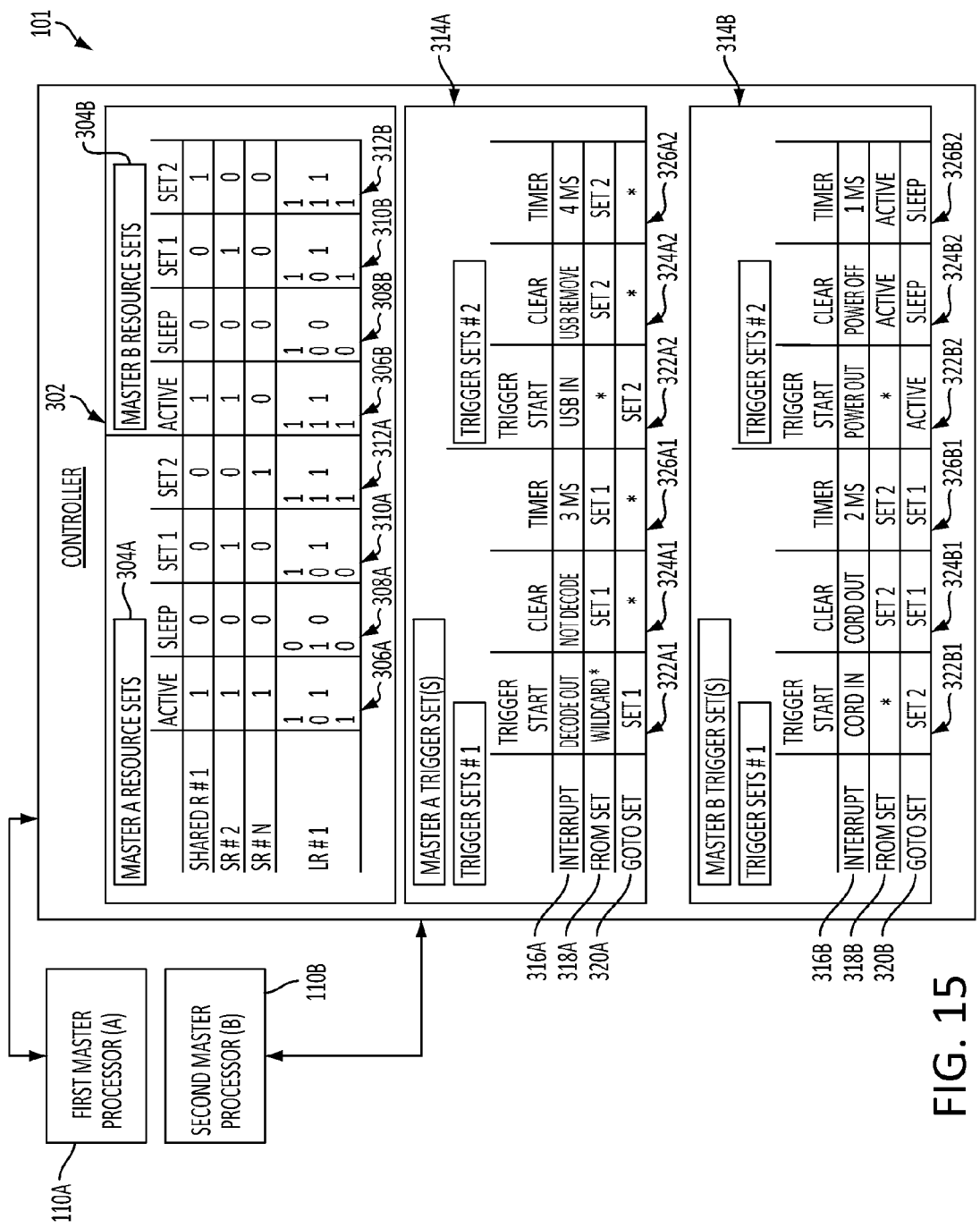
FIG. 15 is a functional block diagram illustrating details about the controller and trigger sets.

FIG. 15 is a functional block diagram illustrating details about the controller 101, resource sets 304, and trigger sets 314. As noted previously, the controller 101 may comprise software executed by one or more of the processors 110, 126 of the PCD 100. The controller 101 may store information in memory 112 or in an area within the controller 101, such as local storage as understood by one of ordinary skill in the art. This information may comprise a resource table 302 that includes resource sets 304 that are assigned to each master processor 110 which is serviced by the controller 101. This information may also comprise trigger sets 314 that are also assigned to each master processor 110 and which may be unique to each master processor 110.

Each resource set 304 generally comprises information relating to states of resources 105 desired by a particular master processor 110. Each resource set 304 assigned to a particular master processor 110 may comprise an active resource set 306, and a sleep resource set 308. The active resource set 306 may define or describe states of resources 105 when a particular master processor 110 is active or functioning normally. The sleep resource set 308 may define or describe states of resources 105 when a particular master processor is in a sleep or dormant state as understood by one of ordinary skill in the art. Each resource set 304 may also comprise additional sets such as "set 1" and "set 2" assigned to the first master processor 110 in the exemplary embodiment illustrated in FIG. 15.

As an example, the active resource set 306 for the first master processor (A) 110A as illustrated in FIG. 15 has assigned the following values for each of its resources 105: for the first shared resource (SR#1) 105A the value is one; the value for the second shared resource (SR#2) 105B is one; the value for the Nth shared resource (SR#N) 105C is one; while the four values for the first local resource (LR#1) 105D are one, zero, one, and one.

As noted previously, states of resources 105 are not limited to single values and may include a plurality of values. Further, states of resources may include any of a number of different types of parameters. For example, a state may designate hundreds of megahertz for the amount of clock speed of a particular clock that may function as a resource 105.

As another example, the sleep resource set 308A for the first master processor (A) 110A as illustrated in FIG. 15 has assigned the following values for each of its resources 105: for the first shared resource (SR#1) 105A, this resource has been assigned value of zero; the second shared resource (SR#2) 105B has an assigned value of zero; while the Nth shared resource (SR#N) 105C has an assigned value of zero. The first local resource (LR#1) 105D may have assigned values of zero, one, zero and zero.

Each trigger set 314 assigned to a particular master processor 110 may comprise at least three fields: an interrupt field 316; a "from set" 318; and a "go to set" 320. Each of these three fields of a trigger set 314 may also include a corresponding set of three columns: a trigger start column 322; a clear column 324; and a timer column 326.

The interrupt field 316 describes the action or activity that may be generated and/or detected by the resource power manager 157. The interrupt field 316 may be generally characterized as the "trigger event" that may allow a controller 101 to select a specific resource set 304 which is desired by a particular processor 110 based on the trigger event detected by the RPM 157. The selection of a resource set 304 by the controller 101 may avoid the time consuming software handshake described above in the background section.

Reviewing the first trigger set (trigger set #1) of FIG. 15 for the first master processor (A) 110A, the fields of the set are discussed in order by columns. Starting with the first column of the trigger set 314A, the trigger start column 322 has an action listed as "decode interrupt" in its first row corresponding to the interrupt field 316.

As noted previously, the interrupt field 316 may define parameters that cause the controller 101 to activate the states of a resource set 304 in response to the detection of the trigger start field 322. In the exemplary embodiment illustrated in FIG. 15, the interrupt field 316A has been defined or described as a "decode interrupt" which means that when the resource power manager 110 detects a "decode interrupt," such as when a PCD 100 is decoding video, then this event may alert the controller 101 to review the "from set" field 318 in the first column 322A1 under the "trigger start" column.

The "from set" field 318 may comprise a value that denotes what the current resource set 304 should be for the particular master processor 110 being reviewed by the controller 101. This field 318 may list a resource set 304 by its identifier such as the "active set," the "sleep set," or a set number like "set 1" or "set 2," The field 320 may also comprise a "wild card" like an asterisk.

A wildcard designation in the "from set" field 318 may cause the controller 101 to retrieve the last known active resource set 304 that was being used by a particular master processor 101. In the exemplary embodiment illustrated in FIG. 15, the "from set" row 318A and trigger start column 322A1 have a value of an asterisk or wildcard.

The "go to set" 320, like the "from set" 318, may comprise a listing of a resource set 304 by its identifier such as the "active set", the "sleep set", or a set number like "set 1" or "set 2". The field 320 may also comprise a "wild card" like an asterisk that means the last resource set 304 being utilized by a processor 110. In the exemplary embodiment illustrated in FIG. 15, the "go to set" field 320A and the trigger start field column 322A1 has a value of "set 1" which is the resource set 1 listed in column 310A of the first resource set 304A.

For the example illustrated in FIG. 15, when a decode interrupt event is detected by the RPM 157, it alerts the controller 101. The controller 101 reviews the first trigger set for the first master processor 110. Since the trigger start column 322A1 lists a matching value (a decode interrupt), the controller 101 reviews the "from set" field 318A and determines that the value is a wildcard value or asterisk. The controller 101 then reviews the "go to" field 320A which has a value of "set 1" that designates a particular resource set 304A. Based on this information reviewed by the controller 101, the controller 101 will switch the current resource set 304A for the first master processor 110A from its current set to the resource set "set 1." Resource Set 1 is listed in column 310A of the resource set 304A assigned to the first master processor 110A.

Further, when the RPM 157 or the controller 101 detects a "not decode" event such as illustrated in the clear column 324A1 of the first trigger set, then the controller 101 will then review the "from set" field 318A and determine that this value comprises "set 1." The controller 101 will then review the "go to set" field 320 which has a value of a wildcard or an asterisk in this example. This means that the controller 101 will switch the resource set 304A of the first master processor 110A from the "set 1" resource set to the last active resource set used by the processor 110A.

The timer field 326 of the trigger set may denote an amount of time that a particular resource set 304 may be used by the controller 101. So for the exemplary embodiment illustrating FIG. 15, for the timer field 326A1 of the first trigger set, this field has a value of three milliseconds. This means that when the decode interrupt event is matched with the trigger start field 322A1 of the first trigger set, then the controller 101 utilizes the resource set 304 specified in the "go to set" field 320A for only a period of three milliseconds. In other exemplary embodiments, situations may occur or exist in which there is no information in the timer field 326 or the value is defined to correspond with a value that indicates that there is no timer trigger 326 for this transition and that the transition only applies to the no decode field. In a situation in which the timer field is defined, such as illustrated in FIG. 15—timer fields 326A1 and 326A2, then whichever event occurs first between the timer field 326 and the Clear field 324 will usually initiate the transition.

FIG. 16 illustrates an exemplary active-sleep trigger set 314 for a processor 110. In this exemplary embodiment, the interrupt field 316 in the first column 322 define a "shut down" event as the action to initiate a sleep set 308 (FIG. 15) for a particular processor 110. The "shut down" event may include action like an operator selecting an on/off button for shutting down a PCD 100.

In the exemplary embodiment in FIG. 16, when a "shut down" event is detected, the controller 101 transitions the current active resource set 306 to a sleep set 308. The sleep set 308 is listed in a master resource set 304 of table 302 in FIG. 15.

When the controller 101 receives a message from the RPM 157 that a "bring up" event has occurred, such as a power-on event initiated by an operator of the PCD 100, then the controller would transition the processor 110 from its sleep set 308 to the last active resource set 304 based on the wildcard or asterisk value listed in the "go to set" field 320 of the trigger set 314.

As described above, the system 103 is not limited to active and sleep sets 306, 308. The system 103 may be used for switching between resource sets 304 for events other than entering or exiting sleep states as illustrated in FIG. 15.

Figure 17:
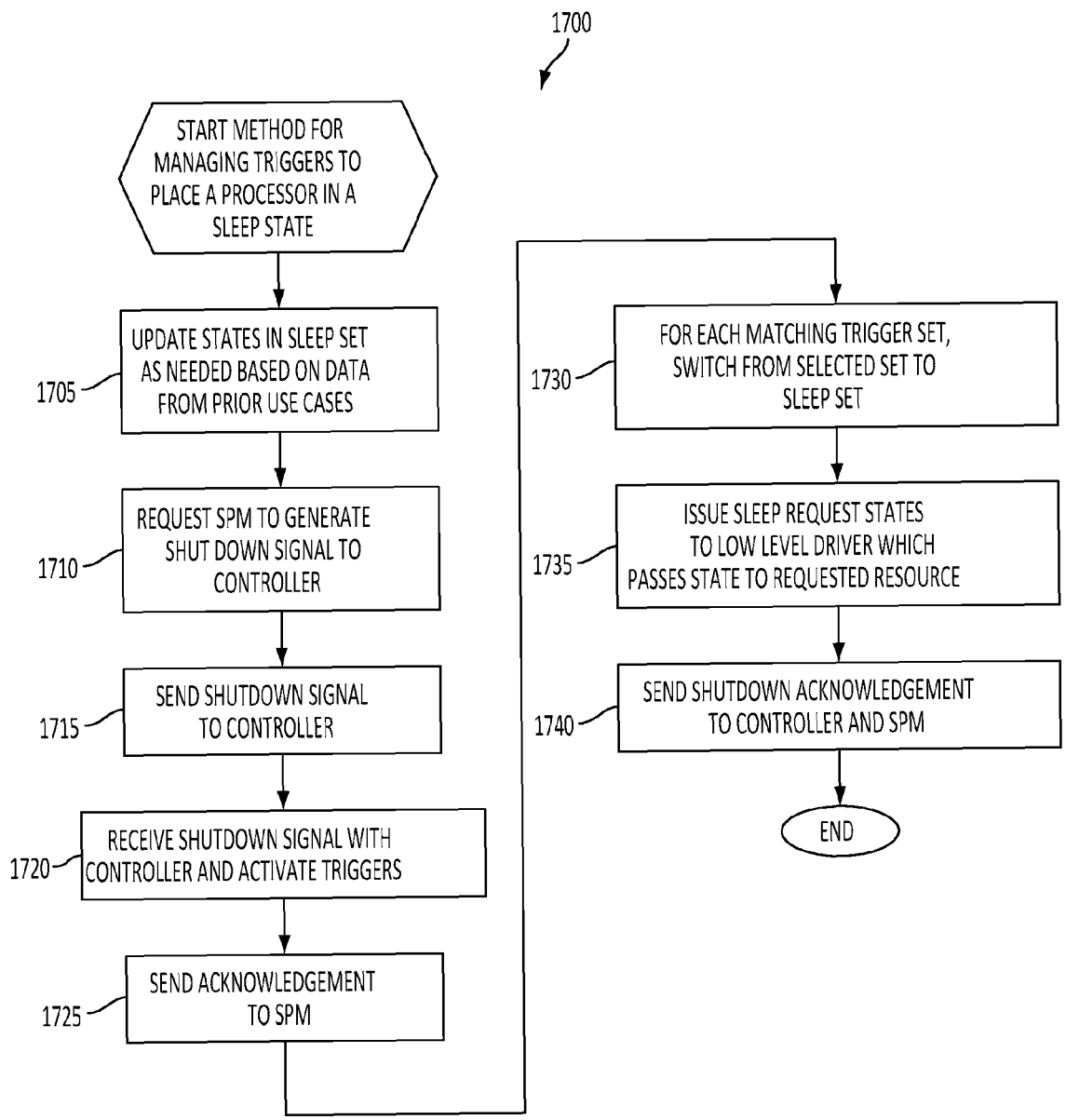
FIG. 17 is a logical flowchart illustrating a method for managing trigger sets and otherwise transitioning a processor from a first application state, such as an awake state to a second application state, such as a sleep state.

FIG. 17 is a logical flowchart illustrating a method 1700 for managing trigger sets 314 to place a processor 110 into a sleep state. Block 1705 is the first step of the method 1700. In block 1705, each processor 110 may update its resource sets 304 as well as its trigger sets 314 in the controller 101 (FIGS. 1-2) as needed based on data from prior use cases of the PCD 100.

In block 1710, a processor 110 may request the RPM 157 (FIG. 14) to generate a shutdown signal to the controller 101. In block 1715, the RPM 157 may send the shutdown signal to the controller 101.

The controller 101 may receive the shutdown signal in block 1720 and activate the trigger sets 314 which may be assigned to a shutdown event as illustrated in FIG. 16. In the exemplary embodiment illustrated in FIG. 16, the shutdown signal is matched against the interrupt field 316 of the trigger set 314. The trigger set 314 directs the controller 101 to access a sleep set 308 as indicated in the "go to set" field 320. In block 1725, the controller 101 may immediately send an acknowledgment signal to the RPM 157 while the controller 101 continues to activate resource sets 304 that are referenced by the trigger sets 314 which match the shutdown signal event.

In block 1730, for each matching trigger set 314, such as the matching trigger set 314 listing the "shutdown" event in the corresponding interrupt field 316 illustrated in FIG. 16, the controller 101 may switch the current resource set 304 to a sleep set 308, such as the sleep set 308A of the first resource set 305A for the master processor 110A of FIG. 15.

Next, in block 1735, the controller 101 may issue sleep request states to low-level drivers 103 such as illustrated in FIG. 14. The low-level drivers 103 may pass the requested states to the corresponding resources 105.

In block 1740, each resource 105 may issue a shutdown signal acknowledgment to the controller 101 and the RPM 157. The method 1700 may then end.

Figure 18:
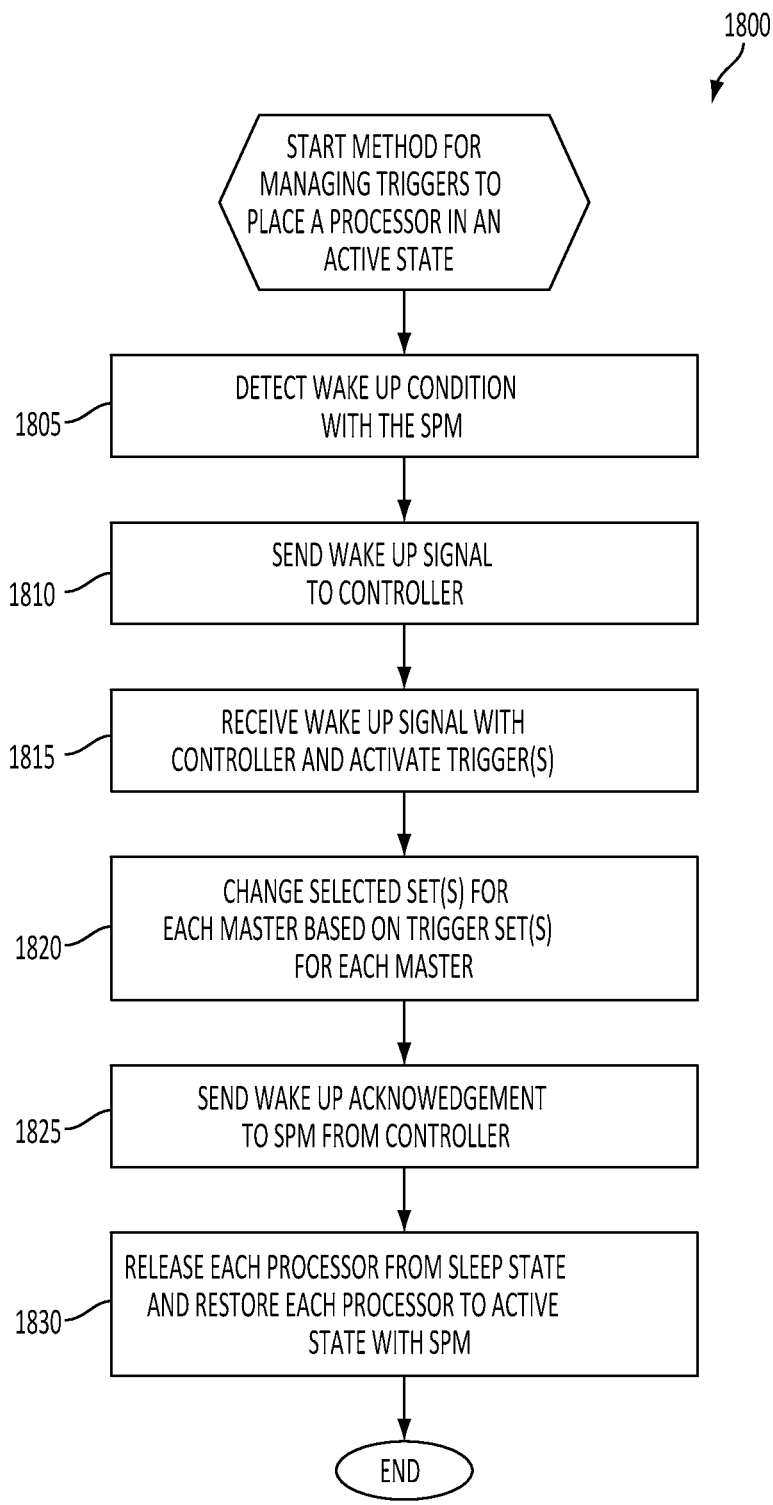
FIG. 18 is a logical flowchart illustrating a method for managing triggers sets and otherwise transitioning a processor from the second application state, such as a sleep state to a third application state, such as an awake state.

FIG. 18 is a logical flowchart illustrating a method 1800 for managing trigger sets 314 to place a processor 110 in an active state from a sleep state. Block 1205 is the first step in method 1800. In block 1805, a wake-up condition or wake-up event is detected with the RPM 157, or the wake-up event is detected directly by the controller 101, which may have its own interrupt controller (not illustrated). Exemplary embodiments may be designed such that wakeup interrupts may not be detectable by the RPM 157. In such exemplary embodiments, the controller 101 may use its interrupt controller to detect them and have these "mapped" to sleep set requirements for a master processor 110.

Next, in block 1810 the RPM 157 may send a wake-up signal to the controller 101. In block 1815, the controller 101 may receive the wake-up signal from the RPM 157 and activate one or more trigger sets 314 that matched the wake-up signal. For example, the controller 101 may match the wake-up signal with the "bring up" event listed in the interrupt field 316 in the "active" column of the trigger set 314 of FIG. 16. In the exemplary embodiment of FIG. 16, the "go to field" 320 in the active column 324 directs the controller to the last resource set 304 which was used by the current processor 110.

So in block 1820, the controller 101 would change the current resource set 304 for a processor 110 based on this matching trigger set 314. One of ordinary skill in the art recognizes that the controller 101 will cycle through all of its trigger sets that it maintains as illustrated in FIG. 15.

Next, in block 1825, the controller 101 may send a wake-up acknowledgment to the RPM 157 identifying which master processors 110 have been awakened from the sleep state. Next, in block 1830, each processor 110 with a matching wake up trigger set 314 is released from a sleep state and restored to its active state with power supplied by the RPM 157. The method 1800 then ends.

Figure 19:
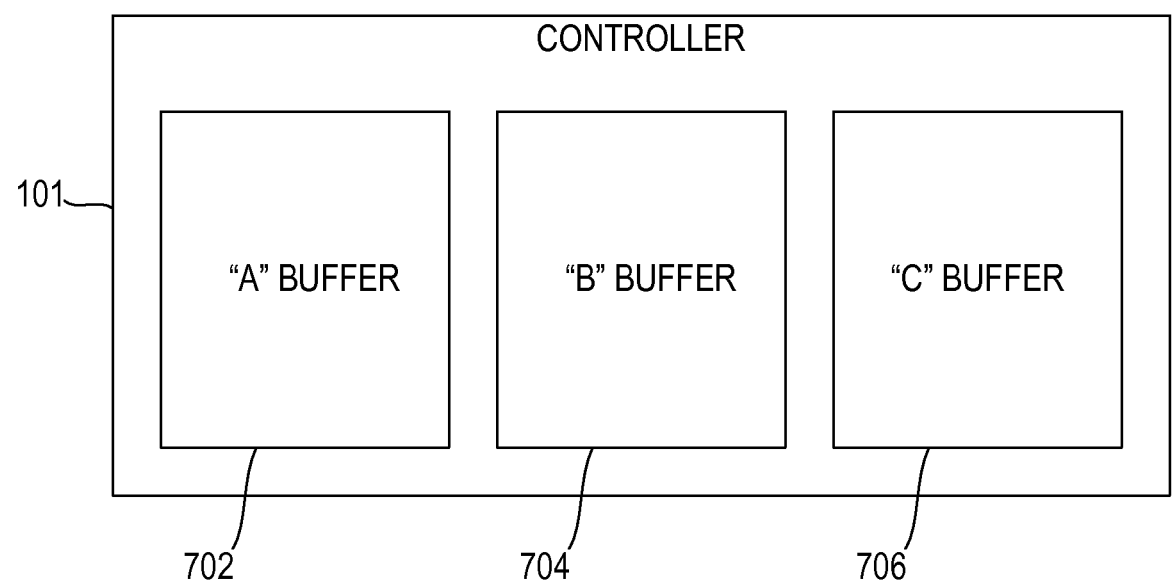
FIG. 19 is a functional block diagram of controller buffer memory.
Figure 20:
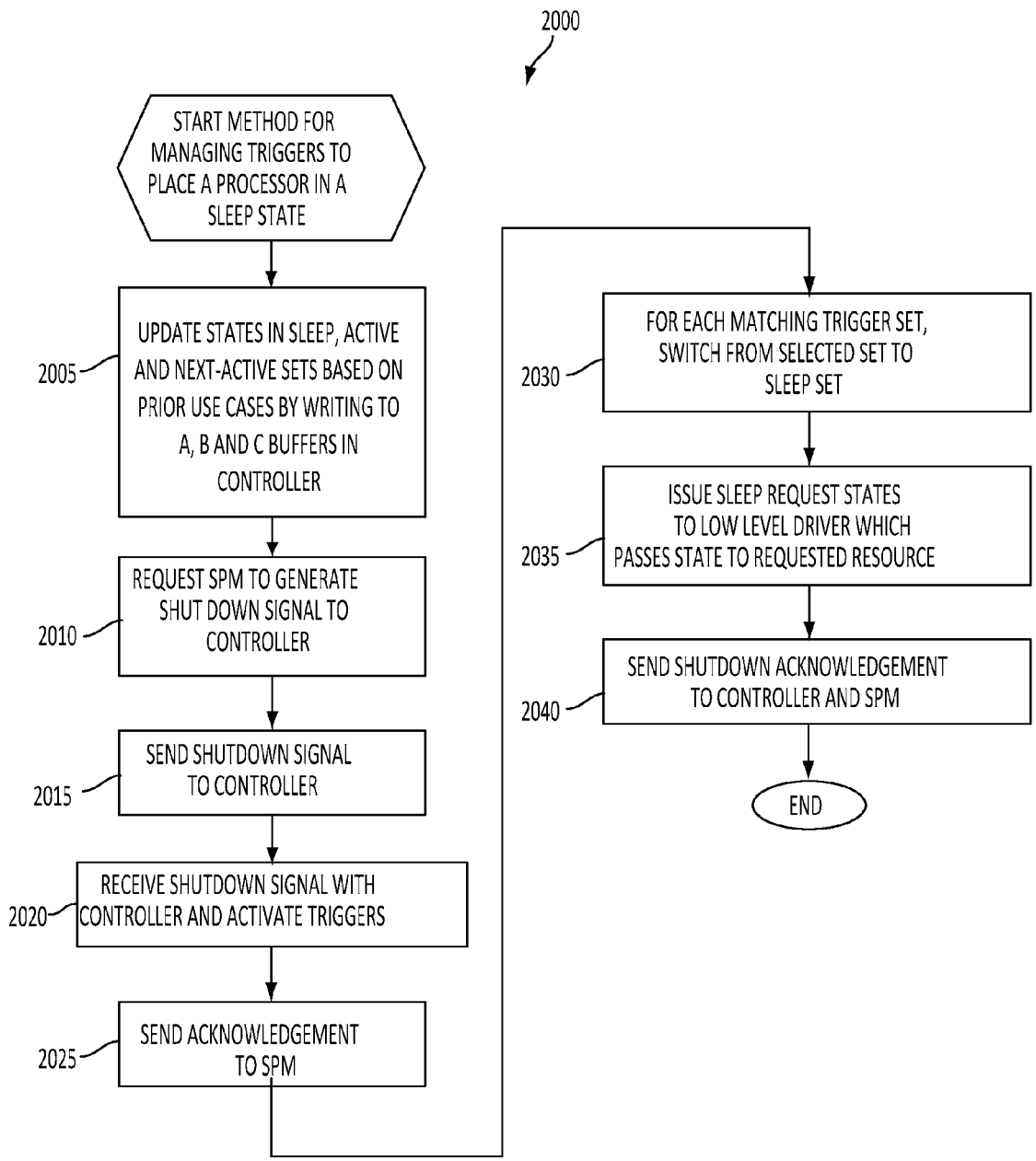
FIG. 20 is a logical flowchart illustrating an alternative method for transitioning a processor from a first application state, such as an awake state, to a second application state, such as a sleep state.

FIGS. 19-20 illustrate another feature, which is referred to in this description as "next-active resource state set" or "next-active set." One example of a next-active set is a next-awake set. The next-awake set or other next-active set may be used in the same manner described above with regard to FIG. 18 and the resource set 304 to which the controller 101 switches upon a wake-up event.

FIG. 19 is similar to FIG. 15 in that it represents information stored in the controller 101. In an exemplary embodiment, the controller 101 may include three memory buffers, referred to in this description for convenience as the "A" memory buffer 702, the "B" memory buffer 704, and the "C" memory buffer 706.

FIG. 20 is a logical flowchart similar to FIG. 17 in that it illustrates a method 800 for placing a processor into a sleep state. Block 2005 is the first step of the method 800 and is similar to block 1705 described above with regard to FIG. 17. Block 2005 indicates that processor 110 may update not only an active or awake resource state set and a sleep resource state set but also a next-awake resource state set. As shown in FIG. 20, the processor may cause the active set to be stored in the "A" buffer 702 (FIG. 19) of the controller 101, the sleep set to be stored in the "B" buffer 704 (FIG. 19) of the controller 101, and the next-awake set to be stored in the "C" buffer 706 (FIG. 19) of the controller 101. Other aspects of block 2005 are the same as described above with regard to block 1705 and are therefore not described here.

Blocks 2010, 2015, 2020, 2025, 2030, 2035 and 2040 are the same as blocks 1710, 1715, 1720, 1725, 1730, 1735 and 1740, respectively, of FIG. 17 and are therefore not described here. Note that when the processor begins shutting down, it is in the awake application state corresponding to the awake set stored in the "A" buffer 702 (FIG. 19). The processor then enters the sleep application state corresponding to the sleep set that is stored in the "B" buffer 704 (FIG. 19) in the same way as described above with regard to FIG. 17. The processor awakes (FIG. 18) from the sleep application state in the next-awake application state corresponding to the next-awake set that is stored in the "C" buffer 706 (FIG. 19). By pre-storing the next-awake set updates in the "C" buffer 706 and applying them as soon as possible, the controller 101 is able to immediately begin configuring the resources specified by that next-awake set upon a wake-up event, thereby helping to minimize resource latency.

Figure 21:
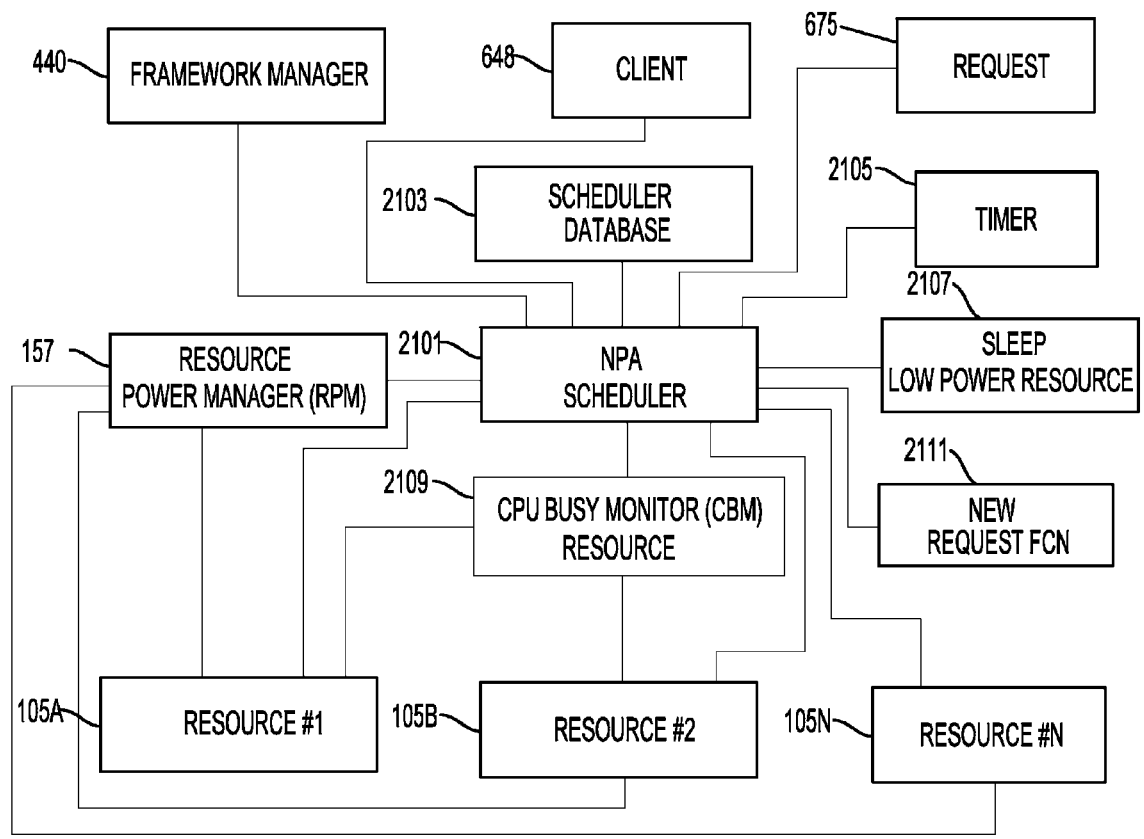
FIG. 21 is a functional block diagram illustrating relationships between a node scheduler, a scheduler database, and the resource power manager and other node architecture system elements.

FIG. 21 is a functional block diagram illustrating relationships between a node scheduler 2101, the resource power manager ("RPM") 157, and other node architecture system elements. Specifically, the scheduler 2102 is coupled to a scheduler database 2103; the resource power manager 157; a CPU busy monitor ("CBM") resource 2109; a sleep low-power resource 2107; a timer 2105; the framework manager 440 of FIG. 3; and various resources 105A-N. The RPM 157 has been described above in connection with FIGS. 14-15. The RPM 157 works with a controller 101 (See FIG. 15) for maintaining and monitoring resource sets 304 that include active and sleep sets for maintaining states of various processors 110 of the PCD 100.

Resources 105A-105N are described above in connection with FIGS. 3-6 and 14-16. Resources 105 may comprise hardware and/or software. The resources 105 may receive requests 675 managed by the scheduler 2101.

The scheduler 2101 is part of the framework as described above in connection with FIG. 3. The scheduler 2101 is coupled to the framework manager 440. The scheduler 2101 provides a queuing feature which specifies at which time a request 675 issued by a client 648 (See FIGS. 3-5 which illustrate details for clients 648 and requests 675 described above in connection with the framework manager 440) destined for a resource 105 will be applied based on the timing deadline specified in the request. Timing for the scheduler 2101 is tracked by the timer 2105.

After a scheduled request 675 is made by client 648, then the calling application or entity may then continue on with its own processing. The scheduler 2101 will then determine the best way to execute the request 675 based on the deadline provided by the client 648.

The scheduler 2101 looks at each scheduled request 675 and determines how long the scheduled request 675 will take to execute. The scheduler 2101 also performs back-off calculations. The scheduler 2101 works with the timer 2105 and/or with the sleep cycle of a processor 110 to understand what scheduled requests 675 can be applied and when they should occur to meet the requested deadline as specified by a client 648 or calling entity.

The timer 2105 may comprise a clock that includes a 32-bit timer running at T tick time, as understood by one of ordinary skill in the art. Other clocks may be employed without departing from this disclosure. For example, 64-bit timer systems may be used as understood by one of ordinary skill in the art. For 32-bit timers, the scheduler 2101 may determine if a time for a request 675 is in the past or future by looking at the difference between the current time tracked by the timer 2105 and the requested time specified in the scheduled request 675.

To detect a late request 675 versus one in the far future with a 32-bit timer system, a desired time must be less than half the resolution of the time if the difference is less than UINT_MAX (0X8000 0000), then it is considered by the scheduler 2101 to be in the future. If requested time is greater than or equal to UINT_MAX, the requested time is considered by the scheduler 2101 to occur in the past and the scheduler 101 usually processes such a request 675 immediately.

The timings described above determined by the scheduler 2101 are stored by the scheduler 2101 in the scheduler database 2103. The scheduler database 2103 maintains information which may relate to various ways that requests 675 may be performed and the respective timing needed for the requests 675 when they occur in specific sequences. In other words, the scheduler 2101 may track various options and their respective times that it may take for the scheduler 2101 to service requests 675 according to different scenarios and store these values in the scheduler database 2103. Further details about the scheduler database 2103 will be described below in connection with FIG. 22.

The sleep low power resource ("LPR") 2107 determines what resources 105 need to be triggered when the system 100 wakes up from a sleep state by reviewing the database 2103. The sleep LPR 2107 may be characterized as an application programming interface (API). The sleep LPR 2107 will issue those requests 675 that it determines to be present in the next awake set of a resource set 304 managed by the controller 101 and RPM 157.

The CPU busy monitor ("CBM") resource 2109 is established by the scheduler 2101. The CBM resource 2100 tracks the states of all CPUs 110 that service requests 675 managed by the scheduler 675. Any nonzero requests 675 to the CBM resource 2109 indicate that the client 648 or a user thread 2301 (See FIG. 23) issuing the request 675 expects a CPU 110 to remain busy during execution of the request 675. The CBM resource 2109 is a binary resource meaning that a CPU 110 is considered busy by the CBM resource 2109 as long as any client 648 is busy and the CPU 110 is not characterized as free or not busy until the last client 675 completes a nonzero or busy request. Further details about the operation and relationship between the scheduler 2101 and CBM resource 2109 will be describe below in connection with FIG. 29.

FIG. 22 is a diagram illustrating exemplary contents of the scheduler database 2103. As described above in connection with FIG. 21, the scheduler database 2103 maintains information which may relate to various ways that requests 675 may be performed and the respective timing needed for the requests 675 when they occur in specific sequences. In other words, the scheduler 2101 may track various options and their respective times that it may take for the scheduler 2101 to service requests 675 according to different scenarios and store these values in the scheduler database 2103.

The scheduler database 2103 may include, but is not limited to the following information: thread configuration data 2205; scheduler latency 2210; minimum scheduler delta 2215; request latency 2220; fork look-ahead delta 2225; fork latency 2230; join latency 2235; sleep wake transition latency 2245; time queue latency; low power resource ("LPR") enter latency 2250; LPR exit latency 2255; LPR now delta 2260; scheduled linked lists 2270; request states 2275; request times 2280; start times 2285; late probability 2287; callback notifications 2290; latest notifies states 2293; and request lateness 2295.

The thread configuration data 2205 may track various information from threads that originate clients 648 and requests 675. The scheduler latency 2210 may measure the time it takes to handle the scheduler code in ticks measured by the timer 2105. The minimum scheduler delta 2215 may measure the time that a requests 675 will be rescheduled because it is too far into the future to be handled by a current timeout.

The request latency 2220 may measure a default scheduled request latency used if a scheduled requests 675 is issued on a resource 105. Request latency 2220 may comprise a time expected from issuing a fully asynchronous request 675 for completion. The fork look-ahead delta 2225 may measure the time to add to a sleep wake time determining what requests 675 may be eligible to be forked. This delta 2225 may be used to compensate for the work that a sleep set may have to perform when waking up from a sleep state.

The fork latency 2230 is a default scheduled fork latency that may be used if a scheduled request is issued on a resource 105 but the resource 105 does not support a fork request latency query. Fork latency 2230 comprises the time from issuing a forked request 675 to when it returns. A request for fork latency 2230 is only valid for a resource 105 which is forkable.

Join latency 2235 may comprise the time when a fork operation completes until the resource 105 is joined and the forked request is retired. The join latency 2235 is also a default scheduled fork latency that may be used if a scheduled request 675 is issued on a resource 105 but the resource 105 does not support a join latency query.

The sleep wake transition latency 2240 measures a time that it takes for a sleep set to exit a sleep state, the time needed for the timer 2105 to fire, and any time needed when multiple requests 675 are joined. The time queue latency 2245 may measure the time it takes for the timer 2105 to call a timer function.

The low power resource ("LPR") enter latency 2250 may comprise a default time for overhead when using the LPR enter function. The LPR exit latency 2255 may comprise a default time for overhead when using the LPR exit function. The LPR now delta 2260 may comprise a default time for the LPR enter function to reschedule the timer 2105.

The remaining data of the scheduler database 2103 may be characterized as request definitions 2265 as illustrated in FIG. 22. The scheduled linked list 2270 may track clients 648 that are waiting to run. The request state 2275 may track the states of various requests 675 such as waiting, processing, forked, joined, etc. the request time 2280 may comprise the time in which a requests 675 must be completed. The start time 2285 may track the time needed to start a requests 675 issued from a client 648.

The late probability parameter 2287 provides flexibility to the scheduler 2101 when it is time for the scheduler 2101 to schedule requests 675. If the late probability parameter 2287 is set equal to 0, then this means that a request 675 may not tolerate any lateness with respect to its scheduling by the scheduler 2101. If it is set equal to one, then the scheduler 2101 may allow a request 675 to be late if such lateness will help the scheduler 2101 process its current set of requests 675. The scheduler 2101 may also track values between 0 and 1 as an accepted rate of lateness. Thus, a value between 0 and 1 can be set such that the client will accept half of the requests being late. Another value between 0 and 1 may be set such that all requests may be accepted late. And so on.

The callback notification 2290 tracks when a call back to a client 648 issuing a request 675 has been completed. The latest notify state 2293 tracks whether callback notifications have been issued on time; have been issued late; or the request was unscheduled. And request lateness 2295 may track times when requests 675 were not late, times when a requests 675 were late, and/or the sum of time between when a late request 675 finished and when it was requested. The scheduler database 2103 is not limited to these parameters. Other parameters may be tracked by the scheduler database 2103 as understood by one of ordinary skill the art.

Figure 23:
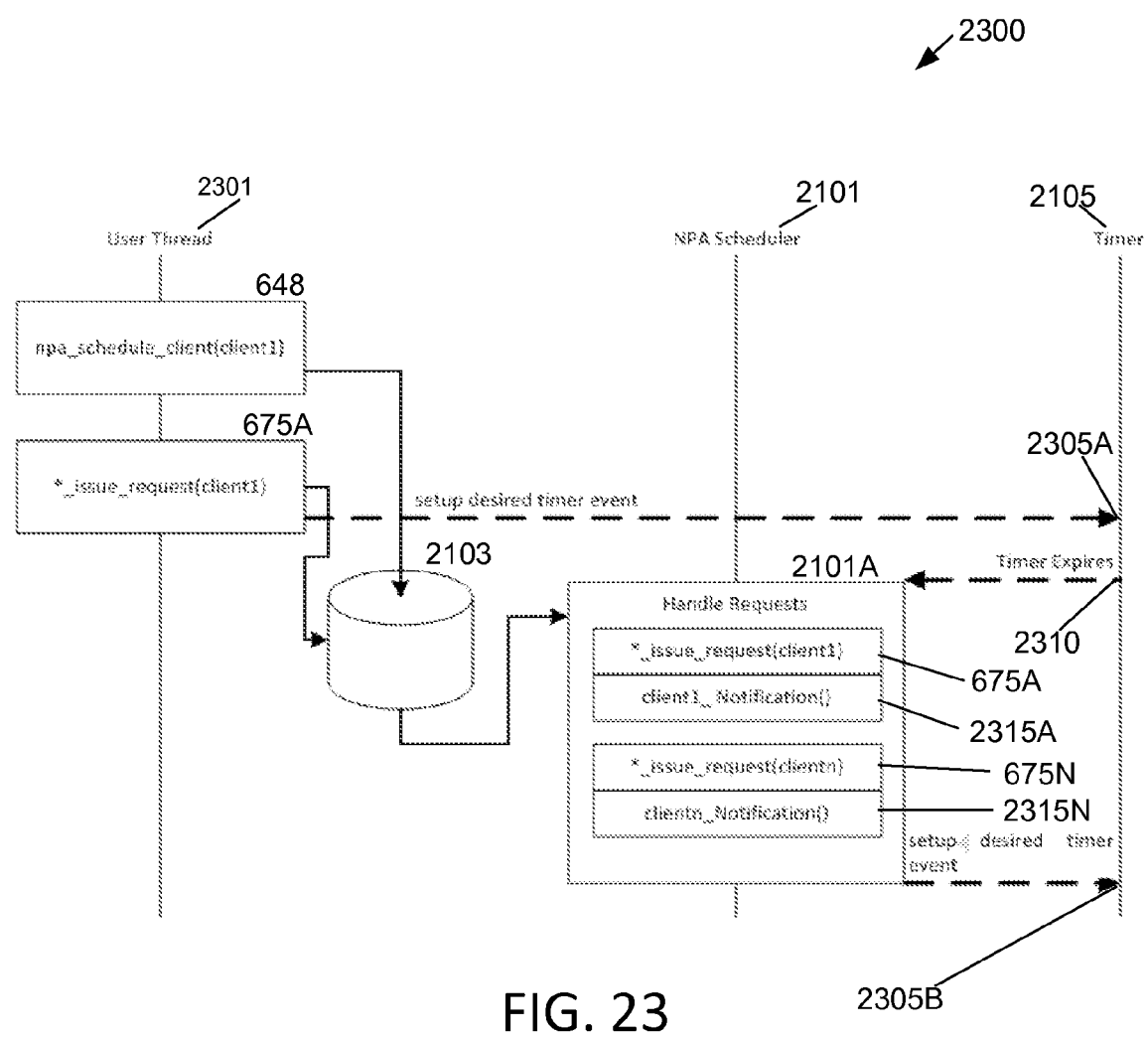
FIG. 23 illustrates an exemplary timing diagram that demonstrates relationships between clients, client requests, the scheduler, and the timer.

Referring now to FIG. 23, this figure illustrates an exemplary timing diagram 2300 that demonstrates relationships between clients 648, client requests 675, the scheduler 2101, and the timer 2105. The Y-axis of FIG. 23 corresponds with time. See prior discussion of FIGS. 3-6 for the baseline discussion of clients 648 and requests 675.

A client 648, established by a user thread 2301, wants to make a scheduled request 675 to a resource 105 (not illustrated) to occur at a specific requested deadline of time X. The user thread 2301 issues the request 675 after the client 648 has been created within the framework 300.

The request 675 may comprise any type of request such as, but not limited to, a vector request, a scalar request, or any other standard synchronous request as described previously. The scheduler 2101 places the information from the request 675 into the database 2103. The information from the request 675 may include, but is not limited to, the information described above in FIG. 22 in connection with the database 2103.

Specifically, the scheduler 2101 determines at what time each request 675 should be executed so that all requests 675 are finished or executed by their respective deadlines. The scheduler 2101 may also calculate back off for each request 675. The scheduler 2101 maintains this information in the database 2103. As described previously, the database 2103 maintains information which may relate to various ways that requests 675 may be performed and the respective timing needed for the requests 675 when they occur in specific sequences. In other words, the scheduler 2101 may track various options and their respective times that it may take for the scheduler 2101 to service requests 675 according to different scenarios and store these values in the scheduler database 2103.

After time, at client block 675, the user thread 2301 or requesting entity may continue with its own processing of other data or functions. The scheduler 2101 determines the time at which the one or more resources 105 must be awakened to process one or more requests 675, and then the scheduler 2101 issues a timing command to the timer 2015 at stage 2305A.

At stage 2310, the timer 2015 expires or hits the time specified by the scheduler 2101 and issues a signal to the scheduler 2101. At stage 2310, the scheduler 2101 queries the database 2103 and determines the one or more requests 675 that it needs to process. While the scheduler 2101 is executing the requests 675 listed in the database 2103 for the particular stage 2310, the scheduler 2101 is measuring and tracking if requests 675 are being processed on time or if they are running late. The scheduler 2101 at this stage 2310 also determines the respective durations of the requests 675 for their completion and records this information in the database 2103.

The scheduler 2101 at the stage 2310 may also determine to delay the processing or execution of certain requests 675 and the scheduler 2101 may then issue additional timing commands to the timer 2105 ("setup desired timer event") so that these other requests 675 as listed in the database 2103 may occur at a later time.

The scheduler 2101 will try to honor and execute all requests 675 in the database 2103 even if the scheduler 2101 needs to run certain requests 675 later than their requested deadlines as specified by the client 648 in accordance with the user thread 2301 145.

When the scheduler 2101 determines that a resource 105 completes a request 675A, it generates a client notification or call back 2315A. In this client notification 2315A, the scheduler 2101 will inform the client 648 if the request 675A was performed on time (by the requested deadline) or if it was performed later than the requested deadline.

Each request 675 may also comprise additional information such as a probability of lateness 2287, as described above in connection with FIG. 22. This probability of lateness parameter 2287 may provide flexibility to the scheduler 2101 when it is time for the scheduler 2101 to schedule requests 675.

If the probability of lateness parameter 2287 is set equal to 0, then this means that a request 675 may not tolerate any lateness with respect to its scheduling by the scheduler 2101. Meanwhile, if the probability of lateness parameter 2287 is set equal to 0x8000 0000 out of 0xffff ffff (fifty percent), this means that the request 675 may tolerate lateness 50 out of every 100 times (one percent) that the request 675 is processed by the scheduler 2101. The probability of lateness parameter 2287 allows the scheduler 2101 to schedule requests 675 with some flexibility.

For example, suppose a request 675 may take at least 10 milliseconds (ms) to be completed by a resource 105. In some situations, the request 675 may only take 1 ms to be completed by a resource 105 ninety-nine percent of the time. If the probability of lateness parameter for this request 675 is set equal to zero, then the scheduler 2101 must schedule this request at least 10 seconds out from its requested deadline so that the request 675 is completed on time.

However, if the probability of lateness parameter 2287 is set equal to 0x2900000 (meaning one percent), then the scheduler 2101, at its discretion, may schedule this request 675 one second out from its requested deadline such that the request 675 may be completed on time if its duration only lasts one msecond. But the request 675 could finish much later than its requested deadline if its duration exceeded 1 ms, such as the worst-case 10 ms scenario described above.

The database 2103 may also maintain a worst-case value for each request 675. The worst-case value typically comprises the most conservative estimation of a request start time 2285 (see database parameter discussed above in connection with FIG. 22) so that a request 675 is completed by a specified deadline. As noted previously, each request 675 has a deadline specified by the client 648 via a user thread 2301. As a default, when the probability of lateness parameter 2287 is not specified or provided with a value in the request 675, then the scheduler 101 will always use the worst-case value for the request 675.

Figure 24:
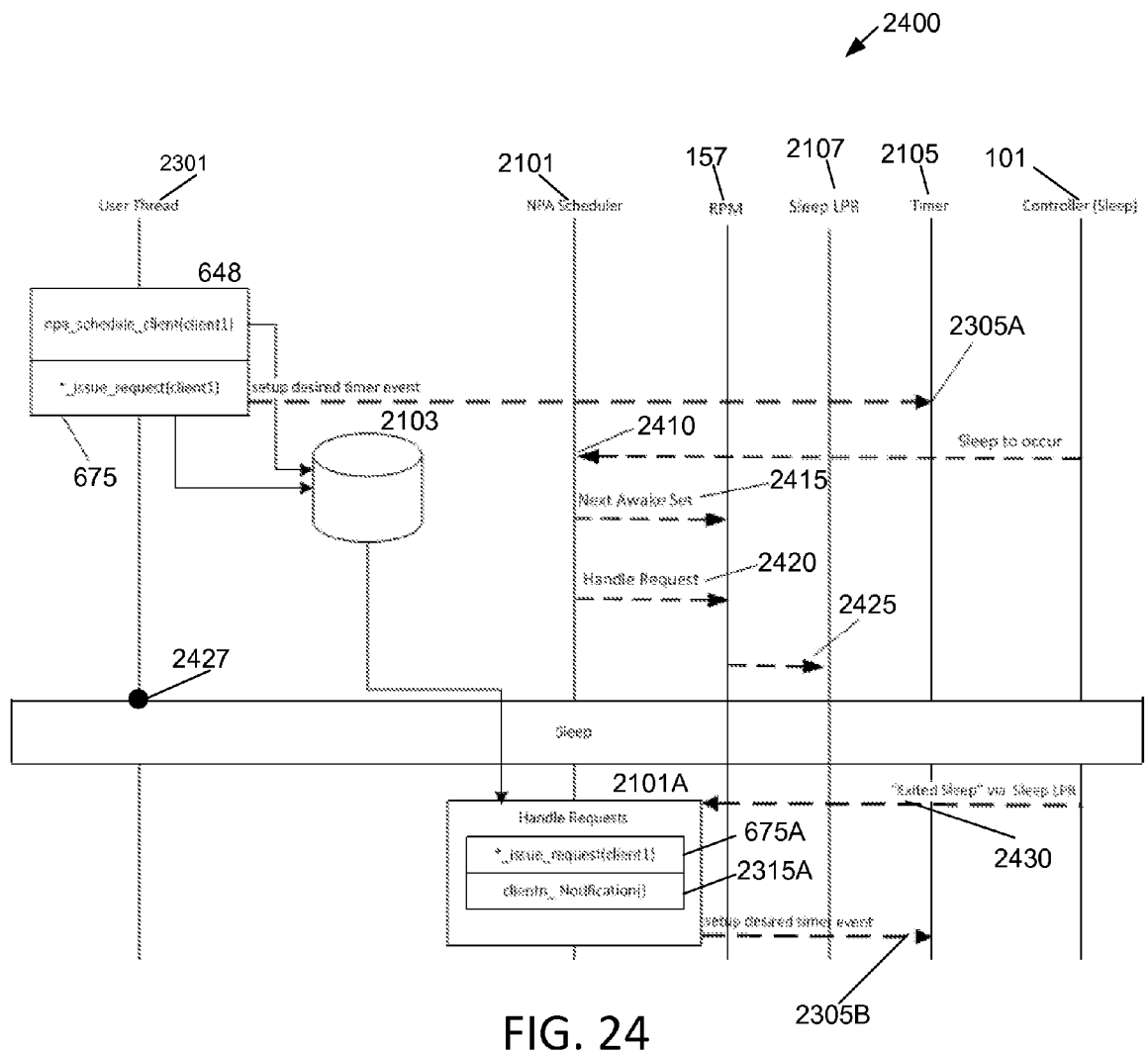
FIG. 24 illustrates an exemplary timing diagram that demonstrates relationships between clients, client requests, the scheduler, the timer, and the controller that tracks sleep sets.

Referring now to FIG. 24, this figure illustrates an exemplary timing diagram 2400 that demonstrates relationships between clients 648, client requests 675, the scheduler 2101, the timer 2105, and the controller 101 that tracks sleep sets. The Y-axis of FIG. 24 corresponds with time. See prior discussion of FIGS. 3-6 for the description of clients 648 and requests 675. See also FIG. 15 that illustrates further details of the controller 101 that tracks sleep sets as previously described above.

A client 648, via a user thread 2301, wants to make a request 675 to a resource 105 (not illustrated). The client 648 wants the request 675 to occur at a specified time. The request 675 may comprise any type of request 198 such as, but not limited to, a vector request, a scalar request, or any other standard synchronous request.

The scheduler 2101 puts the information from the request 675 into the database 2103. As noted above, the scheduler 2101 figures out what time each request 675 should be executed so that all submitted requests 675 are finished or executed by their respective deadlines. The scheduler 2101 at this stage calculates back off After time, at request block 675, the user thread 2301 or requesting entity may continue with its own processing of other data or functions. The scheduler 2101 determines the time at which the one or more resources 105 (not illustrated) must be awakened to process request 675 and then the scheduler 101 issues a timing command to the timer 860 at stage 2305A.

A sleep event is scheduled to occur at stage 2427. At stage 2410, the controller 101 (or scheduler 2101 reviewing the resource states 304 of the controller 101) stores in the database 2103 the duration of the sleep event or sleep cycle at stage 2427 and its anticipated wake-up time at stage 2430. At stage 2415, the scheduler 2101 may communicate the next awake set of a resource set 304 (See FIG. 15) to the resource power manager ("RPM") 157 so that the RPM 157 will know which awake set should be used once the sleep cycle at stage 2427 has finished.

The scheduler 2101 may include one or more requests 675 that should now be made part of the next awake set of a resource set 304 so that these requests 675 are executed when the system comes out of the sleep state at stage 2430. After the RPM communication at stage 2415 in which the next awake sets are communicated to the RPM 157, at stage 2420, the scheduler 2101 issues the command "handle request" 675. The command handle request 675 causes the RPM 157 to include any subsequent requests 675 at this stage to be part of the next awake set of a resource set 304 managed by the controller 101.

As noted previously, the database 2103, at a high level, tracks clients 648, resources 105, and requests 675. The database 2103 may also track the requested deadline which is part of a request 675.

The database 2103 may also maintain the calculations made by the scheduler 2101 that include the time each request 675 needs to be completed, the time each request 675 needs to be started, the end time for each request 675, the duration to run a request 675, the duration needed to perform a notification or callback to the originating client or user thread 2301, the duration of all handling, and the duration of any timers 2015 before a request 675 is executed.

If there are multiple requests 675, then the database 2103 tracks calculations made by the scheduler 2101 on any overlap in timing which may occur between multiple requests 675 and any shifting in timing because of this overlap. Specifically, the high-level data mentioned above may be tracked by the information as listed in FIG. 22 described above.

A resource 105 may provide information to the database 2103 on how long certain requests 675 may take, also referred to as latency, for execution by that resource 105 or another resource 105. The scheduler 101 may query a resource 105 for at least three types of latency data as described above in connection with FIG. 22: request latency 2220, fork latency 2230, and join latency 2235. If the resource 105 does not provide a value for any latency, the resource's default values will be used.

If a resource 105 would rather handle a request 675 directly and not have the scheduler 2101 involved, it can return a latency value of zero in response to the request latency command from the scheduler 2101. Upon receiving this zero value for latency, scheduler 2101 may then drop the handling of the request 675 so that the resource 105 handles the request 675 directly.

A resource 105 may provide additional information beyond what is requested in a latency request from the scheduler 2101. For example, a resource 105 may inform the scheduler 2101 that the resource supports at least two modes of operation with respect to the actual request (issued by the client 648 via the user thread 2301) to be serviced by the resource 105. The resource 105 may provide the scheduler 2101 with data on latency for each of the two modes of operation.

At stage 2425 just prior to the sleep state at stage 2427, the scheduler 2101 via the controller 101 handling the sleep state will call the sleep scheduler low-power resource ("LPR") 2107. The sleep LPR 2107 determines what resources 105 need to be triggered when the system wakes up from the sleep state at stage 2427 by reviewing the database 2103. The sleep LPR 2107 may be characterized as an application programming interface (API).

The sleep LPR 2107 will issue those requests 675 that it determines to be present in the next awake set of a resource set 304 managed by the controller 101. At this stage, tremendous energy savings may be realized since the sleep LPR 2107 is preplanning requests 675 that need to be processed when the system, that includes a processor 110, exits from the sleep state at stage 2430.

Specifically, just prior to the sleep state at stage 2425, the sleep LPR 2107 will identify which resources 105 have scheduled requests 675 that could be advanced and processed upon exiting the sleep state at stage 2430 and that may be placed in the next awake set of a resource set 304.

The requests 675 will be issued as forkable requests 675, and the sleep LPR 2107 will then notify the controller 101 and the scheduler 2101 of the new deadline for the scheduler 2101 to perform the join functions. The sleep state at stage 2427 can then proceed normally. When the system or processor 110 wakes up at stage 2430, the RPM 157 will signal the join and the LPR's exit function will signal the scheduler 2101 to join the requests 675. When the sleep state is exited at stage 2430, the scheduler 2101 may complete any final work needed prior to use of a resource 105 and then invoke a scheduled client's completion callback or client notification 2315A.

Figure 25:
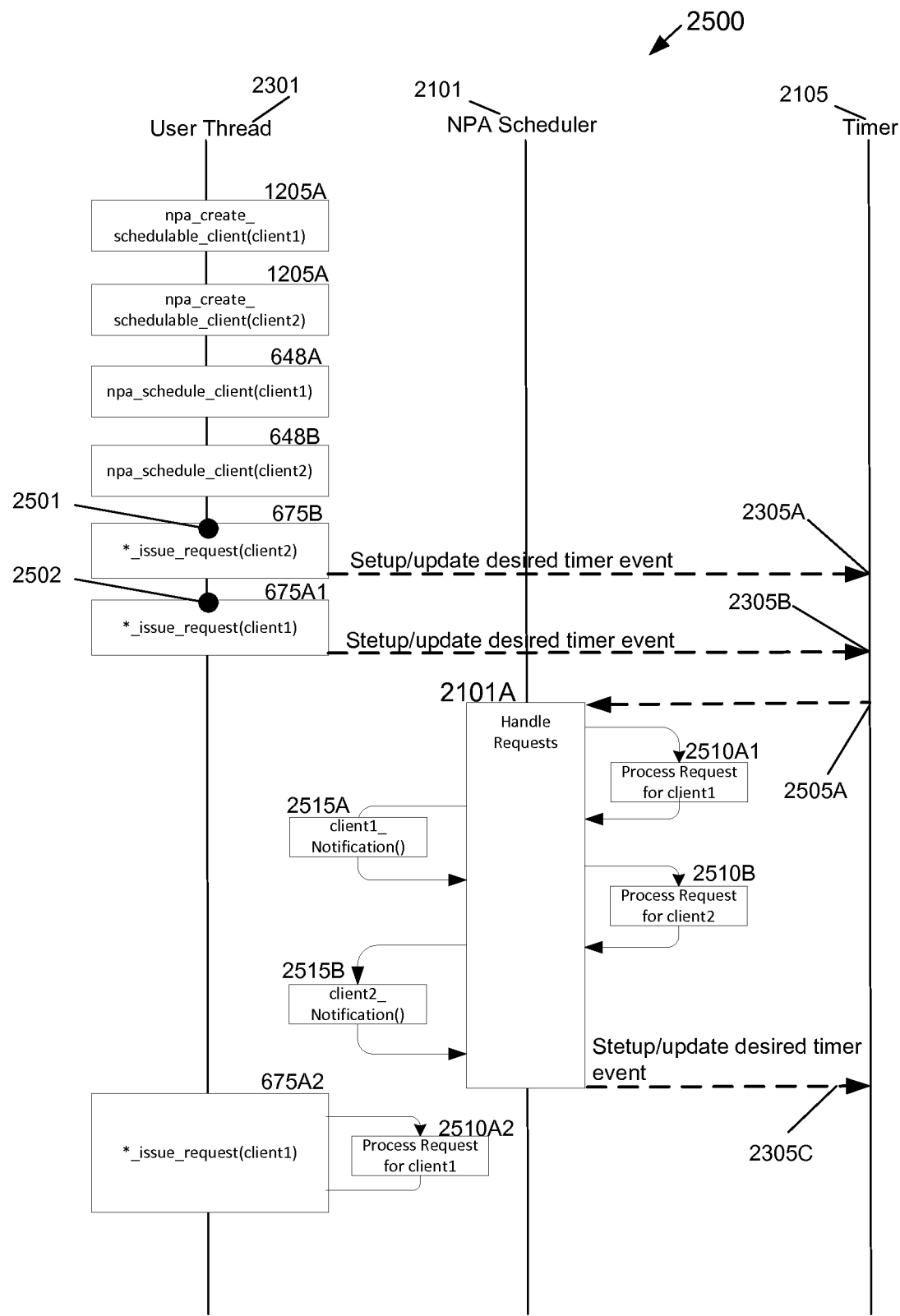
FIG. 25 illustrates an exemplary timing diagram when one or more user threads 2301 create two requests 675 in blocks 1205A, 1205B by calling the scheduler 2101.

FIG. 25 illustrates an exemplary scenario when one or more user threads 2301 create two requests 675 in blocks 1205A, 1205B by calling the scheduler 2101. See FIG. 12 described above for creating requests 675.

The first request is created in block 1205A as a first client 648A while the second request is created in block 1205B as a second client 648B. The user thread 2301 indicates to the scheduler 2101 that these two requests 675A1, 675B from clients 648A, 648B will be scheduled requests 675 and that the first request 675A1 from the first client 648A is going to be completed earlier in time relative to the second request 675B from the second client 648B.

The user thread 2301 then issues the requests 675A1, 675B as represented by blocks 675A1, 675B. While the first request 675A1 from the first client 648A is to occur prior to the second request 675B from the second client 648B, the user thread 2301 may issue the requests 675 in any order. Therefore, as illustrated in FIG. 25, the second request 675B from the second client is issued at stage 2501 before the first request 675A1 from the first client at stage 2502.

The scheduler 2101 records the data from the issued requests 675 157B1, 157B2 in the database 2103 at this stage and establishes the time the request 675 will be processed by working with the timer 2105. Specifically, the scheduler 2101 informs the timer 2105 of certain triggers 314, as described above in connection with FIGS. 15-16. Triggers 314 indicate at what time each request 675A1, 675B should be started.

When the timer expires at stage 2505A which may correspond with the triggers that were communicated to the timer 314 by the scheduler 2101 noted above, the scheduler 2101 at block 2101A may process the first request 675A1 at block 2510A1. Then at block 2515A, the scheduler 2101 may issue the client notification that the first request 675A1 was completed by the scheduler 2101.

In block 2510B, the scheduler 2101 may then process the second request 675B. Then, in block 2515B, the scheduler 2101 may issue the client notification that the second request 675B was completed by the scheduler 2101. As noted previously, the first request 675A1 was processed prior to the second request 675B since the first request 675A1 had a finish or end time that was earlier then the finish or end time for the second request 675B.

According to one exemplary embodiment, the scheduler 2101 manages requests 675 on a first-come, first-served basis. This means that if two or more requests 675 have the same desired end time or completion time, then the scheduler 2101 may process and complete the request 675 which first reaches the scheduler 2101 for scheduling. The later-to-arrive request 675 at the scheduler 2101 will be completed in time after the request 675 which reaches the scheduler 2101 first, even though both requests 675 may have the same completion deadline.

So for the exemplary embodiment illustrated in FIG. 25, if both the first and second requests 675A1, 675B had the same desired completion times, then the second request 675B would have been completed prior to the first request 675A1 because the second request 6755B reached the scheduler 2101 first before the first request 675A1 did. It follows then that blocks 2510A1 and 2515A and blocks 2510B and 2515B would have been reversed to reflect the completion of the second request 675B prior to the completion of the first request 675A1.

However, the scheduler 2101 is not limited to this exemplary embodiment of the first-come first-serve protocol. In other exemplary embodiments, the scheduler 2101 may be provided with functionality that allows it to schedule requests 675 according to how quickly they may be completed and/or how their completion may impact the power savings for the portable computing device 100.

In some exemplary embodiments, there may be no overlap in the timing between requests 675. For example, if the first request 675A1 was required to be completed at a hypothetical time deadline of 100 with a back-off of 10 ms, and if the second request 675B was required to be completed at time 150 with a back-off of 10 ms, then there is no overlap in the scheduling of these two requests 675A1, 675B with these timings. Each request 675 in such an exemplary scenario would be provided with its own timer event such that two timer events would be established to process these two non-overlapping requests 675A1, 675B.

Usually, multiple requests 675 may be collapsed and processed by the scheduler 2101 when there is some overlap in time between multiple requests 675. Overlap between requests 675 may be defined in terms of timing as well as system overhead needed to process the requests 675.

For example, the scheduler 2101 may determine if it is more efficient to process two requests 675 concurrently or in sequence rather than creating two separate timer events if the requested deadlines for the two requests 675 are significantly far apart from one another. In other words, the scheduler 2101 may override requested completion deadlines if it determines that scheduling two requests 675 concurrently or in sequence would be more efficient than creating two separate timer events with timer 2105.

This efficiency determination by the scheduler 2101 of when requests 675 should be processed prior to a requested deadline may take into consideration power consumption of the PCD 100. The scheduler 2101 may schedule requests 675 earlier than their requested deadlines if it determines that the PCD 100 currently has sufficient power to process the requests 675 compared to a requested deadline in which the PCD 100 may have less power to process one or more requests 675. The scheduler 2101 may track power consumption of requests 675 by determining if a particular request 675 relates to an "ON" state or if a particular request 675 relates to an "OFF" state.

Figure 26:
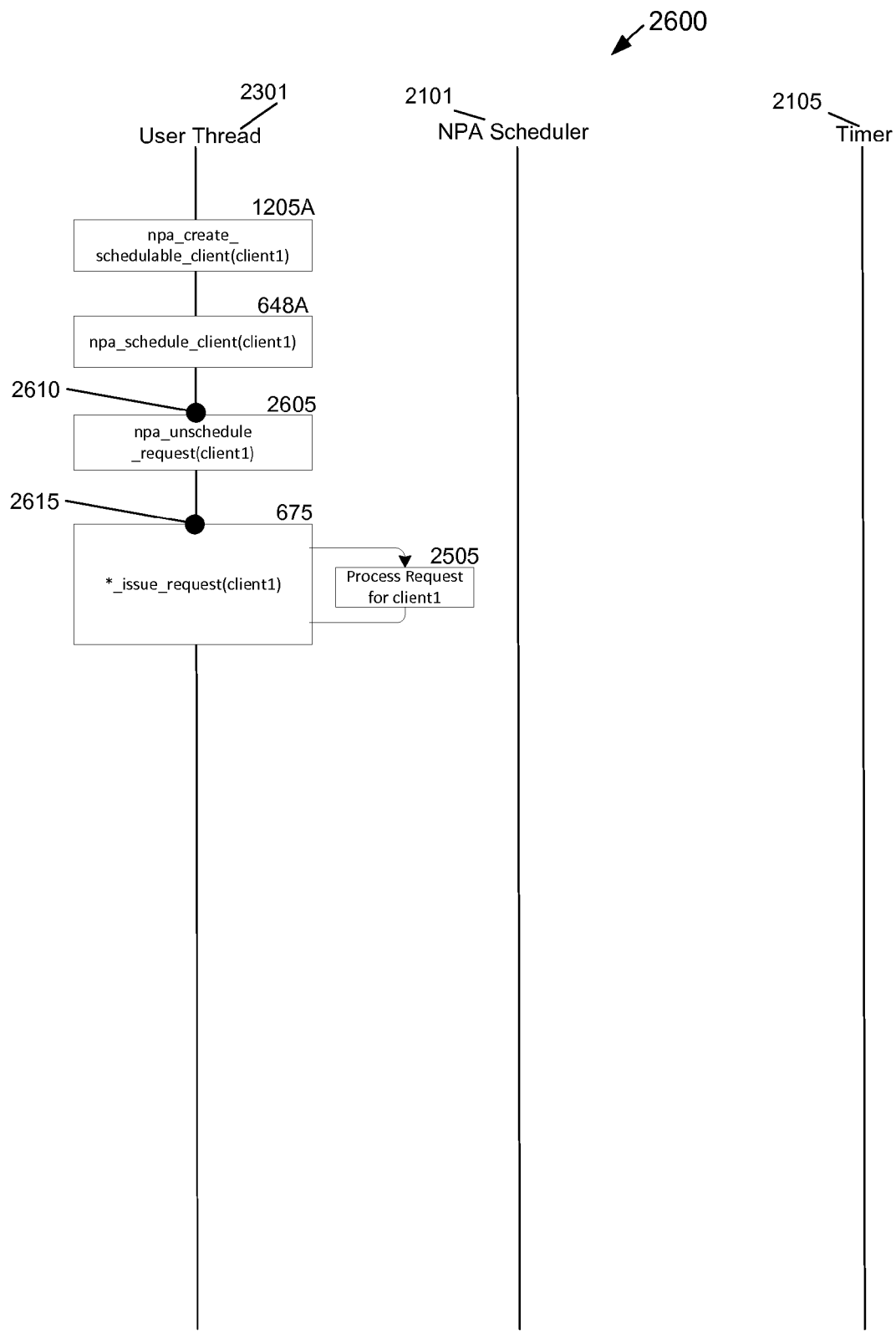
FIG. 26 illustrates an exemplary timing diagram when a user thread via a client may decide that it no longer wants to have a particular request processed and issue an unscheduled request command.

FIG. 26 illustrates an exemplary timing diagram 2600 when a user thread 2301 via a client 648A may decide that it no longer wants to have a particular request 675 processed. Such undesired or unwanted requests 675 are characterized as unscheduled requests 675.

Figure 27:
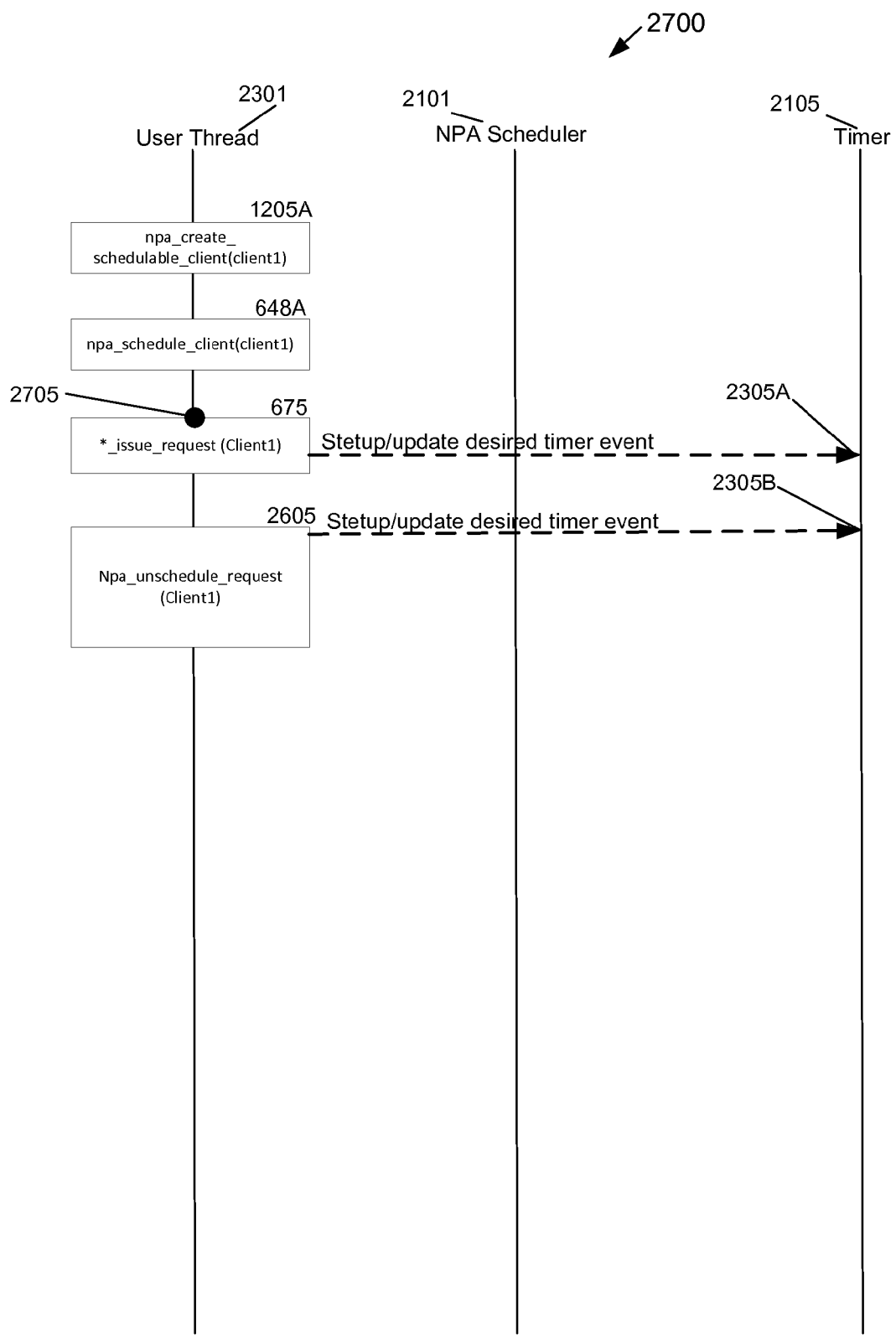
FIG. 27 illustrates an exemplary timing diagram in which a request has been scheduled and the user thread has issued the request, but the scheduler has not started processing the request when an unscheduled request command has been issued.
Figure 28:
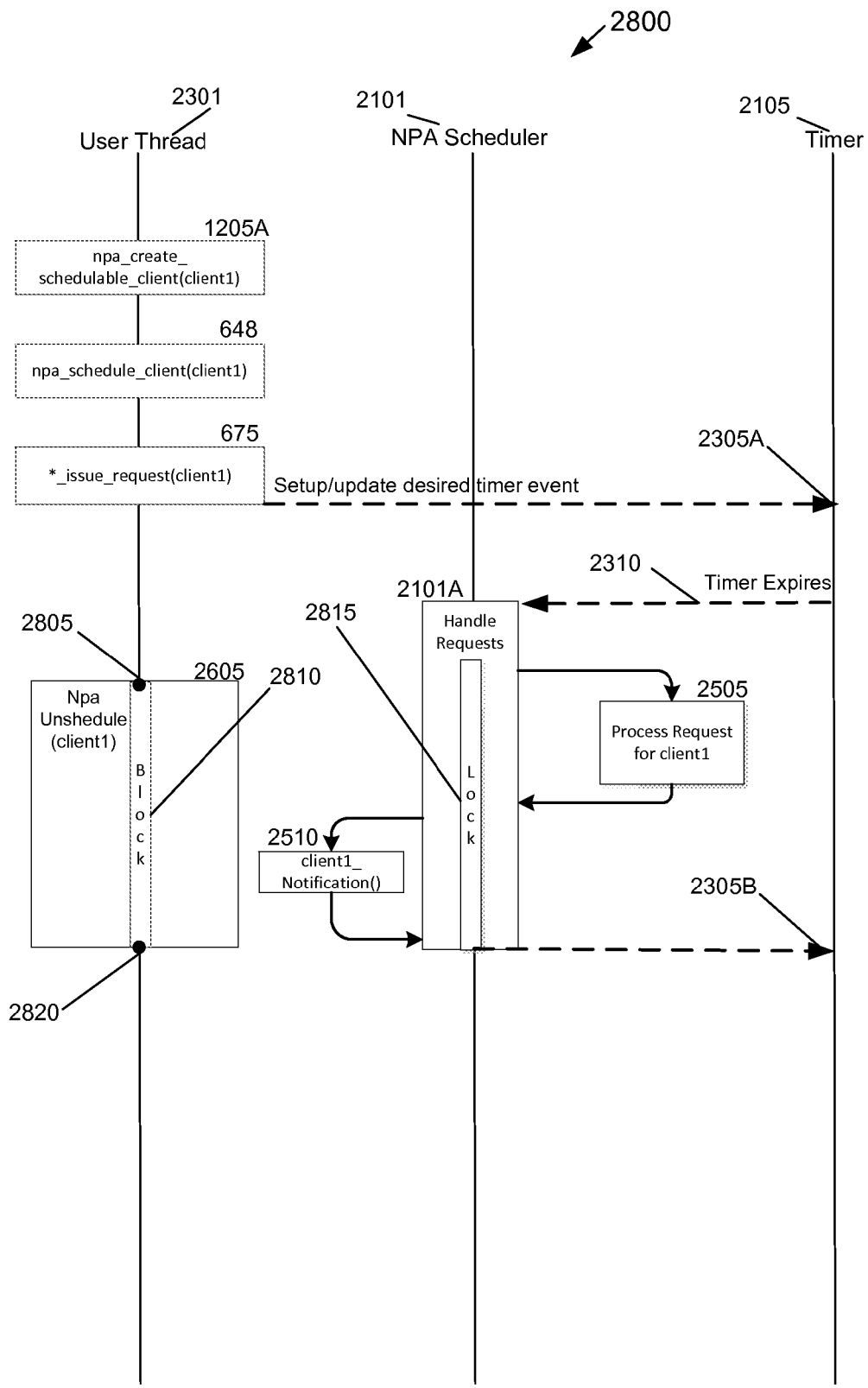
FIG. 28 illustrates an exemplary timing diagram in which a request has been scheduled and the user thread 2301 has issued the request, and the scheduler 2101 has started processing the request when an unscheduled request command has been issued.

There two situations with respect to unscheduled requests 675: (a) requests 675 which have not been processed by the scheduler 2101, and (b) requests 675 which are currently being processed by the scheduler 2101. FIGS. 26-27 illustrate requests 675 which have been created but have not been processed by the scheduler 2102. Meanwhile, FIG. 28 illustrates requests 675 that have been created and which are being processed by the scheduler 2101 and then a client 648 later issues an unscheduled request command while the request 675 is being processed.

Referring back to FIG. 26, a client 648A is created at stage 1205A as represented by block 648A. Before a request 675 is issued by the client 648A, an unscheduled request command is issued at stage 2610. In this scenario, the scheduler 2101 usually may simply remove the undesired requests 675 from its list of scheduled requests 675 which are stored in the database 2103. At stage 2615, a new immediate request may be issued without it being scheduled (as illustrated) or another scheduled request can be started (repeating 1205A and 648A on the client).

FIG. 27 illustrates a timing diagram 2700 in which a request 675 has been scheduled and the user thread 2301 has issued the request 675 at stage 2705, but the scheduler 2101 has not started processing the request 675 when an unscheduled request command 2605 has been issued. Specifically, a scheduled client 648A is created in block 1205A which corresponds with FIG. 12, as described above.

Then at stage 2705, the client 648A issues the request 675. At stage 2305A, the database 2103 with its start times for the one or more requests 675 will then be updated. Then at stage 2305B, an unscheduled request command 2605 has been issued by the client 648A. At this point, the database 2103 may be updated by the scheduler 2102 in which the request 675 may be removed from the database 2103. The request 675 may be removed from the database 2103 because the request 675 has not been processed by the scheduler 2101 (i.e.—the request 675 has not been sent to its requested resource 105). At this stage, another immediate or scheduled request can be started.

FIG. 28 illustrates an exemplary timing diagram 2800 in which a request 675 has been scheduled and the user thread 2301 has issued the request 675, and the scheduler 2101 has started processing the request 675. In other words, the scheduler 2101 has already started processing a request 675 which is now undesired by the client 648 or user thread 2301.

According to this exemplary embodiment, when the user thread 2301 or client 648 issues the unscheduled request command 2605 at stage 2805, the scheduler 2101 issues a lock on the resource 105 as illustrated by block 2815 which blocks out the unscheduled request command as indicated by block 2810. In this way, the scheduler 2101 completes the scheduled request 675 in block 2505 irrespective of the unscheduled request command 2605 that was issued at stage 2805.

So in this exemplary embodiment of FIG. 28, in response to the unscheduled request command 2605 at stage 2805, the user thread 2301 or client 648 may receive a client notification 2510 as well as a return value for the unscheduled request command 2605 that the request 675 has been processed/completed.

In a scenario where the request 675 has been placed in the next-awake set of a resource set 304 to be completed by the sleep LPR 2107, and the user thread 2301 has issued an unscheduled request command 2605, and the client notification 2510 is not issued until the system wakes up, the scheduler 2101 may inherit the priority of the request 675 which allows the scheduler 2101 to act immediately on the request 675.

This becomes a synchronization point that allows the user thread 2301 and the scheduler 2101 to finish a request 675 immediately rather than waiting for its requested deadline. The scheduler 2101 will issue a notification back to the user thread 2301 indicating that the request 675 has been completed and therefore the unscheduled request command 2605 is also complete.

Figure 29:
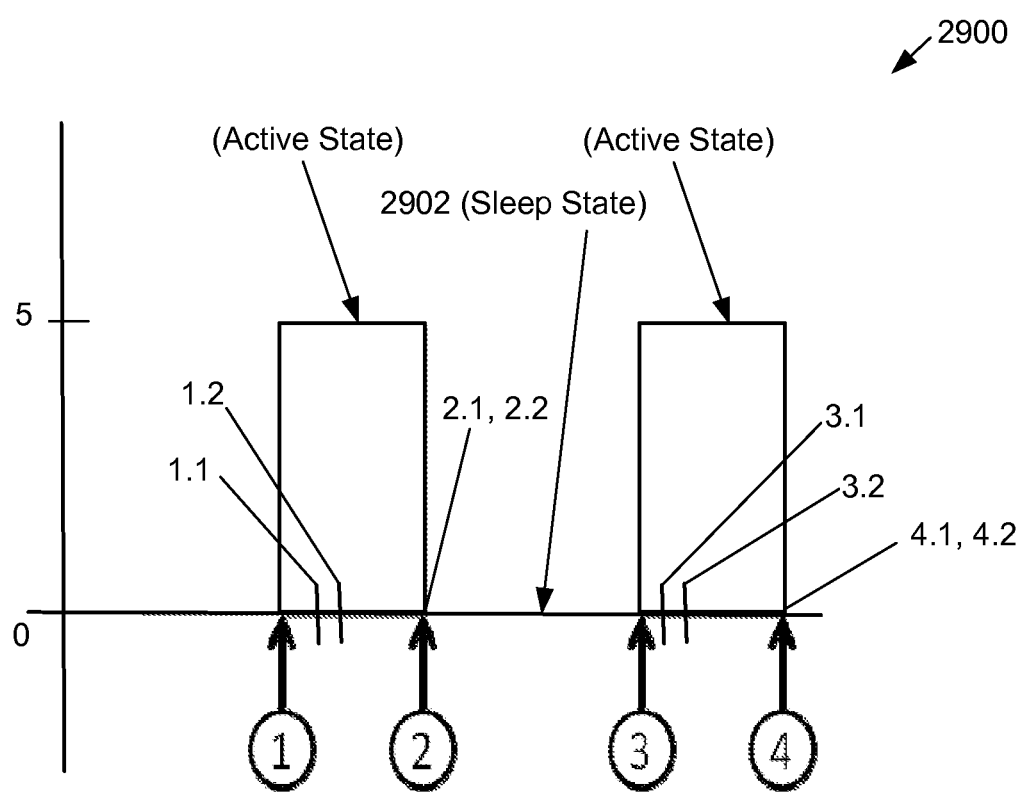
FIG. 29 illustrates a simple scenario in which a single application program is running and after processing one or more requests during an active state, the CPU may enter into a sleep state in which the scheduler uses a new request function/feature.

FIG. 29 illustrates a simple scenario in which a single application program is running and after processing one or more requests 675 during an active state, the CPU 110 may enter into a sleep state 2902. The Y-axis may represent voltage or current while the X-axis may represent time, such as in the units of milliseconds.

Between stages 1 and 2, the single application is running and the CPU 110 is active and has a voltage like 5 milliVolts. Then the CPU 110 enters into a sleep state 2902 between stages 2 and 3 on the X-axis timeline in which there is zero voltage. Similarly, between stages 3 and 4 on the X-axis timeline, the CPU 110 is active and again has a voltage such as 5 milliVolts.

At stage 1.1, a user thread 2301 (not illustrated) may issue a request to a CPU busy monitor ("CBM") resource 2109, as described above in FIG. 21. The CBM resource 2109 is part of and/or established by the scheduler 2101. Any nonzero requests 675 to the CBM resource 2109 indicates that the client 648 or user thread 2301 issuing the request 675 expects the CPU 110 to remain busy during execution of the request 675. The CBM resource 2109 is a binary resource meaning that the CPU 110 is considered busy by the CBM resource 2109 as long as any client 648 is busy and the CPU 110 is not characterized as free or not busy until the last client 675 completes a nonzero or busy request.

At stage 1.2, a suppressible resource request 675 may be issued by the scheduler 2101 to a resource 105. A suppressible request 675 is a resource request 675 issued from a suppressible client 648, and these requests 675 have the property that they do not need to be honored when the CPU 110 goes idle or enters the sleep state 2902. In other words, suppressible requests 675 may be "shut off" when a CPU 110 enters into a sleep state 2902.

Suppressible requests 675 are in direct contrast to required requests 675, which are required to be honored at all times by a CPU 110. By issuing a suppressible request 675 at stage 2, there is no requirement to explicitly cancel the request 675 prior to entering the sleep state 2902.

In the particular case of resources 105 that are serviced by the RPM 157, a suppressible request 675 is not added to a sleep set of a resource set 304 and is only added to an active set of a resource set 304. Meanwhile, a required request 675 is added to both active and sleep sets of a resource set 304 (See FIG. 15) as understood by one of ordinary skill in the art.

At stage 2.1, once the request 675 is completed by the resource 105, the resource 105 issues a notification back to the CBM resource 2109 of the scheduler 2101, indicating that the resource 105 expects to go idle "soon." The resource at stage 2.1 begins conducting clean-up work in association with the completion of the request 675.

At stage 2.2 just before the sleep state 2902, the client 648 or user thread 2301 may schedule a new request 2111 using a discretionary function/feature and indicate to the scheduler 2101 that it needs a new request 2111 to be processed at stage 3 on the X-axis. The discretionary function or feature may comprise data that is part of the new request 2111.

The discretionary function informs the scheduler 2101 that the client 648 has no expectation that the prior request 675 or current request 675 being completed will be persisted until the new request 2111 takes effect. In other words, with this additional discretionary function or feature that is part of a new request 2111, the scheduler 2101 will recognize that the current client request 675 being processed does not need to be completed or continued with his processing when the new scheduled request 2111 takes effect. With this discretionary function, the scheduler 2101 has the freedom but not a requirement to complete a current request 675 at the scheduler 2101 discretion.

At stage 2, the scheduler 2101 may review the current state of the CPU 110 being tracked by the CBM resource 2109. If the scheduler 2101 notices that the CPU 110 is not in a busy state as tracked by the CBM resource 2109, the scheduler 2101 may allow the sleep state (via controller 101 and its resource sets of FIG. 15) to turn the CPU 110 off for the idle or sleep state between stages 2 and 3 without having the need to cancel the new request 2111 that was issued with the discretionary function. In this way, the RPM 157 via the sleep set of the resource sets 304 (see FIG. 15) does not need to issue any cancel requests 675 before the actual sleep state 2902 is entered.

In summary, the scheduler 2101 may look into the busy state tracked by the CBM resource 2109 to determine if a sleep state is expected soon for the CPU 110. With the discretionary function of a new request 2111, the scheduler 2101 can decide whether to end/cancel a current request 675 and schedule the new request 2111 if it anticipates that sleep will occur soon.

Alternatively, the scheduler 2101 may decide not to cancel/end the current request 675 and not to honor the new request 2111 if it recognizes the current request 675 and new request 2111 are similar or identical. This will allow the RPM 157 via the sleep set of the controller 100 to turn off a CPU 110 and then turn on the CPU 110 so that the current request 675 is processed when the CPU 110 is turned on.

This discretionary function/feature of a new request 2111 allows the scheduler 2101 to decide whether or not to cancel a current request 675 or to issue a new request 2111. This discretionary function and the ability of the scheduler 2101 to anticipate sleep states by reviewing the busy state tracked by the CBM resource 2109 increases efficiency and conserves power for the system 2100. Power may be conserved since the scheduler 2101 does not have to perform as much work compared to a system that does not allow the scheduler 2101 to have discretion with respect to the requests 675 it receives from clients 648.

Work is reduced by the scheduler 2101 using the CBM resource 2109 and the discretionary functions in new requests 2111 because the scheduler 2101 does not need to adjust any parameters to the sleep sets and active sets of resource sets managed by the RPM 157 and the controller 101 (See FIG. 15). Adjustments are not needed to any parameters of the sleep sets and active sets because the scheduler 2101 is able to determine that successive active states of the CPU 110 are similar to one another and do not require any changes to the active or sleep sets.

Without adjusting active or sleep sets of resource sets managed by the RPM 157 and controller 101, efficiencies on the order of 15% have been realized with the inventive system 2100 (i.e. time savings on the order of 7 ms or more out of 45 ms have been realized compared to systems which do not allow the scheduler 2101 to have discretion with respect to honoring/canceling current and new requests 675).

As noted previously, the scheduler 2101 is able to increase the efficiency of the system 2100 with the CBM resource 2109. The CBM resource 2109 is a binary indicator of whether or not something is happening in the system 2100 that allows the scheduler 2101 to infer that a sleep state will not occur relatively soon.

When the CBM resource 2109 indicates that most or all system elements are not "busy" usually meaning that extensive amounts of work have not been scheduled for resources 105 and that those resources 105 are about to be completely free of requests 675, then the scheduler 2101 may anticipate that a sleep state 2902 will occur relatively soon. By looking at the states tracked by the CBM resource 2109, the scheduler 2101 may make decisions on whether or not resources should be powered off depending upon whether the scheduler 2101 anticipates whether a sleep state 2902 will occur.

For example, if the scheduler 2101 notices that all resources 105 are currently registering a non-busy state, then the scheduler 2101 may anticipate that a sleep state 2902 will occur and the scheduler 2101 may allow the sleep state 2902 (via the RPM 157 and controller 101 with their resource sets) to power off one or more resources 101 so that the scheduler 2101 does not need to perform these tasks and hence saves work.

In another example, if the scheduler 2101 notices that a first resource 105A is registering a non-busy state (i.e. that the first resource 105A is inactive) while a second resource 105B is registering a busy state and if the scheduler 2101 determines that the first resource 105A is not scheduled for any upcoming requests 675, then the scheduler 2101 may power down the non-busy first resource 105A in order to conserve power. This action of powering down the non-busy first resource 105A may conserve overall power since a sleep state 2902 is not anticipated because the second resource 105B is registering a busy state. Power may be wasted if the non-busy first resource 105A were allowed to remain in an "On" but in inactive state.

Figure 30:
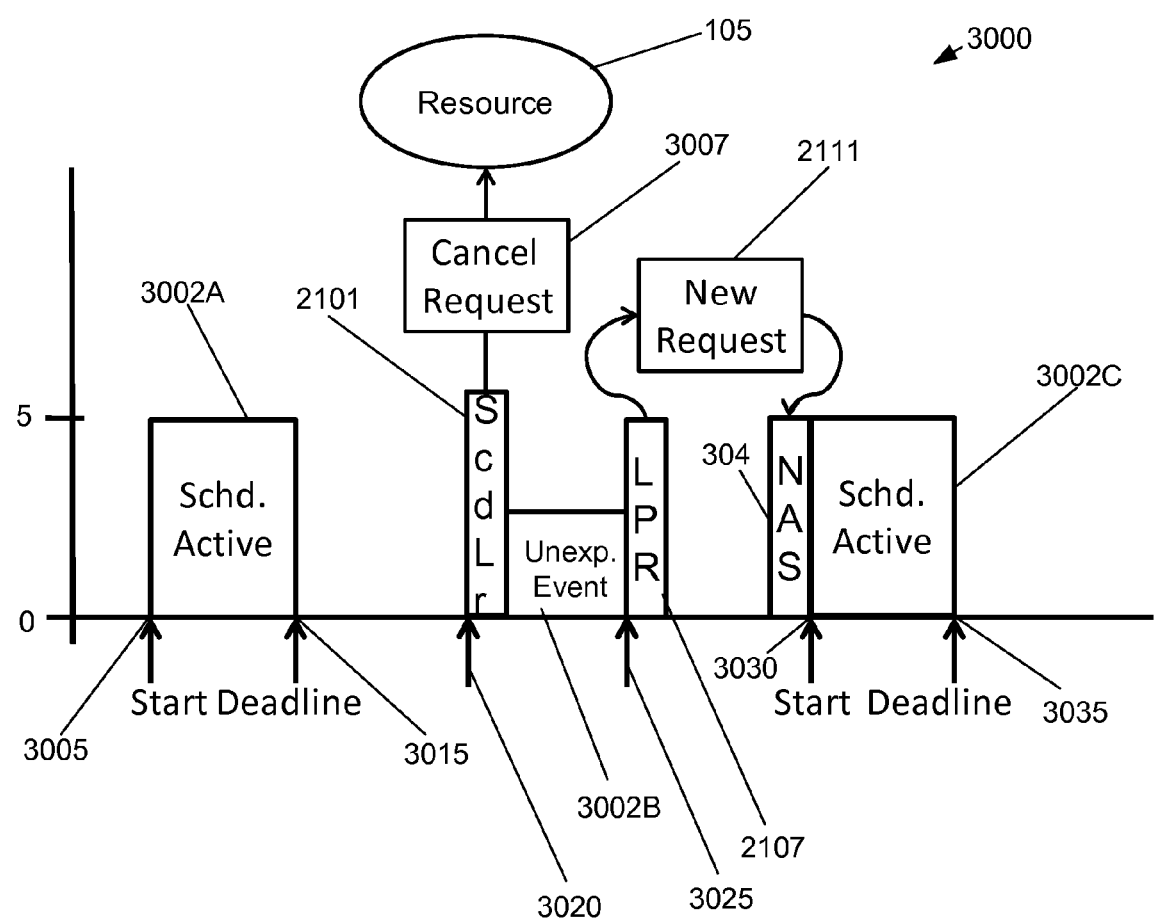
FIG. 30 illustrates an exemplary scenario of how the scheduler manages unexpected wake-ups or interruptions during a scheduled sleep state.

FIG. 30. illustrates an exemplary scenario of how the scheduler 2101 manages unexpected wake-ups or interruptions 3002B during a scheduled sleep state which was to occur between stages 3015 and 3030. The X-axis may represent time in milliseconds while the Y-axis may represent current or voltage.

The scheduler 2101 manages one or more requests 675 for one or more resources 105 at the beginning of stage 3005 of a busy or active state 3002A of a CPU 110. Prior to entering the sleep state at stage 3015, the scheduler 2101 after reviewing the database 2103 recognizes that at the next scheduled busy or active state 3002C scheduled for stage 3030, the current state of the resource which is currently active will likely not change.

Therefore, prior to stage 3015, the scheduler 2101 avoids additional work and conserves energy by not going through a process of shutting down or shutting off the resource 105 and updating respective sleep and active sets of resource sets 304. So at stage 3015, the scheduler 2101 allows all resources 105 to enter into a sleep state and allows the sleep set of each resource 105 to power down a respective resource 105. Upon entering stage 3015, the scheduler 2101 is expecting the system to wake-up at stage 3030.

In other words, the scheduler 2101 is not expecting the wake-up 3002B at stage 3020. However, at stage 3020, the scheduler 2101 does receive an unexpected interrupt causing a wake-up and unexpected active state 3002B at stage 3020. The scheduler 2101 may determine that active state 3002B is unexpected by comparing timing data that is present in the database 2103. Specifically, if the scheduler 2101 notices that the current active state 3002B has occurred much earlier in time than the scheduled wake-up time at stage 3030, then the scheduler 2101 will recognize that this second active state 3002B is unexpected or unanticipated by the system.

At this stage 3020, the scheduler 2101 determines the resource 105 scheduled to be active when the system exits the previously scheduled sleep state which started at stage 3015 is not needed for the current interrupt or wakeup event 3002B. Accordingly, the scheduler 2101 may issue a cancel request 3007 to the resource 105 so that the resource 105 is turned off during this unanticipated, second active state 3002B in which the resource 105 is not being used.

Next, at the end of the second, unexpected active state 3002B at stage 3025, the scheduler 2101 may communicate with the sleep LPR 2107 in order to schedule a new request 2111 to turn on the resource 105 such that the request 2111 becomes part of the next active awake set 304 at the third active state 3002C (which was previously anticipated/scheduled by the scheduler 2101). In this way, the scheduler 2101 has the intelligence to defer or reschedule requests 675 that may not be needed for interrupt states such as the unexpected, second active state 3002B of FIG. 30.

For example, assume the resource 105 in FIG. 30 is an RF modem. The scheduler 2101, in its discretion, has decided that it will allow the sleep set of a resource 105 to turn off the RF modem so that the RF modem will immediately become active for the next anticipated, active state 3002C scheduled for stage 3030.

However, the scheduler 2101 learns at stage 3020 that the interrupt causing the unexpected wake-up at this stage 3020 is associated with an application program that does not need the RF modem. The scheduler 2101 may then issue a cancel request 2111 for the RF modem so that it does not perform its scheduled work corresponding to its previous request 675 during this unanticipated, active state 3002B at stage 3020. The scheduler 2101, using the sleep LPR 2107, will then schedule a new request 2111 associated with the RF modem for the next awake set ("NAS") 304 in the expected and previously scheduled active state 3002C at stage 3030.

In view of the disclosure above, one of ordinary skill in the art is able to write computer code or identify appropriate hardware and/or other logic or circuitry to implement the distributed resource management system and method without difficulty based on the flowcharts and associated description in this specification, for example. Therefore, disclosure of a particular set of program code instructions or detailed hardware devices is not considered necessary for an adequate understanding of how to make and use the distributed resource management system and method. The inventive functionality of the claimed computer implemented processes is explained in more detail in the above description and in conjunction with the drawing figures, which may illustrate various process flows. Further, the processors 110, 126, 202, 206, etc., in combination with the memory 112 and the instructions stored therein may serve as a means for performing one or more of the method steps described herein.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage medium may be any available medium that may be accessed by a computer. By way of example, and not limitation, such computer-readable media may comprise RAM, ROM, EEPROM, CD-ROM or other optical disk storage, magnetic disk storage or other optical or magnetic storage devices, or any other medium that may be used to carry or store desired program code in the form of instructions or data structures and that may be accessed by a computer. The term "disk" or "disc," as used herein, includes but is not limited to compact disc ("CD"), laser disc, optical disc, digital versatile disc ("DVD"), floppy disk and Blu-ray disc. Combinations of the above should also be included within the scope of computer-readable media.

Although selected aspects have been illustrated and described in detail, it will be understood that various substitutions and alterations may be made therein without departing from the spirit and scope of the present disclosure, as defined by the following claims.

What is claimed is:

1. A method for managing requests among resources within a portable computing device, the method comprising:
   receiving data from a client for scheduling a plurality of requests, each request identifying at least one resource and a requested deadline;
   storing the data from the client in a database;
   determining times and a sequence for processing the requests based on requested deadlines in the requests and based on current states of resources within the portable computing device;
   communicating the requests to the corresponding resources at the determined times and according to the determined sequence; and
   in response to receiving from the client an unscheduled request command associated with a previously scheduled request, locking the corresponding resource.

2. The method of claim 1, further comprising:
   scheduling at least one of the plurality of requests after its requested deadline in response to receiving a new request command.

3. The method of claim 1, further comprising:
   allowing a sleep set corresponding to a sleep processor state to power off a processor such that the processor may continue working on at least one of the plurality of requests when the processor exits the sleep processor state.

4. The method of claim 1, further comprising:
   receiving an unexpected interrupt during a scheduled sleep state;
   in response to receiving the unexpected interrupt determining if one or more of the plurality of requests are needed to respond to the unexpected interrupt.

5. The method of claim 4, further comprising:
   if one or more of the plurality of requests are not needed to respond to the unexpected interrupt during the scheduled sleep state, then canceling the one or more of the plurality of requests.

6. The method of claim 5, further comprising:
   rescheduling one or more of the cancelled requests to occur in a next scheduled active state.

7. The method of claim 1, further comprising:
   in response to receiving the unscheduled request command, finishing processing of the corresponding request with the corresponding resource.

8. The method of claim 1, wherein the portable computing device comprises at least one of a mobile telephone, a personal digital assistant, a pager, a smartphone, a navigation device, and a hand-held computer with a wireless connection or link.

9. A computer system for managing requests among resources within a portable computing device, the system comprising:
   a processor operable for:
      receiving data from a client for scheduling a plurality of requests, each request identifying at least one resource and a requested deadline;
      storing the data from the client in a database;
      determining times and a sequence for processing the requests based on requested deadlines in the requests and based on current states of resources within the portable computing device; and
      communicating the requests to the corresponding resources at the determined times and according to the determined sequence; and
      in response to receiving from the client an unscheduled request command associated with a previously scheduled request, locking the corresponding resource.

10. The system of claim 9, wherein the processor is further operable for:
    scheduling at least one of the plurality of requests after its requested deadline in response to receiving a new request command.

11. The system of claim 10, wherein the processor is further operable for:
    allowing a sleep set corresponding to a sleep processor state to power off a processor such that the processor may continue working on at least one of the plurality of requests when the processor exits the sleep processor state.

12. The system of claim 9, wherein the processor is further operable for:
    receiving an unexpected interrupt during a scheduled sleep state;
    in response to receiving the unexpected interrupt, determining if one or more of the plurality of requests are needed to respond to the unexpected interrupt.

13. The system of claim 12, wherein the processor is further operable for:
    canceling one or more of the plurality of requests if not needed to respond to the unexpected interrupt during the scheduled sleep state.

14. The system of claim 13, wherein the processor is further operable for:
    rescheduling one or more of the cancelled requests to occur in a next scheduled active state.

15. The system of claim 9, wherein the processor is further operable for:
    in response to receiving the unscheduled request command, finishing processing of the corresponding request with the corresponding resource.

16. The system of claim 9, wherein the portable computing device comprises at least one of a mobile telephone, a personal digital assistant, a pager, a smartphone, a navigation device, and a hand-held computer with a wireless connection or link.

17. A computer system for managing requests among resources within a portable computing device, the system comprising:
    means for receiving data from a client for scheduling a plurality of requests, each request identifying at least one resource and a requested deadline;
    means for storing the data from the client in a database;
    means for determining times and a sequence for processing the requests based on requested deadlines in the requests and based on current states of resources within the portable computing device;
    means for communicating the requests to the corresponding resources at the determined times and according to the determined sequence; and in response to receiving from the client an unscheduled request command associated with a previously scheduled request, locking the corresponding resource.

18. The system of claim 17, further comprising:

means for scheduling at least one of the plurality of requests after its requested deadline in response to receiving a new request command.

19. The system of claim 18, further comprising:

means for allowing a sleep set corresponding to a sleep processor state to power off a processor such that the processor may continue working on at least one of the plurality of requests when the processor exits the sleep processor state.

20. The system of claim 17, further comprising:

means for receiving an unexpected interrupt during a scheduled sleep state;

means for determining if one or more of the plurality of requests are needed to respond to the unexpected interrupt in response to receiving the unexpected interrupt.

21. The system of claim 20, further comprising:

means for canceling one or more of the plurality of requests if not needed to respond to the unexpected interrupt during the scheduled sleep state.

22. The method of claim 21, further comprising:

means for rescheduling one or more of the cancelled requests to occur in a next scheduled active state.

23. The system of claim 17, further comprising:

means responsive to the unscheduled request command for finishing processing of the corresponding requests with the corresponding resource.

24. The system of claim 17, wherein the portable computing device comprises at least one of a mobile telephone, a personal digital assistant, a pager, a smartphone, a navigation device, and a hand-held computer with a wireless connection or link.

25. A computer program product comprising a non-transitory computer usable medium having a computer readable program code embodied therein, said computer readable program code adapted to be executed to implement a method for managing requests among resources within a portable computing device, said method comprising:

receiving data from a client for scheduling a plurality of requests, each request identifying at least one resource and a requested deadline;

storing the data from the client in a database;

determining times and a sequence for processing the requests based on requested deadlines in the requests and based on current states of resources within the portable computing device;

communicating the requests to the corresponding resources at the determined times and according to the determined sequence; and in response to receiving from the client an unscheduled request command associated with a previously scheduled request, locking the corresponding resource.

26. The computer program product of claim 25, wherein the program code implementing the method further comprises:

scheduling at least one of the plurality of requests after its requested deadline in response to receiving a new request command.

27. The computer program product of claim 25, wherein the program code implementing the method further comprises:

allowing a sleep set corresponding to a sleep processor state to power off a processor such that the processor may continue working on at least one of the plurality of requests when the processor exits the sleep processor state.

28. The computer program product of claim 25, wherein the program code implementing the method further comprises:

receiving an unexpected interrupt during a scheduled sleep state;

in response to receiving the unexpected interrupt, determining if one or more of the plurality of requests are needed to respond to the unexpected interrupt.

29. The computer program product of claim 28, wherein the program code implementing the method further comprises:

if one or more of the plurality of requests are not needed to respond to the unexpected interrupt during the scheduled sleep state, then canceling the one or more of the plurality of requests.

30. The computer program product of claim 29, wherein the program code implementing the method further comprises:

rescheduling one or more of the cancelled requests to occur in a next scheduled active state.

31. The computer program product of claim 25, wherein the program code implementing the method further comprises:

in response to receiving the unscheduled request command, finishing processing of the corresponding request with the corresponding resource.

32. The computer program product of claim 25, wherein the portable computing device comprises at least one of a mobile telephone, a personal digital assistant, a pager, a smartphone, a navigation device, and a hand-held computer with a wireless connection or link.

* * * * *